(12) United States Patent
Feder et al.

(10) Patent No.: US 8,873,954 B2
(45) Date of Patent: Oct. 28, 2014

(54) SYSTEM AND METHOD FOR EXCHANGING INFORMATION OVER A JACOBI MIMO CHANNEL

(71) Applicants: Meir Feder, Herzelia (IL); Ronen Dar, Tel Aviv (IL)

(72) Inventors: Meir Feder, Herzelia (IL); Ronen Dar, Tel Aviv (IL)

(73) Assignee: Ramot at Tel-Aviv University Ltd., Tel Aviv (IL)

(*) Notice: Subject to any disclaimer, the term of this patent is extended or adjusted under 35 U.S.C. 154(b) by 88 days.

(21) Appl. No.: 13/754,911

(22) Filed: Jan. 31, 2013

(65) Prior Publication Data

US 2014/0037289 A1 Feb. 6, 2014

Related U.S. Application Data

(60) Provisional application No. 61/593,346, filed on Feb. 1, 2012.

(51) Int. Cl.
| | | |
|---|---|---|
| H04B 10/00 | (2013.01) | |
| H04J 14/00 | (2006.01) | |
| H04J 14/02 | (2006.01) | |
| H04J 14/04 | (2006.01) | |
| H04L 25/00 | (2006.01) | |
| H04B 10/60 | (2013.01) | |
| H04B 10/516 | (2013.01) | |
| H04B 10/50 | (2013.01) | |

(52) U.S. Cl.
CPC ............... *H04J 14/00* (2013.01); *H04J 14/02* (2013.01); *H04J 14/04* (2013.01); *H04L 25/00* (2013.01); *H04B 10/60* (2013.01); *H04B 10/516* (2013.01); *H04B 10/50* (2013.01)
USPC ............. 398/55; 398/154; 398/158; 398/162

(58) Field of Classification Search
USPC ............. 398/39, 40, 55, 142, 143, 154, 158, 398/162, 192, 195, 208, 209
See application file for complete search history.

(56) References Cited

U.S. PATENT DOCUMENTS

| | | | |
|---|---|---|---|
| 7,570,696 B2 * | 8/2009 | Maltsev et al. | 375/260 |
| 2006/0135081 A1 * | 6/2006 | Mysore et al. | 455/70 |
| 2007/0177670 A1 * | 8/2007 | Elnathan et al. | 375/240.18 |

* cited by examiner

*Primary Examiner* — Dalzid Singh
(74) *Attorney, Agent, or Firm* — Oren Reches

(57) ABSTRACT

A method and system for transmitting data over a Jacobi MIMO channel when using channel state feedback.

23 Claims, 10 Drawing Sheets

SYSTEM AND METHOD FOR EXCHANGING INFORMATION OVER A JACOBI MIMO CHANNEL

RELATED APPLICATIONS

This application claims the priority of U.S. provisional patent Ser. No. 61/593,346 filing date Feb. 1, 2012 which is incorporated herein by reference.

BACKGROUND

An explosive demand for data network bandwidth emerged within the last two decades as the use of internet and other related data services increased. This demand exponentially grows at a rate close to 60% per year. This growth rate is not about to slow down considering large bandwidth consuming data services such as cloud computing, multi-media real-time applications etc. are expected to gain importance. The demand for network traffic was economically enabled by wavelength-division multiplexing (WDM) technologies researched and developed in the early 90's. At start, the WDM allowed the optical transport throughput to grow at a rate of 80% per year. However, in the last decade this growth rate experienced a dramatic slow-down to about 20%. This was explained by recent studies on the non-linear Shannon capacities of optical fibers where it was shown that current optical transport systems approach their fundamental limits to within a factor of 2.

It is thus clear that new strategies need to be found to continue supporting the ever growing demand for data network. To that end, intense research efforts were directed in the last years to find new strategies beyond WDM. Multiplexing techniques such as time-division multiplexing (TDM), complex modulation and more recently, polarization-division multiplexing (PDM), were employed in the latest generation of optical systems. The only physical dimension left to be exploit is space. Recent studies showed that space-division multiplexing (SDM) is currently the only known method that allows a substantial increase in optical transport capacities and yet is economically attractive. Thus SDM technology is considered today to be the most promising strategy for next generation optical systems satisfying the network growth for the next decade and beyond.

SDM strategies in wireless communication, where multiple antennas are used at the transmitter and/or receiver, have been extensively researched in the last two decades. The most common statistical model of the wireless channel is the Rayleigh fading—the path gain between each transmit and receive antennas is assumed to have a Normal distribution whereas all path gains are independent. Many important works have been conducted in this field where the capacity, error and outage probabilities were comprehensively analyzed. A further fundamental tradeoff in spatially multiplexed wireless systems was defined and analyzed—the tradeoff between multiplexing, exploiting the multiple antennas for higher transmission rate, and diversity, achieving better error probability by transmitting the same signal through multiple paths.

In optical communication an SDM system uses m parallel transmission paths per wavelength which optimally multiplies the potential throughput of a certain link by a factor of m.

Since m can potentially be chosen very large, SDM technology is highly scalable. These parallel optical paths could be multiple single-mode fiber strands within a fiber cable, multiple cores within a multi-core fiber, or multiple modes within a multi-mode waveguide. In this work we consider the multi-mode fiber, however results are applicable also in all other SDM optical structures.

Now, significant crosstalk between the independent optical paths raises the need for multiple-input multiple-output (MIMO) techniques. However, signal processing for large size MIMO schemes (large m) is currently not feasible in the optical rates. Assuming that higher rates signal processing will be available in the future and having in mind that the procedure of replacing optical fibers to support SDM is long and expensive, one will want to make a long term design. To that end and more, it was proposed to design an optical system that can support relatively large number of paths for future use, but at start to address only some of the paths. Winzer and Foschini discuss this Jacobi channel where simulations of the capacities and outage probabilities were presented. The importance of addressing all paths was shown—zero outage probability can be attained for any transmission rate only when all paths are addressed both at the transmitter and receiver. The outage probability is an important measure in optical systems and is required to be very low. Thus, choosing the number of addressed paths is a very critical design step that highly reflects on the system outage.

SUMMARY

According to an embodiment of the invention there are provided systems, receivers, transmitters and methods for transmitting data over a Jacobi MIMO channel.

BRIEF DESCRIPTION OF THE DRAWINGS

Further features and advantages of the invention will be apparent from the description below. The invention is herein described, by way of example only, with reference to the accompanying drawings, wherein.

DETAILED DESCRIPTION OF THE DRAWINGS

Recent theoretical results indicate that in optical multi-mode/multicore communication it is possible to transmit a number of streams over the channel with no outage. There is provided a method and a system that can attain this theoretical performance. There are provided a system and method that use channel state feedback that can attain the theoretical performance. The feedback can be delayed and have low rate.

This proposed scheme may be an enabler for the optical multimode/multicore communication. The invention may have application in additional multi-input multi-output communication scenario, e.g. in-line communication, wireless communication, and so on.

There is provided a system (that includes a transmitter), method and a non-transitory computer readable medium that may utilize a communication scheme to may be applied in optical fiber communication. There is a novel trend of using multimode and multicore fibers, where in a single fiber several communication links are established. There is a random "cross talk" and interference between the channels. Unlike the situation in wireless communication, the system, method and computer readable medium in some cases can communicate a number of streams with no outage no matter how the channel leakage behaves.

A transmitter may be provided and may send K information streams from M modes/cores where K is determined by the theory and is smaller than N the number of addressable modes/cores at the transmitter.

The transmitter uses feedback on the channel state to retransmit a linear combination of previous signals from the N-K residual modes/cores. The retransmission is performed in a way that enables the receiver to recover from outage and to apply simple decoding schemes.

A communication scheme is provided and may use feedback on channel state to correct previously sent symbols in multi-input multi-output channel.

The communication scheme may be able to obtain no-outage communication in random channels. No outage is crucial for optical communication. Due to the high rates, the required error rates must be very low, and so outage cannot be tolerated. The communication scheme should work even when the channels has changed when the feedback was received, that is the feedback is "outdated".

The communication scheme with some adjustments can be applied to wireless communication. It may use data feedback, not only channel feedback.

Figure 9:
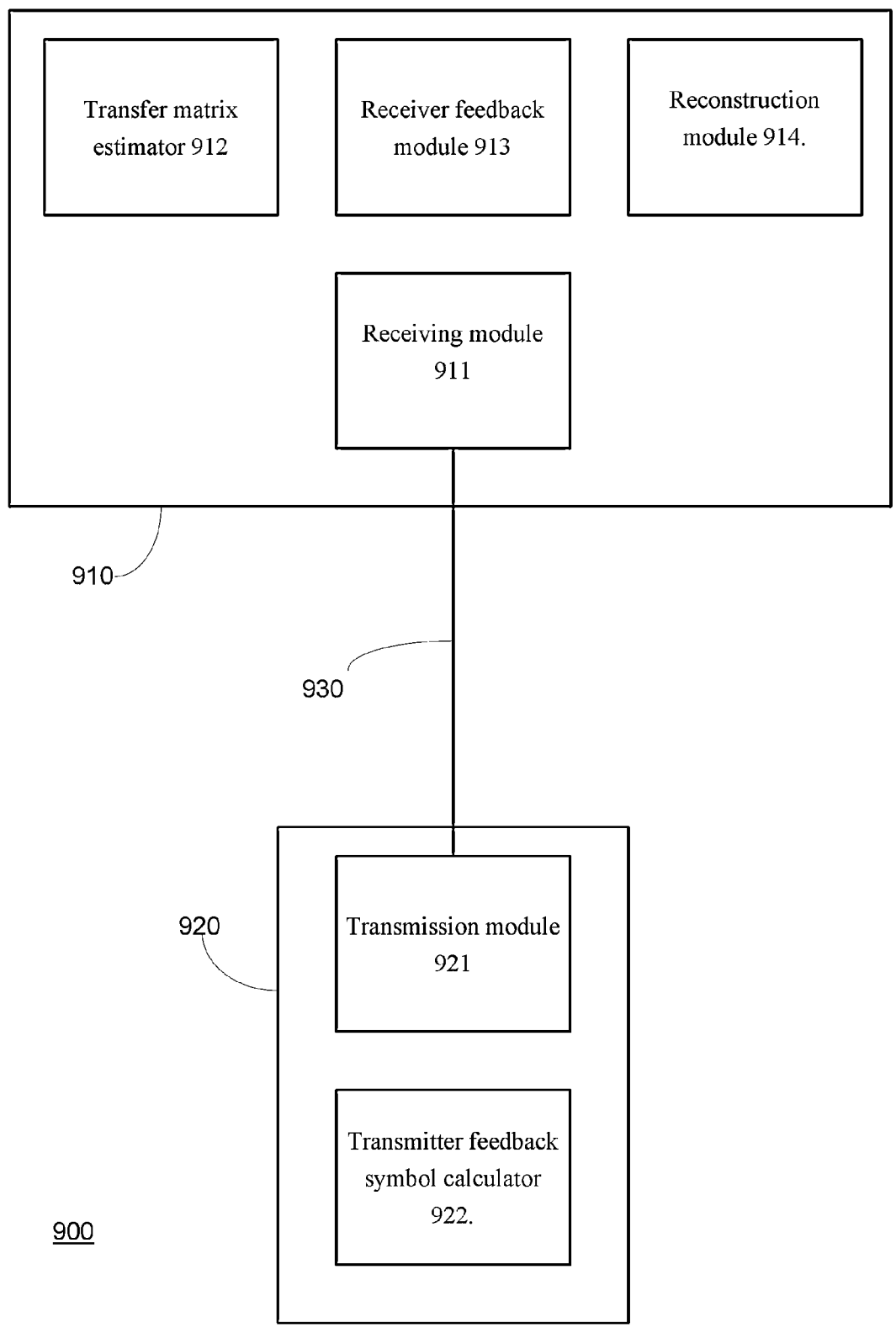
FIG. 9 illustrates a system according to an embodiment of the invention.

FIG. 9 illustrates system 900 according to an embodiment of the invention.

System 900 includes receiver 910 and transmitter 920. The receiver 910 and the transmitter 920 are coupled to each other by a communication channel 930. The communication channel 930 can belong to the system 900 but it may not belong to the system 900.

The transmitter 920 may be arranged to transmit using a first number (Mt) of transmission paths, multiple transmitter data streams and a transmitter feedback stream; wherein the transmitter feedback stream comprises transmitter feedback symbols calculated in response to receiver feedback stream symbols. The transmitter data streams include new information while the transmitter feedback stream is responsive to previously transmitted information. The transmitter feedback stream is calculated according to the channel state feedback from the receiver.

The receiver 910 may be arranged to:
a. receive, during multiple points in time and using a second number (Mr) of reception paths received signals that represent the multiple transmitter data streams and the transmitter feedback stream;
b. estimate transfer matrixes of the communication channel that correspond to the multiple points in time; wherein the transfer matrixes are portions of unitary matrixes, each unitary matrix is associated with a point in time of the multiple points in time; and
c. transmit over a feedback channel, a receiver feedback stream indicative of the transfer matrix.

The feedback channel can differ from the communication channel. Alternatively, the feedback channel can be a part of the communication channel.

The transmitter 920 may be further arranged to perform at least one additional transmission of a transmitter data symbol of the transmitter data streams to guarantee that the receiver is capable of reconstructing the transmitter data symbol with a desired certainly to provide a reconstructed transmitter data symbol. This desired certeiny may be responsive to the statistical characteristics of the communication channel noise—as an ideal reconstruction of the transmitter data symbol takes into account a noise free communication channel.

The receiver 910 may be further arranged to reconstruct the transmitter data streams in response to the reconstructed transmitter data symbol and the plurality of received streams.

Each one of the first number (Mt) and the second number (Mr) is smaller than a maximal number of paths (M) supported by the communication channel.

In order to guarantee the existence of at least some (K) outage free communication paths K should not exceed Mt+Mr−M.

FIG. 9 also illustrates the receiver 910 as including a receiving module 911, transfer matrix estimator 912, receiver feedback module 913 and reconstruction module 914.

The receiving module 911 is arranged to receive, during multiple points in time and using a second number (Mr) of reception paths, a plurality of receiver data streams that represent multiple transmitter data streams and a transmitter feedback stream.

The receiving module 911 is also arranged to receive at least one additional transmission of a transmitter data symbol of the transmitter data streams. The multiple transmitter data streams are transmitted by a transmitter coupled to the receiver via a communication channel, using a first number (Mt) of transmission paths. The transmitter feedback stream comprises transmitter feedback symbols calculated in response to receiver feedback stream symbols.

The transfer matrix estimator 912 is arranged to estimate transfer matrixes of the communication channel that correspond to the multiple points in time.

The receiver feedback module 913 is arranged to transmit over a feedback channel, a receiver feedback stream indicative of the transfer matrix; wherein the receiver feedback stream comprises the receiver feedback stream symbols.

Each transfer matrix may belong to a unitary matrix. The receiver feedback module 913 may transmit another part of the unitary matrix (that includes the transfer matrix). The other part of the unitary matrix can be used for reconstruct the transfer matrix and may be smaller than the transfer matrix.

The reconstruction module 914 is arranged to reconstruct, in response to the reception of the at least one additional transmission of the transmitter data symbol, the transmitter data symbol to provide a reconstructed transmitter data symbol; and reconstruct the transmitter data streams in response to the reconstructed transmitter data symbol and the plurality of receiver streams.

FIG. 9 also illustrates the transmitter 920 as including transmission module 921 and transmitter feedback symbol calculator 922.

The transmission module 921 may be arranged to transmit, using a first number (Mt) of transmission paths, multiple transmitter data streams and a transmitter feedback stream.

The transmitter feedback symbol calculator 922 may be arranged to calculate transmitter feedback stream symbols of the transmitter feedback stream in response to receiver feedback stream symbols. The receiver feedback stream is sent to the transmitter over a feedback channel by a receiver using a second number (Mr) of reception paths. The receiver and the transmitter are coupled to a communication channel.

The receiver feedback stream is indicative of the transfer matrixes. The receiver feedback stream may include the transfer matrixes or any information that will allow the transmitter to calculate the transfer matrixes. For example—each transfer matrix can belong to a unitary matrix and the receiver feedback stream may include parts of unitary matrixes that include the unitary matrixes.

The transmission module 921 is further arranged to perform at least one additional transmission of a transmitter data symbol of the transmitter data streams to guarantee that the receiver is capable of reconstructing the transmitter data symbol with a desired certainly to provide a reconstructed transmitter data symbol.

According to various embodiment of the invention the transmitter may be arranged to transmit the multiple transmitter data streams and the transmitter feedback stream concurrently.

The number of the transmitter data streams may not exceed Mt+Mr−M.

The communication channel 930 may be a multimode optic fiber and the transmission paths are implemented by multi-modes of the transmitter.

The communication channel may be an optical fiber that has multiple cores and the transmission paths are implemented by the multiple cores.

The receiver feedback stream may include the transfer matrixes of the communication channel during the receiving.

The receiver feedback stream may include parts of the unitary matrixes that differ from the transfer matrixes of the communication channel during the receiving but facilitate a reconstruction of the transfer matrixes. These parts of the unitary matrixes may be smaller than the transfer matrixes.

The transmitter may be arranged to transmit, at a certain time slot, multiple transmitter data symbols of the multiple transmitter data streams and a transmitter feedback symbol of the transmitter feedback stream, the transmitter feedback symbol is responsive to a transmitter data symbol of the multiple transmitter data streams and to a receiver feedback symbol received during a time slot that precedes the certain time slot.

The transmitter may be arranged to transmit, at a certain time slot, multiple transmitter data symbols of the multiple transmitter data streams and a transmitter feedback symbol of the transmitter feedback stream, the transmitter feedback symbol is responsive to a product of (a) transmitter data symbol of the multiple transmitter data streams and (b) receiver feedback symbol received during a time slot that precedes the certain time slot.

Figure 10:
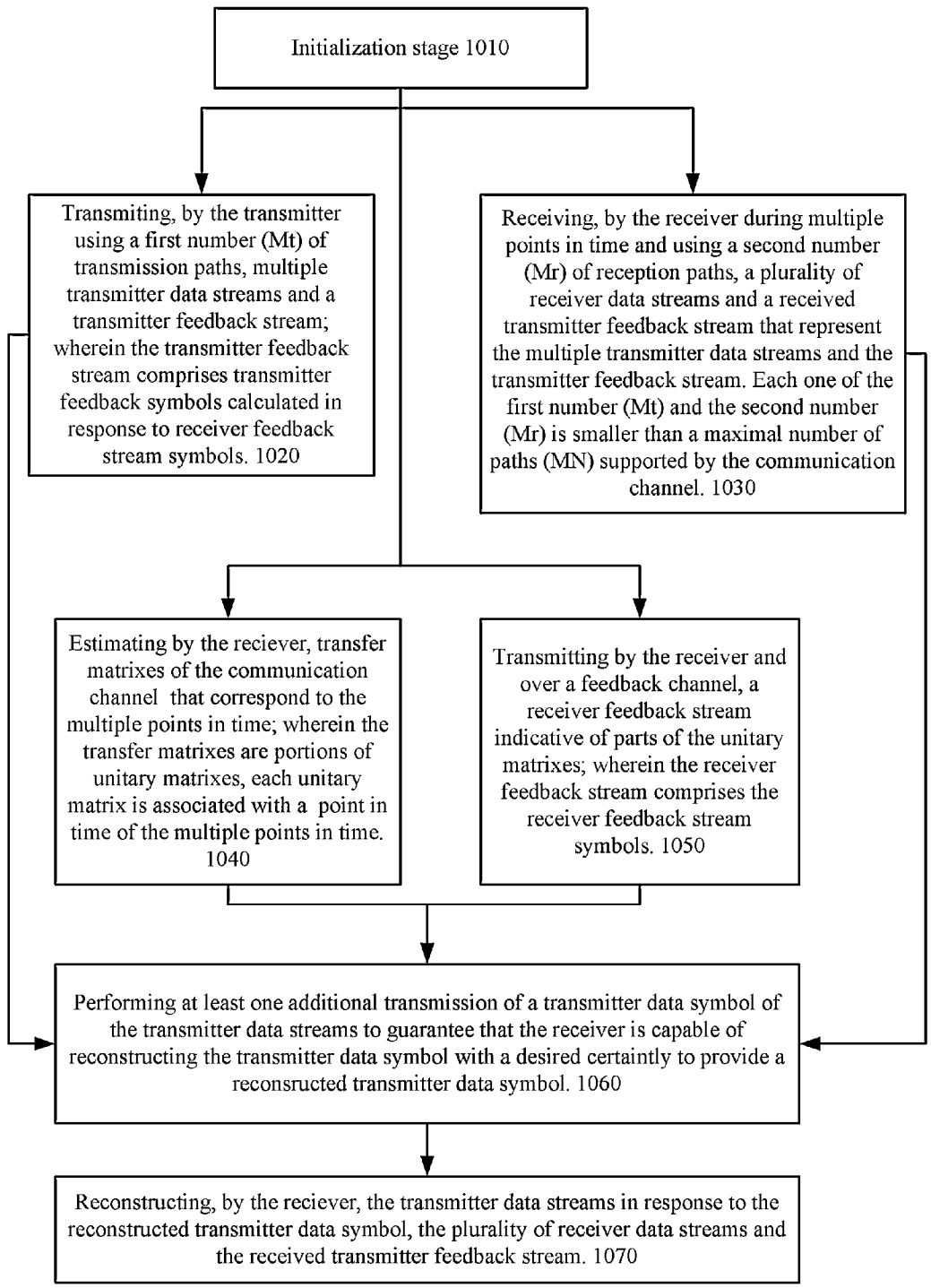
FIG. 10 illustrates a method according to an embodiment of the invention.

FIG. 10 illustrates method 1000 according to an embodiment of the invention.

Method 1000 is used for transmitting information over a communication channel coupled between a transmitter and a receiver. Method 1000 starts by initialization stage 1010. This stage may include transmitting date symbols without feedback.

Initialization stage 1010 may be followed by stages 1020, 1030, 1040 and 1050.

Stage 1020 includes transmitting, by the transmitter using a first number (Mt) of transmission paths, multiple transmitter data streams and a transmitter feedback stream; wherein the transmitter feedback stream comprises transmitter feedback symbols calculated in response to receiver feedback stream symbols.

Stage 1030 includes receiving, by the receiver during multiple points in time and using a second number (Mr) of reception paths, a plurality of received streams that represent the multiple transmitter data streams and the transmitter feedback stream. Each one of the first number (Mt) and the second number (Mr) is smaller than a maximal number of paths (M) supported by the communication channel.

Stage 1040 includes estimating by the receiver, transfer matrixes of the communication channel that correspond to the multiple points in time; wherein the transfer matrixes are portions of unitary matrixes, each unitary matrix is associated with a point in time of the multiple points in time;

Stage 1050 includes transmitting by the receiver and over a feedback channel, a receiver feedback stream indicative of parts of the unitary matrixes; wherein the receiver feedback stream comprises the receiver feedback stream symbols.

Stages 1020, 1030, 140 and 1050 may be followed by stage 1060 of performing at least one additional transmission of a transmitter data symbol of the transmitter data streams to guarantee that the receiver is capable of reconstructing the transmitter data symbol with a desired certainly to provide a reconstructed transmitter data symbol.

Stage 1060 may be followed by stage 1070 of reconstructing, by the receiver, the transmitter data streams in response to the reconstructed transmitter data symbol, the plurality of received streams.

Stages 1020, 1030, 1040 and 1050 may include multiple iterative steps. A transmitter feedback symbol is calculated based upon previously received feedback symbol that in turn reflects a transfer matrix of the communication channel at yet a previous point in time.

The following table provides an example of few iterations of stages 1020-1050.

It is assumed, for simplicity of explanation that:
a. Mt=3, Mr=3, M=4.
b. At any given time slot (represented by index i) the communication channel can be represented by a 3×3 transfer matrix H11i that is a portion of a 4×4 unitary matrix Ui.

$$Ui = \begin{pmatrix} H11i & U12i \\ U21i & U22i \end{pmatrix}$$

c. That the delay (k) between a point in time of a transfer matrix and the reception of the appropriate receiver feedback symbols is 3 time slots.
d. That the transmission of the transmitter data streams end after p time slots.
e. That there is a need to perform additional transmission of the transmitter data symbol during q time slots, wherein q>3.

TABLE 1

| Time slot (index i) | Transmitter | Receiver |
|---|---|---|
| 1 | Transmitts two transmitter data symbols and a default value (for example 0) for the transmitter feedback symbol - as there is no receiver feedback stream symbols yet | Receives three received symbols, estimates and sends through the feedback channel information indicative of a first transfer matrix (as existed at the first time slot) |

TABLE 1-continued

| Time slot (index i) | Transmitter | Receiver |
|---|---|---|
| 2 | Transmitts two transmitter data symbols and a default value (for example 0) for the transmitter feedback symbol - as there is no receiver feedback stream symbols yet | Receives three reveived symbols, estimates and sends through the feedback channel information indicative of a second transfer matrix (as existed at the second time slot). |
| 3 | Transmitts two transmitter data symbols and a default value (for example 0) for the transmitter feedback symbol - as there is no receiver feedback stream symbols yet | Receives the three received symbols, estimates and sends through the feedback channel information indicative of a third transfer matrix (as existed at the third time slot) |
| 4 | Receives first reciever feedback symbols (indicative of the first transfer matrix), calculates first transmitter feedback signal, transmits the first transmitter feedback signal as well as two transmitter data symbols. | Receives the three received symbols, estimates and sends through the feedback channel information indicative of a fourth transfer matrix (as existed at the fourth time slot) |
| j | Receives (j-3)'th reciever feedback symbols (indicative of the (j-3)'th transfer matrix), calculates (j-3)'th transmitter feedback signal, transmits the (j-3)'th transmitter feedback signal as well as two transmitter data symbols. | Receives three received symbols, estimates and sends through the feedback channel information indicative of a j'th transfer matrix (as existed at the j'th time slot) |
| p | Receives (p-3)'th reciever feedback symbols (indicative of the (p-3)'th transfer matrix), calculates (p-3)'th transmitter feedback signal, transmits the (p-3)'th transmitter feedback signal as well as two transmitter data symbols. | Receives three received symbols, estimates and sends through the feedback channel information indicative of a p'th transfer matrix (as existed at the p'th time slot) |
| p + 1 | Receives (p-2)'th reciever feedback symbols (indicative of the (p-2)'th transfer matrix), performs a first additional transmission of the (p-2)'th transmitter data symbols (that were already transmitted). | Receives the received symbols. |
| p + 2 | Receives (p-1)'th reciever feedback symbols (indicative of the (p-1)'th transfer matrix), performs a first additional transmission of the (p-1)'th transmitter data symbols (that were already transmitted). | Receives the received symbols |
| p + 3 | Receives p'th reciever feedback symbols (indicative of the p'th transfer matrix), performs a first additional transmission of the (p)'th transmitter data symbols (that were already transmitted). | Receives the received symbols. |
| P + 3*q-2 | Performing a q'th additional transmission of the (p-2)'th transmitter data symbols | starts to reconstruct the (p-2)'th transmitter data symbols |
| P + 3*q-1 | Performing a q'th additional transmission of the (p-1)'th transmitter data symbols | starts to reconstruct the (p-1)'th transmitter data symbols |
| P + 3*q | Performing a q'th additional transmission of the (p)'th transmitter data symbols | starts to reconstruct the (p)'th transmitter data symbols |

In a recursive way, the receiver reconstructs the (p−2)'th, (p−1)'th and (p)'th data symbols, and then (p−5)'th, (p−4)'th and (p−3)'th data symbols and so on.

In a nut shell, the receiver can reconstruct the transmitter data streams by taking into account the fact that the transfer matrixes are part of a unitary matrix. The reconstruction is described in details in appendixes A and B. The calculation of the transmitted feedback symbols is also described in appendixes A and B.

According to various embodiments of the invention the multiple transmitter data streams and the transmitter feedback stream are transmitted concurrently, number of the transmitter data streams does not exceed Mt+Mr−M, channel may be a wireless communication channel, a wired communication channel, a multimode optic fiber, a multi-core optic fiber and the like.

When using a multimode optic fiber the transmission paths may be implemented by multi-modes of the transmitter. Alternatively, the communication channel may be an optical fiber that has multiple cores and the transmission paths are implemented by the multiple cores.

The receiver feedback stream may include the transfer matrixes of the communication channel during the receiving or may include parts of the unitary matrices that differ from the transfer matrixes of the communication channel during the receiving but facilitate a reconstruction of the transfer matrixes. These parts of the unitary matrixes may be smaller than the transfer matrixes.

Some Theoretical Background

A common model for an optical space-division multiplexing (SDM) system that supports M (m) orthogonal (spatial and polarization) propagation modes per wavelength is as follows. There is a unitary coupling among all transmission modes, allowing describing the transfer matrix as m×m unitary matrix, denoted H, where each entry $h_{ij}$ represents the complex path gain from transmitted mode i to received mode j. It is further assumed that the channel matrix H is a random instantiation drawn uniformly from the ensemble of all M×M (m×m) unitary matrices. In many practical situations not all modes are being addressed, that is, the transmitter can excite Mt≤M ($m_t$≤m) modes and the receiver can coherently extract Mr≤M ($m_r$≤m) modes. Hence, neglecting waveguide nonlinearities and ignoring differential modal delays and mode dependent loses (MDL), the channel can be written as:

$$y = \sqrt{SNR} H_{11} x + z, \quad (1)$$

Where $x \in \mathbb{C}^{m_t}$ is the transmitted signal; $y \in \mathbb{C}^{m_r}$ is the received signal; the additive noise z has i.i.d circularly symmetric complex Gaussian entries $z_i$: $CN(0,1)$, $i=1, \ldots, m_r$; $H_{11}$ is the $m_r \times m_t$ sub-matrix of the transfer matrix which can be defined as $$H = \begin{bmatrix} H_{11} & H_{12} \\ H_{21} & H_{22} \end{bmatrix};$$

$H_{11}$ is further assumed to be known at the receiver; SNR is the average signal-to-noise ratio at each received mode when all channel modes are excited and extracted ($m_r = m_t = m$, or equivalently, when $H_{11} = H$). An equal power constraint on each transmit mode is assumed (which is the common power constraint in optical communication systems), that is, the average signal energy transmitted at each symbol period and from each transmit mode is constrained to be not greater than 1:

$$E[x_i^* x_i] \leq 1 \; \forall i = 1, \ldots, m_t. \quad (2)$$

The theoretical analysis consider two situations: the ergodic case where the transmission is spread over many channel realizations, and the non-ergodic case where the transmission may face any specific channel behavior. The latter case is more realistic as usually the symbol size is shorter than the channel variations. However, it presents a major challenge—how to communicate when the channel conditions are such that the rate cannot be supported since it faded and its capacity is below the rate. This situation is referred to as "outage". The theoretical results we obtained, summarized below, analyze the outage probability, and discovered that there situations where no outage is possible.

Non-Ergodic Channel—Outage Analysis

In the non-ergodic case, the mutual information between the input and output of the channel with specific (randomly drawn) $H_{11}$ is:

$$I(x;y|H_{11}=H_{11}). \quad (3)$$

The receiver knows the realization of $H_{11}$. However, since the channel is unknown at the transmitter, there may be a non-zero probability that the transmission rate is not supported by the channel instantiation. This probability is termed outage probability and is given by $$P_{out}(m_t, m_r, m; R) = Pr[I(x;y|H_{11}) < R], \quad (4)$$

that is, the probability that the capacity of the channel realization is smaller than the transmission rate R (bits/symbol).

It is well known that a circularly symmetric Gaussian zero-mean input distribution maximizes the mutual information of an AWGN channel, so we get $$I(x;y|H_{11}=H_{11}) = \log\det(I_{m_r} + SNR \cdot H_{11} Q H_{11}^\dagger), \quad (5)$$

where Q is the covariance matrix of the transmitted signal and is chosen such that the outage probability is brought to minimum.

Hence, we can write:

$$P_{out}(m_t, m_r, m; R) = \quad (6)$$

$$\inf_{\substack{Q: Q \succeq 0 \\ Q_{ii} \leq 1 \forall i=1,\ldots,m_t}} Pr[\log\det(I_{m_r} + SNR \cdot H_{11} Q H_{11}^\dagger) < R].$$

The outage probability is examined for two cases: $m_t + m_r \leq m$ and $m_t + m_r > m$, where for the second case we show that a strictly zero outage probability is achievable for any transmission rate below $(m_t + m_r - m)\log(1+SNR)$.

The case of $m_t + m_r \leq m$

Let the transmission rate be R=r log(1+SNR) bps/Hz

We have shown theoretically that:

$$P_{out}(m_t, m_r, m; r\log(1+SNR)) = \quad (7)$$

$$K_{m_t,m_r,m}^{-1} \int_B \prod_{i=1}^{\min\{m_t,m_r\}} \lambda_i^{|m_r - m_t|} (1-\lambda_i)^{m-m_r-m_t} \prod_{i<j} (\lambda_i - \lambda_j)^2 d\lambda,$$

where $K_{m_t,m_r,m}$ is a normalizing factor and $$B = \left\{ \begin{array}{l} \lambda: 0 \leq \lambda_1 \leq \ldots \leq \lambda_{\min\{m_t,m_r\}} \leq 1, \\ \prod_{i=1}^{\min\{m_t,m_r\}} (1 + SNR \cdot \lambda_i) < (1+SNR)^r \end{array} \right\}$$

is the set that describes the outage event.

This gives an analytical expression to the outage probability.

The case of $m_t + m_r > m$

Suppose, again, that the transmission rate is R=r log(1+SNR) bps/Hz, with $0 \leq r \leq \min\{m_t, m_r\}$, where the number of addressed modes satisfies $m_t + m_r > m$. We have shown that for $r < m_t + m_r - m$, the outage probability is strictly zero. For $r \geq m_t + m_r - m$ the outage probability satisfies $$P_{out}(m_t, m_r, m; r\log(1+SNR)) = P_{out}(m - m_r, m - m_t, m; (r - (m_t + m_r - m))\log(1+SNR)) \quad (8)$$

where the right hand side is given by Equation (7).

3. System and Method for Zero Outage with Channel State Feedback

We now present the new communication scheme for $m_r \times m_t$ MIMO channel, where $m_t + m_r > m$. By using simple manipulations, the scheme exploits a (delayed) feedback system to complete the rest $m - \max\{m_t, m_r\}$ singular values to 1. Thus the channel is transformed into $m_t + m_r - m$ independent SISO channels, supporting $m_t + m_r - m$ streams (degrees of freedom) with zero outage probability. Furthermore, the scheme provide means for simple decoding—decoding used in single-input single-output (SISO) channel-avoiding the need for complicated MIMO processing The principles of the scheme are described using the following simple example:

Suppose there are 4 modes in the fiber. Let the transmitter and receiver address 3 out of the 4 available modes, i.e., the transform matrix is 3×3 sub-matrix of 4×4 unitary matrix. According to the analysis above, two degrees of freedom can be communicated to the receiver with zero outage probability. Now, suppose only for the simplicity of the example that the channel instantiation changes independently at each channel use and let $$H^{(i)} = \begin{bmatrix} H_{11}^{(i)} & H_{12}^{(i)} \\ H_{21}^{(i)} & H_{22}^{(i)} \end{bmatrix};$$

be the unitary matrix realization at channel use i.

In addition, suppose that at each channel use i the transmitter has perfect knowledge of $H_{21}^{(i-1)}$, the $(m-m_r) \times m_t$ sub-matrix realization of $H^{(i-1)}$. Let the transmitter excite the following three entries vector at each channel use i=1, ..., n:

$$x^{(i)} = \begin{bmatrix} x_1^{(i)} \\ x_2^{(i)} \\ H_{21}^{(i-1)} x^{(i-1)} \end{bmatrix},$$

where we define $x^{(0)}$ to be a vector of zeros. Hence, in each channel use the transmitter communicates two new information bearing symbols and a linear combination of the previous signal.

The received signal at each channel use i=1, ..., n is a. $y^{(i)} = \sqrt{SNR} H_{11}^{(i)} x^{(i)} + z^{(i)}$.

Now, since $H_{11}^{(i)}$ is assumed to be known at the receiver, $H_{21}^{(i)}$ can be also computed using the orthonormality of $H^{(i)}$'s columns. We further assume that the receiver has as a side information the following noisy measure of $x^{(n)}$ $$y_{si}^{(n)} = \sqrt{SNR} H_{21}^{(n)} x^{(n)} + z_{si}^{(n)},$$

where $z_{si}^{(n)}:CN(0,1)$ is independent of $z^{(n)}$.

Thus, the receiver can construct the following vector $$y^{(n)} = [H_{11}^{(n)\dagger} \; H_{21}^{(n)\dagger}] \cdot \begin{bmatrix} y^{(n)} \\ y_{si}^{(n)} \end{bmatrix}$$

which satisfies $$y^{(n)} = \begin{bmatrix} y_1^{(n)} \\ y_2^{(n)} \\ y_3^{(n)} \end{bmatrix} = \sqrt{SNR}\, x^{(n)} + z^{(n)}$$

$$= \sqrt{SNR} \begin{bmatrix} x_1^{(n)} \\ x_2^{(n)} \\ H_{21}^{(n-1)} x^{(n-1)} \end{bmatrix} + z^{(n)},$$

where $z^{(n)}$ has i.i.d. CN(0,1) entries.

Letting $y_3^{(n)}$ be $y_{si}^{(n-1)}$, the side information for channel use n−1 and repeating this procedure for i=n−1 to 1 result two streams of measures $$\begin{bmatrix} y_1^{(1)} \\ y_2^{(1)} \end{bmatrix}, \begin{bmatrix} y_1^{(2)} \\ y_2^{(2)} \end{bmatrix}, \dots, \begin{bmatrix} y_1^{(n)} \\ y_2^{(n)} \end{bmatrix}.$$

Thus, we get two information streams that as if were communicated through two independent SISO channels, each with signal-to-noise ratio SNR (and therefore with zero outage probability).

Note that the scheme is feasible if the side information after channel use n is being conveyed by the transmitter through a negligible number of channel uses (with respect to n) and if a feedback system is employed to communicate $H_{21}^{(i)}$ to the transmitter after each channel use i We now formalize the scheme for any $m_r \times m_t$ channel that satisfies $m_t + m_r > m$.

Let $$H^{(i)} = \begin{bmatrix} H_{11}^{(i)} & H_{12}^{(i)} \\ H_{21}^{(i)} & H_{22}^{(i)} \end{bmatrix}$$

be the unitary matrix realization at channel use i.

We assume perfect knowledge of $H_{11}^{(i)}$ at the receiver and a noiseless feedback communication with a delay of k channel uses. Since $H^{(i)}$ unitary, $H_{21}^{(i)}$ can be computed from $H_{11}^{(i)}$ and we assume that the receiver noiselessly communicates $H_{21}^{(i)}$ to the transmitter. Note that $H_{21}^{(i)}$ completes $H_{11}^{(i)}$'s columns into orthonormal columns, thus for $m_t + m_r - m > 1$ and certain matrix instantiations, the computed $H_{21}^{(i)}$ is not unique and can be chosen wisely (see Remark 4 below).

Now, the transmitter excites the following signal from the addressed modes at each channel use i=1, ..., nk:

$$x^{(i)} = \begin{bmatrix} x_1^{(i)} \\ \vdots \\ x_{m_t+m_r-m}^{(i)} \\ H_{21}^{(i-k)} x^{(i-k)} \end{bmatrix},$$

where $x^{(i)}$, for i=−(k−1), ..., 0, is a vector of zeros.

That is, the transmitter conveys $m_t + m_r - m$ new information bearing symbols and $H_{21}^{(i-k)} x^{(i-k)}$, a linear combination of the signal that was transmitted k channel uses before. Note that since H unitary, the power constraint is left satisfied.

Now, assume the transmitter communicates to the receiver the following measures $$y_{si}^{(i)} = \sqrt{SNR} H_{21}^{(i)} x^{(i)} + z_{si}^{(i)} \; \forall i=(n-1)k+1, \dots, nk,$$

That is, noisy measures of the last k transmitted signals, where $z_{si}^{(i)}$ are independent with i.i.d. CN(0,1) entries. As was shown above, the receiver can use the side information to get $$\begin{bmatrix} y_1^{(i)} \\ \vdots \\ y_{m_t}^{(i)} \end{bmatrix} = \sqrt{SNR}\, x^{(i)} + z^{(i)}$$

$$= \sqrt{SNR} \begin{bmatrix} x_1^{(i)} \\ \vdots \\ x_{m_t+m_r-m}^{(i)} \\ H_{21}^{(i-k)} x^{(i-k)} \end{bmatrix} + z^{(i)}.$$

for all $i=(n-1)k+1, \ldots, nk$, where $z^{(i)}$ are independent with i.i.d $CN(0,1)$ entries.

Letting $$\begin{bmatrix} y_{m_t+m_r-m+1}^{(i)} \\ \vdots \\ y_{m_t}^{(i)} \end{bmatrix} = \sqrt{SNR} \, H_{21}^{(i-k)} x^{(i-k)} + \begin{bmatrix} z_{m_t+m_r-m+1}^{(i)} \\ \vdots \\ z_{m_t}^{(i)} \end{bmatrix}$$

be the side information $y_{si}^{(i-k)}$ measures for channel use $i-k$, for all $i=(n-1)k+1, \ldots, nk$, and repeating this procedure for $i=(n-1)k$ till $i=1$ results in $m_t+m_r-m$ independent streams of measures $$\begin{bmatrix} y_1^{(1)} \\ \vdots \\ y_{m_t+m_r-m}^{(1)} \end{bmatrix}, \ldots, \begin{bmatrix} y_1^{(nk)} \\ \vdots \\ y_{m_t+m_r-m}^{(nk)} \end{bmatrix}.$$

Thus, having noisy measures of the last k symbols, $y_{si}^{((n-1)k+1)}, \ldots, y_{si}^{(nk)}$, the receiver can construct $m_t+m_r-m$ SISO channels, each with a signal-to-noise ratio SNR. Assuming the transmitter can convey these measures using a neglectable number of channel uses (with respect to n, see Remark 3 below), the scheme allows approaching the rate $(m_t+m_r-m) \log(1+SNR)$ with zero outage probability.

Remark 1 (Delayed Feedback): The scheme exploits a noiseless feedback system to communicate a (possibly) outdated information—the channel realization in previous channel uses. Thus, the feedback is not required to be fast, that is, no limitations on the delay time k.

However, for non-ergodic systems with a short delay time, the feedback may carry information about the current channel realization. Thus, the transmitter can exploit the up-to-date feedback to use more efficient schemes (e.g., water filling). Nevertheless, for systems with a long delay time (e.g., relatively long distance optical fibers), the channel can be regarded as non-ergodic however with an outdated feedback. In these cases our scheme efficiently achieves zero outage probability.

Remark 2 (Simple Decoding): The scheme constructs $m_t+m_r-m$ independent streams of measures, each with signal-to-noise SNR. This allows the decoding stage to be simple, where a SISO channel decoder can be used, removing the need for further MIMO signal processing.

Remark 3 (Side Information Measures): Given noisy measures of the last k transmitted signals, $$y_{si}^{(i)} = \sqrt{SNR} H_{21}^{(i)} x^{(i)} + z_{si}^{(i)}, \forall i = nk-(k-1), \ldots, nk,$$

where $z_{si}^{(i)}$ are independent with i.i.d. $CN(0,1)$ entries, the scheme can construct $m_t+m_r-m$ independent streams of measures.

Thus, the transmitter has to convey $H_{21}^{(i)} x^{(i)}$, for each $i=nk-(k-1), \ldots, nk$, such that the receiver has extracted a vector of noisy measures with signal-to-noise ratio that is not smaller than SNR. This is feasible with a finite number of channel uses. For example, the repetition scheme can be used to convey these measures, each with a signal-to-noise ratio that is at least SNR. Suppose each $H_{21}^{(i)} x^{(i)}$ is conveyed to the receiver within $N_{si}$ channel uses (e.g., for the repetition scheme $N_{si}=m_t(m-m_r)$). By taking large enough n (with respect to $N_{si}$) one can approach the rate $(m_t+m_r-m) \log(1+SNR)$.

The repetition scheme can convey the $m-m_r$ entries of $H_{21}^{(i)} x^{(i)}$ with $N_{si}=m_t(m-m_r)$ channel uses. In each channel use a single entry is transmitted through a single mode (while all other modes are zero) in a way that all entries are transmitted through all modes.

Remark 4 (The Uniqueness of $H_{21}^{(i)}$): The scheme can be further improved to support even an higher data rate with outage probability zero. For example, the last $m-m_r$ entries of the transmitted signal at the first k channel uses can be used to excite information bearing symbols instead of the zeros symbols. Furthermore, as was mentioned above, when $m_t+m_r-m>1$, $H_{21}^{(i)}$ is not unique; there are many $(m-m_r) \times m_t$ matrices that complete the columns of $H_{11}^{(i)}$ into orthonormal columns. Thus, the receiver can choose $H_{21}^{(i)}$ to be the one with the largest number of zeros rows. Now, at time $i+k$ the transmitter excites $m_t+m_r-m$ new symbols and $H_{21}^{(i)} x^{(i)}$, a retransmission of $x^{(i)}$, the transmitted signal at time i. With an appropriate choice of $H_{21}^{(i)}$, $H_{21}^{(i)} x^{(i)}$ contains entries that are zero. Instead, these entries can contain additional new information bearing symbols.

APPENDIX A

Mathematical Analysis of the Jacobi Mimo Channel

In our work we analyze the channel with respect to the number of addressed paths in the transmitter and receiver. We start by defining the system model and presenting the channel statistics in Section 2. An interesting transition threshold is revealed—when the number of addressed paths is large enough the statistics of the problem changes. Using this new knowledge we give analytic expressions to the ergodic capacity in Section 3. In Section 4 we analyze the outage probabilities in the non-ergodic channel and show that for large enough number of addressed paths a strictly zero outage probability is obtainable (for certain transmission rates). We further present a new communication scheme that achieves the highest rate possible with no outage. Section 5 discuss the diversity-multiplexing tradeoff of the channel where we show an absorbing difference in the maximum diversity gain between the Rayleigh fading and the Jacobi optical channels. Section 6 summarizes and discuss the results.

2 System Model and Channel Statistics

We consider an optical space-division multiplexing (SDM) system that supports m orthogonal (spatial and polarization) propagation modes per wavelength. We assume a unitary coupling among all transmission modes, allowing us to describe the transfer matrix as $m \times m$ unitary matrix, denoted H, where each entry $h_{ij}$ represents the complex path gain from transmitted mode i to received mode j. We further assume a uniformly distributed unitary coupling, that is, the channel matrix H is assumed to be a random instantiation drawn uniformly from the ensemble of all $m \times m$ unitary matrices. However, we consider the case where not all modes are being addressed, that is, the transmitter can excite $m_t \leq m$ modes and the receiver can coherently extract $m_r \leq m$ modes. Hence, neglecting waveguide nonlinearities and ignoring differential modal delays and mode dependent loses (MDL), the channel can be written as:

$$y = \sqrt{SNR} H_{11} x + z, \quad (1)$$

where $x \in \mathbb{C}^{m_t}$ is the transmitted signal; $y \in \mathbb{C}^{m_r}$ is the received signal; the additive noise z has i.i.d circularly symmetric complex Gaussian entries $z_i : CN(0,1)$, $i=1, \ldots, m_r$.

$H_{11}$ is the $m_r \times m_t$ sub-matrix of the transfer matrix which can be defined as $$H = \begin{bmatrix} H_{11} & H_{12} \\ H_{21} & H_{22} \end{bmatrix};$$

$H_{11}$ is further assumed to be known at the receiver; SNR is the average signal-to-noise ratio at each received mode when all channel modes are excited and extracted ($m_r = m_t = m$, or equivalently, when $H_{11} = H$). In this paper we assume an equal power constraint on each transmit mode (which is the common power constraint in optical communication systems), that is, the average signal energy transmitted at each symbol period and from each transmit mode is constrained to be not greater than 1:

$$E[x_i^* x_i] \leq 1 \ \forall i=1, \ldots, m_t. \quad (2)$$

Now, to be able to analytically analyze this channel we need to understand the statistics of the channel matrix $H_{11}$. To that end we will briefly go over three classical random matrix ensembles, the Gaussian (Hermite), Wishart (Laguerre) and Jacobi (MANOVA—multivariate analysis of variance) ensembles. We limit the discussion to complex ensembles.

Definition 1 (Gaussian Ensemble) G(m,n) is m×n matrix of i.i.d complex entries distributed as CN(0,1).

The following ensembles are constructed from the Gaussian ensemble as follows.

Definition 2 (Wishart Ensemble) W(m,n), where m≥n, is n×n Hermitian matrix which can be constructed as $A^\dagger A$, where A is G(m,n).

Definition 3 (Jacobi Ensemble) $J(m_1, m_2, n)$, where $m_1, m_2 \geq n$, is n×n Hermitian matrix which can be constructed as $A(A+B)^{-1}$, where A and B are $W(m_1, n)$ and $W(m_2, n)$, respectively.

The first two ensembles relate to wireless communication. The Gaussian ensemble is the most common statistical model for the wireless MIMO channel and the eigenvalues of the Wishart ensemble share the same distribution with the squared singular values of the channel matrix. We claim here that the third classical ensemble, the Jacobi ensemble, completes the applications of random matrix ensembles in communication by relating to the discussed under-addressed channel.

It was shown that there is a deep connection between the eigenvalues of a Jacobi matrix and the (squared) singular values of a sub-matrix of Haar-distributed unitary matrix. More precisely, let $$U = \begin{bmatrix} U_{11} & U_{12} \\ U_{21} & U_{22} \end{bmatrix}$$

be m×m Haar-distributed unitary matrix (that is, drawn uniformly from the ensemble of all m×m unitary matrices), where $U_{11}$ is the $m_r \times m_t$ sub-matrix of U. If $m_r \geq m_t$ and $m - m_r \geq m_t$, the eigenvalues of $U_{11}^\dagger U_{11}$ share the same distribution with the eigenvalues of a Jacobi matrix $J(m_r, m-m_r, m_t)$.

We shall now present the statistics of the eigenvalues of $H_{11}^\dagger H_{11}$ using above.

2.1 The Case of $m_t + m_r \leq m$

For $H_{11}$ with $m_r \geq m_t$ and $m - m_r \geq m_t$ (which equals $m_t + m_r \leq m$), according to above arguments, the eigenvalues of $H_{11}^\dagger H_{11}$ follow the Jacobi ensemble $J(m_r, m-m_r, m_t)$. For $m_r < m_t$, since also $H^\dagger$ is Haar distributed, the eigenvalues of $H_{11} H_{11}^\dagger$ share the same distribution with the eigenvalues of the Jacobi ensemble $J(m_t, m-m_t, m_r)$. Since $A^\dagger A$ and $AA^\dagger$ have the same non-zeros eigenvalues, we can say that the statistics of the non-zero eigenvalues of $H_{11}^\dagger H_{11}$ follow the Jacobi ensemble, $$J(m_{max}, m-m_{max}, m_{min}). \quad (3)$$

where $m_{max} = \max\{m_t, m_r\}$ and $m_{min} = \min\{m_t, m_r\}$.

The joint probability density function (pdf.) of the ordered eigenvalues $0 \leq \lambda_1 \leq \ldots \leq \lambda_{m_{min}} \leq 1$, of the Jacobi ensemble (3) is well know:

$$f_\lambda(m_t, m_r, m; \lambda_1, \ldots, \lambda_{min\{m_t,m_r\}}) = K_{m_t,m_r,m}^{-1} \prod_{i=1}^{min\{m_t,m_r\}} \lambda_i^{|m_r - m_t|} (1-\lambda_i)^{m-m_r-m_t} \prod_{i<j} (\lambda_i - \lambda_j)^2,$$

Where $K_{m_t,m_r,m}$ is a normalizing constant. Thus, the joint pdf. of the ordered non-zero eigenvalues of $H_{11}^\dagger H_{11}$, for the case of $m_t + m_r \leq m$, follows (4).

2.2 The Case of $m_t + m_r > m$

When the sum of transmitted and received addressed modes, $m_t + m_r$, is larger than the total available modes, m, the statistics of the singular values change. Having in mind the orthonormality of H's columns, one can think of $m_t + m_r > m$ as a transition threshold in which the sub-matrix $H_{11}$ is large enough with respect to H to change the singularity statistics. The following Lemma provides the joint pdf. of $H_{11}$'s singular values, showing that with probability 1 there are $m_t + m_r - m$ singular values which are 1.

Lemma 1 suppose $$H = \begin{bmatrix} H_{11} & H_{12} \\ H_{21} & H_{22} \end{bmatrix}$$

is Haar distributed m×m unitary matrix, where $H_{11}$ is $m_r \times m_t$ matrix and $m_t + m_r > m$. by denoting $m_{max} = \max\{m_t, m_r\}$ and $m_{min} = \min\{m_t, m_r\}$, $H_{11}^\dagger H_{11}$ has:

a. $m_t + m_r - m$ eigenvalues which are 1.
b. $m_t - m_{min}$ zero eigenvalues.
c. $m - m_{max}$ eigenvalues which are equal to the non-zeros eigenvalues of $H_{22}^\dagger H_{22}$, thereby are distributed according to the Jacobi ensemble $J(m - m_{min}, m_{min}, m - m_{max})$.

Proof. We denote by $\lambda_1^{(kj)}, \ldots, \lambda_{m_t}^{(kj)}$ the eigenvalues of $H_{kj}^\dagger H_{kj}$ for (k, j)=(1,1),(2,1). We further let $\tilde{\lambda}_1^{(kj)}, \ldots, \tilde{\lambda}_{m-m_r}^{(kj)}$ be the eigenvalues of $H_{kj}^\dagger H_{kj}$ for (k, j)=(2,1),(2,2). Since H unitary we can write $$H_{11}^\dagger H_{11} + H_{21}^\dagger H_{21} = I_{m_t}, \quad (5)$$

where here and throughout the rest of the paper we denote by $I_n$ the n×n identity matrix.

Thus, we get $$\lambda_i^{(11)} = 1 - \lambda_i^{(21)} \ \forall i=1, \ldots, m_t. \quad (6)$$

In the same manner we have $H_{21}H_{21}^\dagger + H_{22}H_{22}^\dagger = I_{m-m_r}$, thus $$\tilde{\lambda}_i^{(21)} = 1 - \tilde{\lambda}_i^{(22)} \quad \forall i=1,\ldots,m-m_r. \tag{7}$$

Now, $H_{22}$ is $(m-m_r) \times m_t$ matrix. Since $m-m_r < m_t$, $H_{22}^\dagger H_{22}$ has (at least) $m_t+m_r-m$ zero eigenvalues; thus, by applying (6), $H_{11}^\dagger H_{11}$ has (at least) $m_t+m_r-m$ eigenvalues which are 1. Since $H_{kj}H_{kj}^\dagger$ and $H_{kj}^\dagger H_{kj}$ share the same non-zero eigenvalues we can combine (6) and (7) to conclude that the additional $m-m_{max}$ non-zeros eigenvalues of $H_{11}^\dagger H_{11}$ are equal to the $m-m_{max}$ eigenvalues of $H_{22}^\dagger H_{22}$.

Above arguments hold true for any unitary matrix, in particular for any realization of the transfer matrix H. Noting that $H_{22}$ is $(m-m_r) \times (m-m_t)$ matrix and therefore applies to the first case $((m-m_r)+(m-m_t) \leq m)$, completes the proof.

3 Ergodic Channel

In this section we assume that the channel is rapidly changing or the signal samples the entire channel statistics. The channel is assumed to be known at the receiver but not at the transmitter. In this case, the mutual information between the input and output of the channel is $$E[I(x;y|H_{11}=H_{11})], \tag{8}$$

where the expectation is over $H_{11}$. Since the channel is fast fading, i.e. the signal samples the entire channel statistics, we average over the channel matrix distribution.

It is well known that a circularly symmetric Gaussian zero-mean input distribution achieves the capacity of this channel, which is given by $$C(m_t, m_r, m; SNR) = \max_{\substack{Q: Q \succeq 0 \\ Q_{ii} \leq 1 \forall i=1,\ldots,m_t}} E[\log\det(I_{m_r} + SNR \cdot H_{11}QH_{11}^\dagger)], \tag{9}$$

Where Q is the covariance matrix of the transmitted signal and is chosen to maximize the average mutual information. The following theorem shows that the identity matrix achieves capacity. We note that because of the equal power constraint per-mode, the capacity is symmetric in $m_t$ and $m_r$.

Theorem 1 The ergodic capacity of the channel is achieved when the transmitted signal is circularly symmetric Gaussian zero-mean with covariance $I_{m_t}$ and is given by $$C(m_t, m_r, m; SNR) = E[\log\det(I_{m_r} + SNR \cdot H_{11}^\dagger H_{11})]. \tag{10}$$

Proof. The capacity in (9) satisfies:

$$C(m_t, m_r, m; SNR) = \max_{\substack{Q: Q \succeq 0 \\ Q_{ii} \leq 1 \forall i=1,\ldots,m_t}} E[\log\det(I_{m_r} + SNR \cdot H_{11}QH_{11}^\dagger)] \tag{11}$$

$$\leq \max_{\substack{Q: Q \succeq 0 \\ Q_{ii} \leq 1 \forall i=1,\ldots,m_t}} E[\log\det(I_{m_r} + SNR \cdot H_{11}QH_{11}^\dagger)]. \tag{12}$$

It was shown that $Q=I_{m_t}$ maximizes (12) for any distribution of $H_{11}$ that is invariant under unitary permutation. Since $Q=I_{m_t}$ satisfies also $Q_{ii} \leq 1 \forall i=1,\ldots,m_t$ we can write $$C(m_t, m_r, m; SNR) = E[\log\det(I_{m_r} + SNR \cdot H_{11}H_{11}^\dagger)], \tag{13}$$

Where it can be easily shown that the distribution of $H_{11}$ is invariant under unitary permutation since H is Haar-distributed, that is, invariant under unitary permutation.

To complete the proof we use $\det(I_{m_r} + SNR \cdot H_{11}H_{11}^\dagger) = \log\det(I_{m_t} + SNR \cdot H_{11}^\dagger H_{11})$.

3.1 The Case of $m_t+m_r \leq m$

The following theorem gives an analytical expression to the ergodic capacity for $m_t+m_r \leq m$. Using the joint pdf. of the eigenvalues of the Jacobi ensemble we associate the ergodic capacity with the Jacobi polynomials.

Theorem 2 The ergodic capacity, for $m_t+m_r \leq m$, satisfies $$C(m_t, m_r, m; SNR) = \tag{14}$$

$$\frac{1}{m_{min}} \sum_{k=1}^{m_{min}} b_{k,\alpha,\beta}^{-1} \int_0^1 \log(1 + SNR \cdot \lambda)(P_k^{(\alpha,\beta)}(1-2\lambda))^2 \lambda^\alpha (1-\lambda)^\beta d\lambda,$$

where we denote $m_{min} = \min\{m_t, m_r\}$, $\alpha = |m_r - m_t|$, $\beta = m - m_t - m_r$, $$b_{k,\alpha,\beta} = \frac{1}{2k+\alpha+\beta+1} 2k + \alpha + \beta_k 2k + \alpha + \beta_{k+\alpha}^{-1}.$$

and $P_k^{(\alpha,\beta)}(x)$ are the Jacobi polynomials $$P_k^{(\alpha,\beta)}(x) = \frac{(-1)^k}{2^k k!} (1-x)^{-\alpha}(1+x)^{-\beta} \frac{d^k}{dx^k}[(1-x)^{k+\alpha}(1+x)^{k+\beta}].$$

Proof. See Appendix 7.

3.2 The Case of $m_t+m_r > m$

Here we use Lemma 1 to compute the ergodic capacity:

Theorem 3 The ergodic channel capacity, in case $m_t+m_r > m$, is given by $C(m_t,m_r,m;SNR) = (m_t+m_r-m) \cdot C(1,1,1;SNR) + C(m-m_r,m-m_t,m;SNR)$, where $C(1,1,1;SNR)$ is the SISO channel capacity $C(1,1,1;SNR) = \log(1+SNR)$ and $C(m-m_r, m-m_t, m; SNR)$ is given by Theorem 2—we define $C(0,m-m_t,m;SNR) = C(m-m_r,0,m;SN) = 0$.

Proof. Let $$H = \begin{bmatrix} H_{11} & H_{12} \\ H_{21} & H_{22} \end{bmatrix}$$

be the m×m unitary coupling matrix of the channel, where $H_{11}$ is the $m_r \times m_t$ coupling matrix between the addressed modes.

By Theorem 1 the ergodic capacity is $$C(m_t, m_r, m; SNR) = E[\log\det(I_{m_t} + SNR \cdot H_{11}^\dagger H_{11})] \tag{15}$$

$$= E\left[\sum_{i=1}^{\min\{m_t,m_r\}} \log(1 + SNR \cdot \lambda_i)\right]. \tag{16}$$

Where $\lambda_1,\ldots,\lambda_{\min\{m_t,m_r\}}$ are the non-zeros eigenvalues of $H_{11}^\dagger H_{11}$. According to Lemma 1, $m_t+m_r-m$ eigenvalues are 1 where the others are equal to the non-zeros eigenvalues of $H_{22}^\dagger H_{22}$.

Thus, we can write:

$$C(m_t,m_r,m;SNR) = (m-m_r-m_t)\log(1+SNR) + E[\log\det(I_{m-m_t} + SNR \cdot H_{22}^\dagger H_{22})]. \tag{17}$$

We finish by reminding that the capacity of the discussed channel is symmetric in the number of transmitted and received modes, i.e., $C(m-m\_t, m-m\_r, m; SNR) = C(m-m\_r, m-m\_t, m; SNR)$.

Theorem 3 suggests that the ergodic capacity, for the case of $m_t > m_r > m$, is as if the channel was composed of $m_t + m_r - m$ parallel SISO channels and a single MIMO channel of $m - m_r$ transmit modes and $m - m_t$ received modes. Note, that an $(m - m_r) \times (m - m_t)$ system satisfies $(m - m_r) + (m - m_t) \leq m$, therefore its capacity is given by Theorem 2. Thus, the ergodic capacity can be viewed as the sum of $\min(m_t + m_r - m, 0)$ SISO channel capacities and a residual MIMO capacity.

4 Non-Ergodic Channel

In this section we assume that the channel is flat fading, i.e. the channel matrix is drawn randomly but is held fixed for a relatively long period of time. The channel is assumed to be known at the receiver but not at the transmitter. In this case, the mutual information between the input and output of the channel is $$I(x;y|H_{11} = H_{11}). \tag{18}$$

Since $H_{11}$ is independent of the channel input x and the receiver knows the realization of $H_{11}$, the mutual information is conditioned on the channel instantiation. However, in contrast to the ergodic channel, the channel realization is held fixed, i.e. the mutual information is assumed to be fixed for the entire transmission period. Since the channel is unknown at the transmitter, there may be a non-zero probability that the transmission rate is not supported by the channel instantiation. This probability is termed outage probability and is given by $$P_{out}(m_t, m_r, m; R) = Pr[I(x;y|H_{11}) < R], \tag{19}$$

That is, the probability that the capacity of the channel realization is smaller than the transmission rate R (bits/symbol).

It is well known that a circularly symmetric Gaussian zero-mean input distribution maximizes the mutual information of an AWGN channel, so we get $$I(x;y|H_{11} = H_{11}) = \log\det(I_{m_r} + SNR \cdot H_{11} Q H_{11}^\dagger), \tag{20}$$

Where Q is the covariance matrix of the transmitted signal and is chosen such that the outage probability is brought to minimum. Hence, we can write $$P_{out}(m_t, m_r, m; R) = \inf_{\substack{Q:Q \geq 0 \\ Q_{ii} \leq 1 \forall i=1,\ldots,m_t}} Pr[\log\det(I_{m_r} + SNR \cdot H_{11} Q H_{11}^\dagger) < R]. \tag{21}$$

In the first parts of this section we examine the outage probability for $m_t + m_r \leq m$ and $m_t + m_r > m$, where for the second case we show that a strictly zero outage probability is achievable for any transmission rate below $(m_t + m_r - m)\log(1 + SNR)$. In the last part we present a new communication scheme that exploits a (delayed) feedback system to transmit at a rate arbitrarily close to $(m_t + m_r - m)\log(1 + SNR)$ with zero outage probability.

4.1 The Case of $m_t + m_r \leq m$

To simplify calculations we take the covariance matrix to be the identity matrix. We note that at high SNR the outage probability satisfies $$P_{out}(m_t, m_r, m; R) = Pr[\log\det(I_{m_r} + SNR \cdot H_{11}^\dagger H_{11}) < R], \tag{22}$$

Thus, $Q = I_{m_t}$ is a reasonable choice for the high SNR regime. Here and throughout the rest of the paper we use $\doteq$ to denote exponential equality, i.e., $f(SNR) \doteq SNR^d$ $$\text{denote } \lim_{SNR \to \infty} \frac{\log f(SNR)}{\log SNR} = d. \tag{23}$$

Now, by letting the transmission rate be $R = r \log(1 + SNR)$ bps/Hz

We can write:

$$P_{out}(m_t, m_r, m; r\log(1 + SNR))B \tag{24}$$

$$Pr[\log\det(I_{m_t} + SNR \cdot H_{11}^\dagger H_{11}) < r\log(1 + SNR)]$$

$$= Pr\left[\prod_{i=1}^{\min\{m_t, m_r\}} (1 + SNR \cdot \lambda_i) < (1 + SNR)^r\right]$$

For any $0 \leq r \leq \min\{m_t, m_r\}$, where $\lambda_1 \leq \ldots \leq \lambda_{\min\{m_t, m_r\}}$ are the ordered non-zeros eigenvalues of $H_{11}^\dagger H_{11}$.

We can now use the joint pdf. of the ordered eigenvalues of the relevant Jacobi ensemble to compute (24):

$$P_{out}(m_t, m_r, m; r\log(1 + SNR))BK_{m_t, m_r, m}^{-1} \tag{25}$$

$$\int_B \prod_{i=1}^{\min\{m_t, m_r\}} \lambda_i^{|m_r - m_t|}(1 - \lambda_i)^{m - m_r - m_t} \prod_{i<j} (\lambda_i - \lambda_j)^2 d\lambda,$$

Where $K_{m_t, m_r, m}$ is a normalizing factor and $$B = \left\{ \lambda : 0 \leq \lambda_1 \leq \ldots \leq \lambda_{\min\{m_t, m_r\}} \leq 1, \prod_{i=1}^{\min\{m_t, m_r\}} (1 + SNR \cdot \lambda_i) < (1 + SNR)^r \right\}$$

is the set that describes the outage event.

This gives an analytical expression to the outage probability.

4.2 The Case of $m_t + m_r > m$

Since here the distribution of the singular values of $H_{11}$ changes, we use Lemma 1 to compute the outage probability:

Theorem 4 Suppose the transmission rate is $R = r \log(1 + SNR)$ bps/Hz, with $0 \leq r \leq \min\{m_t, m_r\}$, where the number of addressed modes satisfies $m_t + m_r > m$. For $r < m_t + m_r - m$, the outage probability is strictly zero.

For $r \geq m_t + m_r - m$ the outage probability satisfies $$P_{out}(m_t, m_r, m; r\log(1 + SNR)) = P_{out}(m - m_r, m - m_t, m; (r - (m_t + m_r - m))\log(1 + SNR)) \tag{26}$$

where the right hand side is given by Equation (25).

Proof. Let $$H = \begin{bmatrix} H_{11} & H_{12} \\ H_{21} & H_{22} \end{bmatrix}$$

be the m×m unitary coupling matrix of the channel, where $H_{11}$ is the $m_r \times m_t$ coupling matrix between the addressed modes.

]By (24) the outage probability is $$P_{out}(m_t, m_r, m; r\log(1 + SNR)) = \quad (27)$$
$$Pr\left[\prod_{i=1}^{min\{m_t,m_r\}} (1 + SNR \cdot \lambda_i) < (1 + SNR)^r\right],$$

Where $\lambda_1 \leq \ldots \leq \lambda_{min\{m_t,m_r\}}$ are the ordered non-zeros eigenvalues of Applying Lemma 1 we get:

$$P_{out}(m_t, m_r, m; r\log(1 + SNR)) = \quad (28)$$
$$Pr\left[\prod_{i=1}^{m-max\{m_t,m_r\}} \left(1 + SNR \cdot \tilde{\lambda}_i\right) < (1 + SNR)^{r-(m_t+m_r-m)}\right],$$

Where $\tilde{\lambda}_1 \leq \ldots \leq \tilde{\lambda}_{m-max\{m_t,m_r\}}$ are the ordered non-zeros eigenvalues of $H_{22}^\dagger H_{22}$. If $r<m_t+m_r-m$, this probability is zero. Otherwise, the right hand is the outage probability in a system with $m-m_t$ and $m-m_r$ addressed modes at the transmitter and receiver, correspondingly, with a transfer matrix $H_{22}$.

We finish by reminding that the outage probability is symmetric in the number of transmitted and received modes, i.e., $P_{out}(m-m\_t,m-m\_r,m;R)=P_{out}(m-m\_r,m-m\_t,m;R)$.

Note that $(m-m_r)+(m-m_t)\leq m$ for $m_t+m_r>m$, thus the right hand side of (26) is given by (25) and the outage probability is well defined. Thus Theorem 4 states that one can transmit r degrees of freedom, where $r\leq m_t+m_r-m$, and to achieve outage probability as if only $r-(m_t+m_r-m)$ degrees of freedom were sent through an $(m-m_t)\times(m-m_r)$ MIMO channel. Furthermore, $m_t+m_r-m$ degrees of freedom can be conveyed to the receiver with strictly zero outage probability. Intuitively, since $m_t+m_r-m$ singular values of $H_{11}$ are 1 w.p. 1, there is a non-fading $m_t+m_r-m$-dimensional subspace for any realization of $H_{11}$, where signals can be transmitted over this subspace with zero outage probability.

Figure 8A:
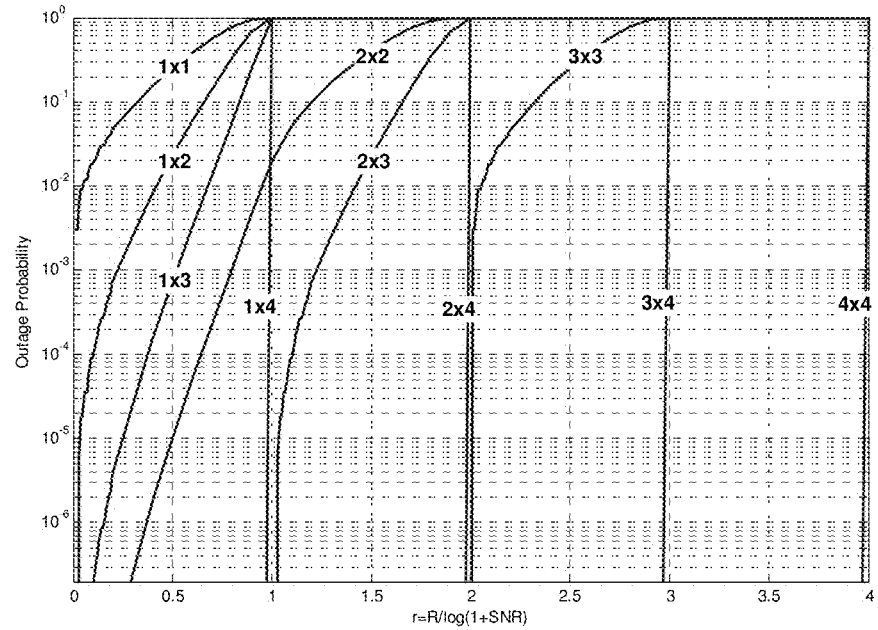
FIG. 8A depicts outage probability in a 20 dB SNR for 4×4 unitary channel, for different number of addressed modes at the receiver and transmitter.
Figure 8B:
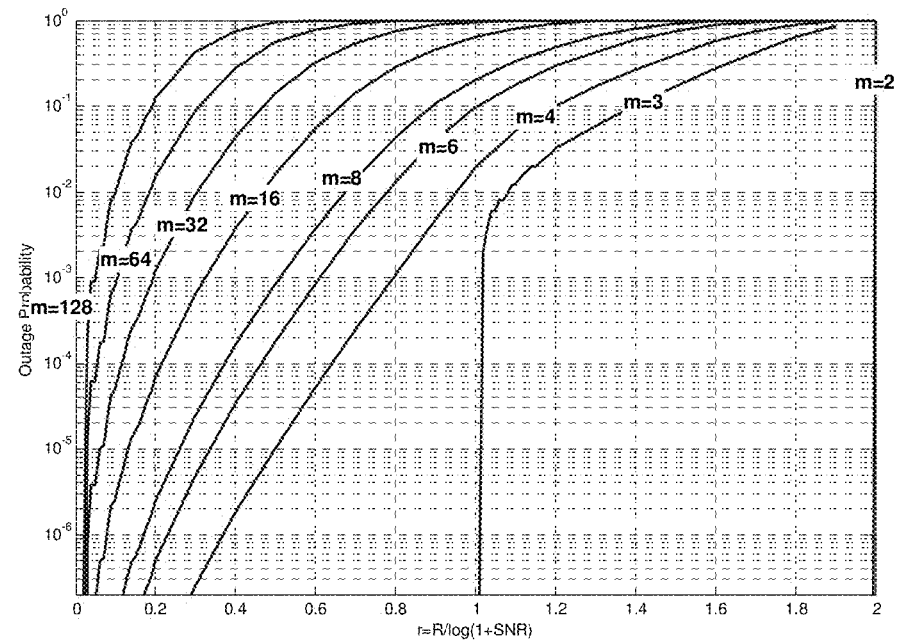
FIG. 8B illustrates outage curves for different number of supported modes m.

FIG. 8A depicts the outage probability in a 20 dB SNR for 4×4 unitary channel, for different number of addressed modes at the receiver and transmitter. In FIG. 8B we keep the number of addressed transmitter and receiver modes fixed, presenting the outage curves for different number of supported modes m.

4.3 Achieving Zero Outage Probability

We now present a new communication scheme for $m_r \times m_t$ MIMO channel, where $m_t+m_r>m$. According to Lemma 1, $m_t+m_r-m$ singular values of $H_{11}$ are 1. The scheme, using simple manipulations, exploits a (delayed) feedback system to complete also the other $m-max\{m_t,m_r\}$ singular values to 1. Thus the channel is transformed into $m_t+m_r-m$ independent SISO channels, supporting $m_t+m_r-m$ streams (degrees of freedom) with zero outage probability. Furthermore, our scheme removes the need for MIMO processing and allows the use of simple SISO channel decoders.

We first describe the principles of the scheme using the following simple example:

Let the transmitter and receiver address 3 out of 4 available modes, i.e., the transform matrix is 3×3 sub-matrix of 4×4 unitary matrix (which is drawn uniformly from the manifold of all 4×4 unitary matrices). According to Theorem 4, two degrees of freedom can be communicated to the receiver with zero outage probability. Now, suppose only for the simplicity of the example that the channel instantiation changes independently at each channel use and let $$H^{(i)} = \begin{bmatrix} H_{11}^{(i)} & H_{12}^{(i)} \\ H_{21}^{(i)} & H_{22}^{(i)} \end{bmatrix}$$

be the unitary matrix realization at channel use i. In addition, suppose that at each channel use i the transmitter has perfect knowledge of $H_{21}^{(i-1)}$, the $(m-m_r)\times m_t$ sub-matrix realization of $H^{(i-1)}$.

Let the transmitter excite the following three entries vector at each channel use $$i = 1, \ldots, n : x^{(i)} = \begin{bmatrix} x_1^{(i)} \\ x_2^{(i)} \\ H_{21}^{(i-1)} x^{(i-1)} \end{bmatrix},$$

Where we define $x^{(0)}$ to be a vector of zeros. Hence, in each channel use the transmitter communicates two new information bearing symbols and a linear combination of the previous signal.

The received signal at each channel use $i=1, \ldots, n$ is $y^{(i)} = \sqrt{SNR} H_{11}^{(i)} x^{(i)} + z^{(i)}$.

Now, since $H_{11}^{(i)}$ is assumed to be known at the receiver, $H_{21}^{(i)}$ can be also computed using the orthonormality of $H^{(i)}$'s columns. We further assume that the receiver has as a side information the following noisy measure of $x^{(n)}$ $y_{si}^{(n)} = \sqrt{SNR} H_{21}^{(n)} x^{(n)} + z_{si}^{(n)}$, Where $z_{si}^{(n)}:CN(0,1)$ is independent of $z^{(n)}$. Thus, the receiver can construct the following vector $$y^{(n)} = [ H_{11}^{(n)\dagger} \ H_{21}^{(n)\dagger} ] \cdot \begin{bmatrix} y^{(n)} \\ y_{si}^{(n)} \end{bmatrix}$$

Which satisfies $$y^{(n)} = \begin{bmatrix} y_1^{(n)} \\ y_2^{(n)} \\ y_3^{(n)} \end{bmatrix} = \sqrt{SNR} \, x^{(n)} + z^{(n)} = \sqrt{SNR} \begin{bmatrix} x_1^{(n)} \\ x_2^{(n)} \\ H_{21}^{(n-1)} x^{(n-1)} \end{bmatrix} + z^{(n)},$$

Where $z^{(n)}$ has i.i.d. CN(0,1) entries. Letting $y_3^{(n)}$ be $y_{si}^{(n-1)}$, the side information for channel use n−1 and repeating this procedure for $i=n-1$ to 1 result two streams of measures $$\begin{bmatrix} y_1^{(1)} \\ y_2^{(1)} \end{bmatrix}, \begin{bmatrix} y_1^{(2)} \\ y_2^{(2)} \end{bmatrix}, \ldots, \begin{bmatrix} y_1^{(n)} \\ y_2^{(n)} \end{bmatrix}.$$

Thus, we get two information streams that as if were communicated through two independent AWGN SISO channels, each with signal-to-noise ratio SNR (and therefore with zero outage probability).

Note that the scheme is feasible if the side information after channel use n is being conveyed by the transmitter through a neglectable number of channel uses (with respect to n) and if a feedback system is employed to communicate to the transmitter after each channel use i.

We now formalize the scheme for any $m_r \times m_t$ Jacobi channel that satisfies $m_t + m_r > m$.

Let $$H^{(i)} = \begin{bmatrix} H_{11}^{(i)} & H_{12}^{(i)} \\ H_{21}^{(i)} & H_{22}^{(i)} \end{bmatrix}$$

be the unitary matrix realization at channel use i. We assume perfect knowledge of $H_{11}^{(i)}$ at the receiver and a noiseless feedback communication with a delay of k channel uses. Since $H^{(i)}$ unitary, $H_{21}^{(i)}$ can be computed from $H_{11}^{(i)}$ and we assume that the receiver noiselessly communicates $H_{21}^{(i)}$ to the transmitter. Note that $H_{21}^{(i)}$ completes $H_{11}^{(i)}$'s columns into orthonormal columns, thus for $m_t + m_r - m > 1$ and certain matrix instantiations, the computed is not unique and can be chosen wisely (see Remark 4).

Now, the transmitter excites the following signal from the addressed modes at each channel use $i = 1, \ldots, nk$:

$$x^{(i)} = \begin{bmatrix} x_1^{(i)} \\ \vdots \\ x_{m_t+m_r-m}^{(i)} \\ H_{21}^{(i-k)} x^{(i-k)} \end{bmatrix},$$

Where $x^{(i)}$, for $i = -(k-1), \ldots, 0$, is a vector of zeros. That is, the transmitter conveys $m_t + m_r - m$ new information bearing symbols and $H_{21}^{(i-k)} x^{(i-k)}$, a linear combination of the signal that was transmitted k channel uses before. Note that since H unitary, the power constraint is left satisfied.

Now, assume the transmitter communicates to the receiver the following measures $y_{si}^{(i)} = \sqrt{SNR} H_{21}^{(i)} x^{(i)} + z_{si}^{(i)}$ $\forall i = (n-1)k+1, \ldots, nk$, That is, noisy measures of the last k transmitted signals, where $z_{si}^{(i)}$ are independent with i.i.d. $CN(0,1)$ entries. As was shown above, the receiver can use the side information to get $$\begin{bmatrix} y_1^{(i)} \\ \vdots \\ y_{m_t}^{(i)} \end{bmatrix} = \sqrt{SNR}\, x^{(i)} + z^{(i)} = \sqrt{SNR} \begin{bmatrix} x_1^{(i)} \\ \vdots \\ x_{m_t+m_r-m}^{(i)} \\ H_{21}^{(i-k)} x^{(i-k)} \end{bmatrix} + z^{(i)}.$$

For all $i = (n-1)k+1, \ldots, nk$, where $z^{(i)}$ are independent with i.i.d $CN(0,1)$ entries.

Letting $$\begin{bmatrix} y_{m_t+m_r-m+1}^{(i)} \\ \vdots \\ y_{m_t}^{(i)} \end{bmatrix} = \sqrt{SNR}\, H_{21}^{(i-k)} x^{(i-k)} + \begin{bmatrix} z_{m_t+m_r-m+1}^{(i)} \\ \vdots \\ z_{m_t}^{(i)} \end{bmatrix}$$

Be the side information $y_{si}^{(i-k)}$ measures for channel use $i-k$, for all $i = (n-1)k+1, \ldots, nk$, and repeating this procedure for $i = (n-1)k$ till $i = 1$ results in $m_t + m_r - m$ independent streams of measures $$\begin{bmatrix} y_1^{(1)} \\ \vdots \\ y_{m_t+m_r-m}^{(1)} \end{bmatrix}, \ldots, \begin{bmatrix} y_1^{(nk)} \\ \vdots \\ y_{m_t+m_r-m}^{(nk)} \end{bmatrix}.$$

Thus, having noisy measures of the last k symbols, $y_{si}^{((n-1)k+1)}, \ldots, y_{si}^{(nk)}$, the receiver can construct $m_t + m_r - m$ SISO channels, each with a signal-to-noise ratio SNR. Assuming the transmitter can convey these measures using a neglectable number of channel uses (with respect to n, see Remark 3), the scheme allows approaching the rate $(m_t + m_r - m)\log(1 + SNR)$ with zero outage probability.

Remark 1 (Delayed Feedback) The scheme exploits a noiseless feedback system to communicate a (possibly) outdated information—the channel realization in previous channel uses. Thus, the feedback is not required to be fast, that is, no limitations on the delay time k. However, for non-ergodic systems with a short delay time, the feedback may carry information about the current channel realization. Thus, the transmitter can exploit the up-to-date feedback to use more efficient schemes (e.g., water filling). Nevertheless, for systems with a long delay time (e.g., relatively long distance optical fibers), the channel can be regarded as non-ergodic however with an outdated feedback. In these cases our scheme efficiently achieves zero outage probability.

Remark 2 (Simple Decoding) The scheme constructs $m_t + m_r - m$ independent streams of measures, each with signal-to-noise SNR. This allows the decoding stage to be simple, where a SISO channel decoder can be used, removing the need for further MIMO signal processing.

Remark 3 (Side Information Measures) Given noisy measures of the last k transmitted signals, $y_{si}^{(i)} = \sqrt{SNR} H_{21}^{(i)} x^{(i)} + z_{si}^{(i)}$, $\forall i = nk - (k-1), \ldots, nk$, Where $z_{si}^{(i)}$ are independent with i.i.d. $CN(0,1)$ entries, the scheme can construct $m_t + m_r - m$ independent streams of measures. Thus, the transmitter has to convey $H_{21}^{(i)} x^{(i)}$, for each $i = nk - (k-1), \ldots, nk$, such that the receiver can extracted a vector of noisy measures with signal-to-noise ratio that is not smaller than SNR. This is feasible with a finite number of channel uses. For example, the repetition scheme can be used to convey these measures, each with a signal-to-noise ratio that is at least SNR (according to Lemma 1, see Section 5 Example 2). Suppose each $H_{21}^{(i)} x^{(i)}$ is conveyed to the receiver within $N_{si}$ channel uses (e.g., for the repetition scheme $N_{si} = m_t(m - m_r)$). By taking large enough n (with respect to $N_{si}$) one can approach the rate $(m_t + m_r - m)\log(1 + SNR)$. The repetition scheme can convey the $m - m_r$ entries of $H_{21}^{(i)} x^{(i)}$ with $N_{si} = m_t(m - m_r)$ channel uses. In each channel use a single entry is transmitted through a single mode (while all other modes are zero) in a way that all entries are transmitted through all modes.

Remark 4 (The Uniqueness of $\_21$) The scheme can be further improved to support even an higher data rate with outage probability zero. For example, the last $m - m_r$ entries of the transmitted signal at the first k channel uses can be used to excite information bearing symbols instead of the zeros symbols. Furthermore, as was mentioned above, when $m_t + m_r - m > 1$, $H_{21}^{(i)}$ is not unique; there are many $(m - m_r) \times m_t$ matrices that complete the columns of $H_{11}^{(i)}$ into orthonormal columns. Thus, the receiver can choose $H_{21}^{(i)}$ to be the one with the largest number of zeros rows. Now, at time $i + k$ the transmitter excites $m_t + m_r - m$ new symbols and $H_{21}^{(i)} x^{(i)}$, a retransmission of $x^{(i)}$, the transmitted signal at time i. With an appropriate choice of $H_{21}^{(i)}$, $H_{21}^{(i)}x^{(i)}$ contains entries that are zero. Instead, these entries can contain additional new information bearing symbols.

It seems that a further enhancement of the data rate can be achieved by exploiting the feedback to approach the empirical capacity for any realization of $H_{11}$. Note that this rate is achievable with an up-to-date feedback. The enhancement of the data rate can be enhanced with an outdated feedback system (and with zero outage probability).

There can be provided a system that utilizes this scheme, a method that utilizes this scheme and a computer readable medium that is not transitory and stores instructions that once executed utilize the scheme.

5 Diversity Multiplexing Tradeoff

In this section we want to analyze the tradeoff between diversity and multiplexing in the Jacobi channel. We first examine the error probability of two simple examples—an uncoded transmission in an $1 \times m_r$ system and a repetition scheme in an $m_r \times m_r$ system. Note that the latter can be viewed as a generalization of the first.

Example 1 ($m\_t=1$) Consider a transmission of an uncoded signal through a single mode. When all available modes are being addressed at the receiver, that is $m_r=m$, the entire signal power is extracted and the channel corresponds to a SISO unfading channel with an exponentially decaying (with SNR) error probability. However, for $m_r<m$ some power is lost in the unaddressed modes resulting an higher error probability. Suppose the transmitter excites an uncoded QPSK signal (Similar results can be obtained for higher constellations). Using the sphere bound we can upper bound the error probability for a given channel realization:

$$Pr(\text{error}|H_{11}=H_{11}) \le Pr(|z|^2 > SNR/2 \|H_{11}\|_F^2) \quad (29)$$

Where $z:CN(0,1)$ and $\|H_{11}\|_F$ is the Frobenius norm of a matrix: $\|A\|_F^2 = \Sigma_{ij}|A_{ij}|^2 = \Sigma_i \lambda_i$, where $\lambda_i$ are the singular values of A. Since for high SNR this bound is tight, we can write $$Pr(\text{error} | H_{11} = H_{11}) \doteq \exp\left(-\frac{SNR}{2}\|H_{11}\|_F^2\right), \quad (30)$$

where we further applied the cdf. of a chi-squared random variable with 2 degrees of freedom. Thus, by letting $\lambda$ be the square singular value of $H_{11}$, we can write:

$$Pr(\text{error} | \|H_{11}\|_F^2 = \lambda) \doteq \exp\left(-\frac{SNR}{2}\lambda\right). \quad (31)$$

By taking the expectation over (31) w.r.t $\lambda$ we get the error probability $$P_e(SNR) \doteq E[e^{-\frac{SNR}{2}\lambda}]. \quad (32)$$

Now, for $m_r=m$ we always have $\lambda=1$, thus the error probability satisfies $$P_e(SNR) \doteq e^{-\frac{SNR}{2}}. \quad (33)$$

For $m_r<m$, we can use (4), the pdf. of the eigenvalue of a Jacobi matrix $J(m_r, m-m_r, 1)$, to calculate the right hand side of (32):

$$E\left[e^{-\frac{SNR}{2}\lambda}\right] = \int_0^1 Pr(\lambda re^{-\frac{SNR}{2}\lambda}d\lambda \quad (34)$$

$$= K_{1,m_r,m}^{-1} \int_0^1 \lambda^{m_r-1}(1-\lambda)^{m-m_r-1}e^{-\frac{SNR}{2}\lambda}d\lambda. \quad (35)$$

We use the Taylor expansion of $(1-x)^a$ to have $$E[e^{-\frac{SNR}{2}\lambda}] = K_{1,m_r,m}^{-1} \sum_{i=0}^{m-m_r-1}(-1)^i \binom{m-m_r-1}{i} \int_0^1 \lambda^{m_r+i-1}e^{-\frac{SNR}{2}\lambda}d\lambda \quad (36)$$

$$= K_{1,m_r,m}^{-1} \sum_{i=0}^{m-m_r-1}(-1)^i \binom{m-m_r-1}{i} \quad (37)$$

$$\left[(m_r+i-1)!\left(\frac{SNR}{2}\right)^{-(m_r+i)} - e^{-\frac{SNR}{2}}\sum_{j=0}^{m_r+i-1}\binom{m_r+i-1}{j}j!\left(\frac{SNR}{2}\right)^{-(j+1)}\right].$$

In high SNR (37) is dominated by the term $K_{l,m_r,m}^{-1}(m_r-1)!(SNR/2)^{-m_r}$ and since the bound is tight at this regime we can write $$P_e(SNR) \doteq \begin{cases} SNR^{-m_r}, & m_r \ne m \\ e^{-\frac{SNR}{2}}, & m_r = m. \end{cases} \quad (38)$$

Thus, the number of received modes dictates the decaying order of the error probability at high SNR. Having in mind that the $m_r \times 1$ channel matrix can be viewed as a sub-vector of $m \times 1$ vector that was constructed by normalizing m i.i.d. complex Gaussian rv's, it is not surprising that the error probability in the analogue Rayleigh channel has a similar behavior at high SNR. But is this true also for $m_r \ne 1$? To that end we want to examine the error probability of the repetition scheme in an $m_r \times m_t$ system.

Example 2 (Repetition Scheme) Suppose the transmitter excites the following ($m_t$ entries) signals in each $m_t$ consecutive channel uses:

a.

$$\begin{bmatrix} x \\ 0 \\ 0 \\ \vdots \\ 0 \end{bmatrix}, \begin{bmatrix} 0 \\ x \\ 0 \\ \vdots \\ 0 \end{bmatrix}, \dots, \begin{bmatrix} 0 \\ 0 \\ \vdots \\ 0 \\ x \end{bmatrix}$$

Where x is an uncoded QPSK symbol (Similar results can be obtained also for higher constellations). Let us assume that the channel is constant within the $m_t$ channel uses and, for simplicity of notations, we further assume $m_r \ge m_t$ (similar results can be obtained for $m_t > m_r$). Thus, with the same considerations as before, the error probability satisfies $$P_e(SNR) \doteq \left[\exp\left(-\frac{SNR}{2}\sum_{i=1}^{m_t}\lambda_i\right)\right], \quad (39)$$

Where the expectation is over $\lambda_1 \leq \ldots \leq \lambda_{m_t}$, the ordered non-zero eigenvalues of $H_{11}^\dagger H_{11}$.

Now, using the joint pdf. of the ordered eigenvalues of a Jacobi matrix $J(m_r, m-m_r, m_t)$ we can analyze (39) for $m_t + m_r \leq m$:

$$E\left[\exp\left(-\frac{SNR}{2}\sum_{i=1}^{m_t}\lambda_i\right)\right] = \int \ldots \int Pr(\lambda_1, \ldots, \lambda_{m_t}) e^{-\frac{SNR}{2}\sum_{i=1}^{m_t}\lambda_i} d\lambda_1 \ldots d\lambda_{m_t} \quad (40)$$

$$= K_{m_t,m_r,m}^{-1} \int_0^1 \int_{\lambda_1}^1 \ldots \int_{\lambda_{m_t}}^1 \prod_{i=1}^{m_t} \lambda_i^{m_r-m_t}(1-\lambda_i)^{m-(m_r+m_t)} \quad (41)$$

$$\prod_{i<j}(\lambda_j - \lambda_i)^2 e^{-\frac{SNR}{2}\lambda_i} d\lambda_1 \ldots d\lambda_{m_t}$$

$$= \frac{K_{m_t,m_r,m}^{-1}}{m_t!} \int_0^1 \ldots \int_0^1 \prod_{i=1}^{m_t} \lambda_i^{m_r-m_t}(1-\lambda_i)^{m-(m_r+m_t)} \quad (42)$$

$$\prod_{i<j}(\lambda_j - \lambda_i)^2 e^{-\frac{SNR}{2}\lambda_i} d\lambda_1 \ldots d\lambda_{m_t},$$

Where in the last equation we used the joint pdf. of the un-ordered eigenvalues. Note that the term $$\prod_{1 \leq i < j \leq m_t}(\lambda_j - \lambda_i)$$

is the determinant of the Vandermonde matrix a.

$$\begin{bmatrix} 1 & \ldots & 1 \\ \lambda_1 & \ldots & \lambda_{m_t} \\ \vdots & & \vdots \\ \lambda_1^{m_t-1} & \ldots & \lambda_{m_t}^{m_t-1} \end{bmatrix}.$$

Thus we can write $$\prod_{1 \leq i < j \leq m_t}(\lambda_j - \lambda_i)^2 = \sum_{\sigma_1, \sigma_2 \in S_{m_t}} (-1)^{sgn(\sigma_1)+sgn(\sigma_2)} \prod_{i=1}^{m_t} \lambda_i^{\sigma_1(i)+\sigma_2(i)-2}, \quad (43)$$

Where $S_{m_t}$ is the set of permutations of $1, \ldots, m_t$ and $sgn(\sigma)$ denotes the signature of the permutation $\sigma$. Applying (43) into (42) results $$E\left[\exp\left(-\frac{SNR}{2}\sum_{i=1}^{m_t}\lambda_i\right)\right] = \frac{K_{m_t,m_r,m}^{-1}}{m_t!} \sum_{\sigma_1,\sigma_2 \in S_{m_t}} (-1)^{sgn(\sigma_1)+sgn(\sigma_2)} \quad (44)$$

$$\prod_{i=1}^{m_t} \int_0^1 \lambda_i^{m_r-m_t+\sigma_1(i)+\sigma_2(i)-2}(1-\lambda_i)^{m-(m_r+m_t)} e^{-\frac{SNR}{2}\lambda_i} d\lambda_1.$$

With the same techniques used before (to get equation (37)) we get that the error probability at high SNR is dominated by the term $$\frac{K_{m_t,m_r,m}^{-1}}{m_t!} \sum_{\sigma_1,\sigma_2 \in S_{m_t}} (-1)^{sgn(\sigma_1)+sgn(\sigma_2)} \quad (45)$$

-continued $$\prod_{i=1}^{m_t}(m_r - m_t + \sigma_1(i) + \sigma_2(i) - 2)!\left(\frac{SNR}{2}\right)^{-(m_r-m_t+\sigma_1(i)+\sigma_2(i)-1)}.$$

Thus, for $m_t + m_r \leq m$, the error probability satisfies $$P_e(SNR) \doteq C_{m_t,m_r,m} SNR^{-\sum_{i=1}^{m_t}(m_r-m_t+2i-1)} \quad (46)$$

$$\doteq SNR^{-m_r \cdot m_t}, \quad (47)$$

Where it can be shown that $C_{m_t,m_r,m}$ is a non-zero constant. For $m_t + m_r > m$, by applying Lemma 1 into (39) we get $$P_e(SNR) \doteq e^{-\frac{SNR(m_t+m_r-m)}{2}} \cdot E\left[\exp\left(-\frac{SNR}{2}\sum_{i=1}^{m-m_r}\tilde{\lambda}_i\right)\right],$$

Where $\tilde{\lambda}_1 \leq \ldots \leq \tilde{\lambda}_{m-m_r}$ are the non-zero ordered eigenvalues of $H_{22}^\dagger H_{22}$. Since $H_{22}$ applies to the first case, that is, $(m-m_t)+(m-m_r)<m$, we can use (47) and conclude that the error probability of the repetition scheme satisfies $$P_e(SNR) \doteq \begin{cases} SNR^{-m_r \cdot m_t}, & m_t + m_r \leq m \\ e^{-\frac{SNR(m_t+m_r-m)}{2}} \cdot SNR^{-(m-m_t)(m-m_r)}, & m_t + m_r > m. \end{cases} \quad (48)$$

Equation (48) implies that, for $m_t + m_r \leq m$, the exponent of the dominant term in the error probability is $m_r \cdot m_t$ (which is similar to the Rayleigh channel, see further discussion in Section 6). Thus the performance gain of an $m_t \times m_r$ system compared to a system with a single transmit and receive mode is dictated by the SNR exponent of the error probability. This SNR exponent is termed the diversity gain. Intuitively, the total transmitted power is spread over all m available modes, thus addressing only some modes results in a power loss. As the number of addressed modes at the receiver is higher and as the transmitter excites more modes, the probability for a substantial power loss is smaller. Analogously, in wireless systems, as the signal passes through more (independent) paths, the probability for a fading is smaller. However, in the Jacobi channel it turns out that there is a transition threshold in which enough modes are being addressed to ensure a certain received power. This results an exponentially decaying error probability for appropriate rates.

Now, in Section 3 we have analyzed the ergodic capacity and showed that as more modes are being addressed, the capacity increases. Thus, increasing the number of addressed modes has another potential gain—higher data rate. This gain is termed spatial multiplexing gain. In MIMO systems there is a fundamental tradeoff between the diversity and multiplexing gains. The optimal tradeoff for the Rayleigh channel was presented. We now turn to analyze this tradeoff in the Jacobi channel. To that end, we formalize the concepts of diversity gain and multiplexing gain by quoting some definitions:

Definition 4 Let a scheme be a family of codes {C(SNR)} of block length l, one at each SNR level. Let R(SNR) (bits/symbols) be the rate of the code C(SNR). A scheme {C(SNR)} is said to achieve spatial multiplexing gain r and diversity gain d if the data rate satisfies $$\lim_{SNR\to\infty} \frac{R(SNR)}{\log SNR} = r$$

End the average error probability satisfies $$\lim_{SNR\to\infty} \frac{P_e(SNR)}{\log SNR} = -d.$$

For each r, define d*(r) to be the supremum of the diversity advantage achieved over all schemes.

For example, let us discuss the uncoded repetition scheme. For $m_t+m_r \leq m$, the diversity gain is $m_r \cdot m_t$ when transmitting a signal from a fixed constellation. E.g., for QPSK modulation the data rate is fixed, $R(SNR)=1/m_t$ (bps/Hz) for any SNR. Thus, for diversity gain of $m_r \cdot m_t$ the scheme achieves a multiplexing gain of 0. By increasing the constellation size with SNR to achieve an higher multiplexing gain, i.e., to support a data rate of $R(SNR)=r \log SNR$ (bps/Hz) (for some $0<r<1/m_t$), the minimum distance between the constellation points decreases with SNR. This results in an error probability with a smaller decaying order, that is, a lower diversity gain. See further discussion in Example 3.

We next find the optimal tradeoff, d*(r), for the Jacobi channel.

5.1 The Case of $m_t+m_r \leq m$

Theorem 5 Let the block length satisfy $l \geq m_t+m_r-1$. The optimal diversity-multiplexing tradeoff curve d*(r) for $m_t+m_r \leq m$, is given by the piecewise linear function that connects the points (k, d*(k)) for k=0, 1, . . . , min{$m_t,m_r$}, where $$d^*(k)=(m_t-k)(m_r-k). \quad (49)$$

Proof. See Appendix 8.

Hence, for $m_t+m_r \leq m$, the optimal tradeoff curve is equivalent to the optimal curve in the Rayleigh channel. We note that for $l<m_t+m_r-1$, bounds on d*(r) can be obtained using results from Appendix 8.

5.2 The Case of $m_t+m_r>m$

According to Theorem 4 we can write $$P_{out}(m_t,m_r,m;r\log(1+SNR))=P_{out}(m-m_r,m-m_t,m;(r-(m_t+m_r-m))\log(1+SNR)) \quad (50)$$

for $r+m_t+m_r-m$.

Thus, for rates above $(m_t+m_r-m)\log(1+SNR)$, the optimal diversity-multiplexing tradeoff can be found from Theorem 5. Theorem 4 further states that the outage probability for rates below $(m_t+m_r-m) \log(1+SNR)$ is strictly zero. Hence, for multiplexing gains below $m_t+m_r-m$ there is a scheme that can convey unfading signals to the receiver, thereby achieving an exponentially decaying error probability. In this case the discussion about diversity is no longer relevant. Nonetheless, one can think of the gain as infinite. This reveals an interesting difference between the Jacobi and Rayleigh channels—the maximum diversity gain is "unbounded" vs. $m_r \cdot m_t$.

The following Theorem states the above.

Theorem 6 The optimal diversity-multiplexing tradeoff curve d*(r), for $m_t+m_r>m$, is given by $$d^*(r) = \begin{cases} d^*_{risdual}(r-(m_t+m_r-m)), & r \geq m_t+m_r-m \\ \infty, & r < m_t+m_r-m \end{cases} \quad (51)$$

Where $d^*_{risdual}(r)$ is the optimal curve of an $(m-m_r)\times(m-m_t)$ system. For a block length $l \geq m_t+m_r-1$, the optimal curve $d^*_{risdual}(r)$ is the piecewise linear function that connects the points (k, $d^*_{risdual}(k)$) for k=0, 1, . . . , min{$m-m_r,m-m_t$} where $$d^*_{risdual}(k)=(m-m_r-k)(m-m_t-k). \quad (52)$$

Proof. Immediate from Theorem 4 since the error probability at high SNR is dominated by the outage probability, see Appendix 8.

In the following example we try to illuminate the concept of infinite diversity gain.

Example 3 ($m_t=m_r=2$) We consider the 2×2 Alamouti scheme. Assuming a code block of length $l \geq 3$ and rate R=r log SNR (bps/Hz), the transmitter excites in each two consecutive channel uses two information bearing symbols in the following manner $$\begin{bmatrix} x_1 \\ x_2 \end{bmatrix}, \begin{bmatrix} -x_2^\dagger \\ x_1^\dagger \end{bmatrix}.$$

ML decoding linearly combines the received measures and yields the following equivalent scalar channels:

$$y_i=\sqrt{\|H_{11}\|_F^2 SNR} \cdot x_i+z_i, \forall i=1, 2 \quad (53)$$

Where each $z_i$ is distributed CN(0,1) independent of $x_i$ and $H_{11}$. The probability for an outage event is given by $$P_{out}(2,2,m;R)=Pr(\log(1+\|H_{11}\|_F^2 SNR)<r \log SNR) \quad (54)$$

$$\doteq Pr(\|H_{11}\|_F^2<SNR^{-(1-r)^+}). \quad (55)$$

Now, for the Rayleigh fading channel $\|H_{11}\|_F^2$ is chi-square distributed with $2m_t m_r$ degrees of freedom. In this case, the 2×2 Alamouti scheme can achieve maximum diversity gain of 4.

However, in the Jacobi channel: for m=2 we have $\|H_{11}\|_F^2=2$ ($H_{11}=H$ unitary) and for m=3 we have $\|H_{11}\|_F^2 \geq 1$ (by Lemma 1 and the fact that the Frobenius norm equals the sum of the eigenvalues of $H_{11}^\dagger H_{11}$). For $m \geq 4$ there is always a non-zero probability for an outage event.

Therefore, for m=2 and m=3, for any r we get equivalent unfading scalar channels with strictly zero outage probability and one can think of the maximum diversity gain as infinite.

For m≥4 it can be shown that the maximum diversity gain is 4 and the optimal tradeoff curve linearly connects the points (1,0) and (0,4).

Discussion

Edelman and Sutton Now, let $G_1$ and $G_2$ be $m_r \times m_t$ and $(m-m_r) \times m_t$ independent random matrices, each with i.i.d complex standard Gaussian entries. it was shown that the squared generalized singular values of $G_1$ and $G_2$ follow the law of the Jacobi ensemble $J(m_r, m-m_r, m_t)$. Furthermore, since the Jacobi ensemble $J(m_r, m-m_r, m_t)$ can be constructed by $G_1^\dagger G_1 (G_1^\dagger G_1 + G_2^\dagger G_2)^{-1}$, we can roughly say that in terms of singular values, the channel $H_{11}$ can be viewed as $m_r \times m_t$ sub-matrix of a normalized $m \times m_t$ Gaussian matrix, or as a sub-channel of a normalized Gaussian channel.

Thus, at high SNR, for $m_t + m_r > m$ the error probability of the repetition scheme turns exponentially decaying with SNR. For $m_t + m_r \leq m$, the exponent of the dominant term in the error probability, $m_r \cdot m_t$, is as in the analogue Rayleigh channel. Note that it does not depend on m, despite the fact that as m is larger, the columns of the channel are more independent, the decaying order of the error probability, $m_r \cdot m_t$, does not depend on the total number of available modes, m, i.e., does not account for the magnitude of the orthogonality of the channel columns. In fact, at high SNR, the decaying order of the error probability behaves as in wireless systems, where the columns are Gaussian i.i.d vectors. Intuitively, at high SNR and for $m_t + m_r \leq m$, the error probability is dominated by the event of outage where the impact of the orthonormality of the channel columns is negligible. This is not always true for $m_t + m_r > m$ 7 Proof of Theorem 2

By Theorem 1, the ergodic capacity satisfies $$C(m_t, m_r, m; SNR) = E\left[\text{logdet}\left(I_{m_t} + SNR \cdot H_{11}^\dagger H_{11}\right)\right] \quad (56)$$

$$= E\left[\sum_{i=1}^{m_t} \log(1 + SNR \cdot \lambda_i)\right] \quad (57)$$

Where we denote by $\lambda = \{\lambda_1, \ldots, \lambda_{m_t}\}$ the non-zeros eigenvalues of $H_{11}^\dagger H_{11}$. Note that for simplicity of notations we assume $m_r \geq m_t$ (all results hold true also for $m_t > m_r$ by switching $m_t$ and $m_r$). Thus, we can write the ergodic capacity as the expectation over only one of the unordered eigenvalues:

$$C(m_t, m_r, m; SNR) = E[\log(1 + SNR \cdot \lambda_1)]. \quad (58)$$

Now, the joint pdf. of the ordered eigenvalues, $f_\lambda(\lambda_1, \ldots, \lambda_{m_t})$, is given by (4). The joint pdf. of the unordered eigenvalues equals $$\frac{1}{m_t!} f_\lambda(\lambda_1, \ldots, \lambda_{m_t}),$$

Thus we can compute the density of $\lambda_1$ by integrating out $\lambda_2, \ldots, \lambda_{m_t}$:

$$f_{\lambda_1}(\lambda_1) = \int_0^1 \ldots \int_0^1 \frac{1}{m_t!} f_\lambda(\lambda_1, \ldots, \lambda_{m_t}) d\lambda_2 \ldots d\lambda_{m_t}. \quad (59)$$

By taking $$\lambda_i = \frac{1}{2}(1 - \tilde{\lambda}_i) \quad (60)$$

We can write $$f_{\tilde{\lambda}_1}(\tilde{\lambda}_1) = \int_{-1}^1 \ldots \int_{-1}^1 f_{\tilde{\lambda}}(\tilde{\lambda}_1, \ldots, \tilde{\lambda}_{m_t}) d\tilde{\lambda}_2 \ldots d\tilde{\lambda}_{m_t}, \quad (61)$$

Where $$f_{\tilde{\lambda}}(\tilde{\lambda}_1, \ldots, \tilde{\lambda}_{m_t}) = \frac{K_{m_t, m_r, m}^{-1}}{2^{m_t(m-m_t)} m_t!} \prod_{i=1}^{m_t}(1 - \tilde{\lambda}_i)^\alpha (1 + \tilde{\lambda}_i)^\beta \prod_{i<j}(\tilde{\lambda}_i - \tilde{\lambda}_j)^2, \quad (62)$$

and we denote $\alpha = m_r - m_t$ and $\beta = m_r - m_t$.

Now, the term $$\prod_{1 \leq i < j \leq m_t}(\tilde{\lambda}_i - \tilde{\lambda}_j)$$

is the determinant of the Vandermonde matrix a.

$$\begin{bmatrix} 1 & \ldots & 1 \\ \tilde{\lambda}_1 & \ldots & \tilde{\lambda}_{m_t} \\ \vdots & & \vdots \\ \tilde{\lambda}_1^{m_t-1} & \ldots & \tilde{\lambda}_{m_t}^{m_t-1} \end{bmatrix}. \quad (63)$$

With row operations we can transform (63) into the following matrix $$\begin{bmatrix} P_1^{(\alpha,\beta)}(\tilde{\lambda}_1) & \ldots & P_1^{(\alpha,\beta)}(\tilde{\lambda}_{m_t}) \\ \vdots & & \vdots \\ P_{m_t}^{(\alpha,\beta)}(\tilde{\lambda}_1) & \ldots & P_{m_t}^{(\alpha,\beta)}(\tilde{\lambda}_{m_t}) \end{bmatrix}. \quad (64)$$

Where $P_n^{(\alpha,\beta)}(x)$ are the Jacobi polynomials which form a complete orthogonal system in the interval $[-1,1]$ with respect to the weighting function $w(x) = (1-x)^\alpha (1+x)^\beta$:

$$\int_{-1}^1 w(x) P_n^{(\alpha,\beta)}(x) P_k^{(\alpha,\beta)}(x) dx = a_{k,\alpha,\beta} \cdot \delta_{kn}, \quad (65)$$

Where for integers $\alpha$ and $\beta$ $$a_{k,\alpha,\beta} = \frac{2^{\alpha+\beta+1}}{2k+\alpha+\beta+1} 2k+\alpha+\beta_k 2k+\alpha+\beta_{k+\alpha}^{-1}. \quad (66)$$

By the definition of the determinant we have $$\prod_{1 \leq i < j \leq m_t}(\tilde{\lambda}_i - \tilde{\lambda}_j) = C_{m_t, m_r, m} \sum_{\sigma \in S_{m_t}} (-1)^{sgn(\sigma)} \prod_{i=1}^{m_t} P_{\sigma(i)}^{(\alpha,\beta)}(\tilde{\lambda}_i), \quad (67)$$

Where $S_{m_t}$ is the set of permutations of $1, \ldots, m_t$, $sgn(\sigma)$ denotes the signature of the permutation $\sigma$ and $C_{m_t, m_r, m}$ is a constant picked up from transformation of the Vandermonde matrix (63) into (64). By applying (67) into (68) we get:

$$f_{\tilde{\lambda}}(\tilde{\lambda}_1, \ldots, \tilde{\lambda}_{m_t}) = \tilde{K}_{m_t,m_r,m}^{-1} \sum_{\sigma_1,\sigma_2 \in S_{m_t}} (-1)^{sgn(\sigma_1)+sgn(\sigma_2)} \quad (68)$$

$$\prod_{i=1}^{m_t} (1-\tilde{\lambda}_i)^\alpha (1+\tilde{\lambda}_i)^\beta P_{\sigma_1(i)}^{(\alpha,\beta)}(\tilde{\lambda}_i) P_{\sigma_2(i)}^{(\alpha,\beta)}(\tilde{\lambda}_i).$$

Further integrating over $\tilde{\lambda}_2, \ldots, \tilde{\lambda}_{m_t}$ results $$f_{\tilde{\lambda}_1}(\tilde{\lambda}_1) = \tilde{K}_{m_t,m_r,m}^{-1} \sum_{\sigma_1,\sigma_2 \in S_{m_t}} (-1)^{sgn(\sigma_1)+sgn(\sigma_2)} (1-\tilde{\lambda}_1)^\alpha (1+\tilde{\lambda}_1)^\beta \quad (69)$$

$$P_{\sigma_1(1)}^{(\alpha,\beta)}(\tilde{\lambda}_1) P_{\sigma_2(1)}^{(\alpha,\beta)}(\tilde{\lambda}_1) \prod_{i=2}^{m_t} a_{\sigma_1(i),\alpha,\beta} \cdot \delta_{\sigma_1(i)\sigma_2(i)}$$

$$= \tilde{K}_{m_t,m_r,m}^{-1}(m_t-1)! \sum_{k=1}^{m_t} (1-\tilde{\lambda}_1)^\alpha (1+\tilde{\lambda}_1)^\beta P_k^{(\alpha,\beta)}(\tilde{\lambda}_1)^2 \prod_{i \neq k} a_{i,\alpha,\beta} \quad (70)$$

$$= \frac{1}{m_t} \sum_{k=1}^{m_t} a_{k,\alpha,\beta}^{-1} P_k^{(\alpha,\beta)}(\tilde{\lambda}_1)^2 (1-\tilde{\lambda}_1)^\alpha (1+\tilde{\lambda}_1)^\beta, \quad (71)$$

Where the first equality follows from (65) and thus implies that $\sigma_1(i)=\sigma_2(i)$ for all i. This results in the second equation while the third equality follows from (65) and the fact that $f_{\tilde{\lambda}_1}(\tilde{\lambda}_1)$ must integrates to unity. Turning back to $\lambda_1$ we get:

$$f_{\tilde{\lambda}_1}(\tilde{\lambda}_1) = \frac{1}{m_t} \sum_{k=1}^{m_t} b_{k,\alpha,\beta}^{-1} \left(P_k^{(\alpha,\beta)}(1-2\lambda_1)\right)^2 \lambda_1^\alpha (1-\lambda_1)^\beta, \quad (72)$$

Where $$b_{k,\alpha,\beta} = \frac{1}{2k+\alpha+\beta+1} 2k+\alpha+\beta k 2k+\alpha+\beta k+\alpha^{-1}. \quad (73)$$

8 Proof of Theorem 5

For simplicity we assume $m_t \leq m_r$ (without loss of generality, since the outage probability is symmetric in $m_t$ and $m_r$). Now, let us examine the outage probability which is given by (25):

$$P_{out}(m_t, m_r, m; r\log(1+SNR)) = \quad (74)$$

$$K_{m_t,m_r,m}^{-1} \int_B \prod_{i=1}^{m_t} \lambda_i^{m_r-m_t}(1-\lambda_i)^{m-m_r-m_t} \prod_{i<j}(\lambda_i-\lambda_j)^2 d\lambda,$$

Where $K_{m_t,m_r,m}$ is a normalizing factor and $$B = \left\{\lambda: 0 \leq \lambda_1 \leq \ldots \leq \lambda_{m_t} \leq 1, \prod_{i=1}^{m_t}(1+SNR \cdot \lambda_i) < (1+SNR)^r\right\}$$

is the set that describes the outage event.
Letting $$\lambda_i = SNR^{-\alpha_i} \quad (75)$$

for $i=1, \ldots, m_t$ allows us to write $$P_{out}(m_t, m_r, m; r\log(1+SNR)) = \quad (76)$$

$$\log(SNR)^{m_t} K_{m_t,m_r,m}^{-1} \int_B \prod_{i=1}^{m_t} SNR^{-\alpha_i(m_r-m_t+1)} \cdot$$

$$\cdot (1-SNR^{-\alpha_i})^{m-m_r-m_t} \prod_{i<j}(SNR^{-\alpha_i}-SNR^{-\alpha_j})^2 d\alpha. \quad (77)$$

Since $1+SNR^{1-\alpha_i} \doteq SNR^{(1-\alpha_i)^+}$, where $(x)^+ = \max\{0,x\}$, we can describe the set of outage events by $$B = \left\{\alpha: \alpha_1 \geq \ldots \geq \alpha_{m_t} \geq 0, \sum_{i=1}^{m_t}(1-\alpha_i)^+ < r\right\}.$$

Since the term $\log(SNR)^{m_t} K_{m_t,m_r,m}^{-1}$ has no effect on the SNR exponent, i.e., satisfies $$\lim_{SNR \to \infty} \frac{\log(\log(SNR)^{m_t} K_{m_t,m_r,m}^{-1})}{\log SNR} = 0, \quad (78)$$

We get $$P_{out}(m_t, m_r, m; r\log(1+SNR)) \doteq \int \prod_{i=1}^{m_t} SNR^{-\alpha_i(m_r-m_t+1)} \cdot \quad (79)$$

$$\cdot (1-SNR^{-\alpha_i})^{m-m_r-m_t} \prod_{i<j}(SNR^{-\alpha_i}-SNR^{-\alpha_j})^2 d\alpha. \quad (80)$$

Now, we note that $$P_{out}(m_t, m_r, m; r\log(1+SNR)) \leq \quad (81)$$

$$\int_B \prod_{i=1}^{m_t} SNR^{-\alpha_i(m_r-m_t+1)} \prod_{i<j}(SNR^{-\alpha_i}-SNR^{-\alpha_j})^2 d\alpha.$$

It was proven that the right hand side of above satisfies:

$$\int \prod_{i=1}^{m_t} SNR^{-\alpha_i(m_r-m_t+1)} \prod_{i<j}(SNR^{-\alpha_i}-SNR^{-\alpha_j})^2 d\alpha \doteq \quad (82)$$

$$SNR^{-f(\alpha^*)},$$

Where $$f(\alpha) = \sum_{i=1}^{m_t}(2i-1+m_r-m_t)\alpha_i \quad (83)$$

And $$\alpha^* = \arg\inf_{\alpha \in B} f(\alpha). \quad (84)$$

By defining $S_\delta = \{\alpha : \alpha_i > \delta \, \forall i=1, \ldots, m_y\}$ for any $\delta > 0$, we can write $$P_{out}(m_t, m_r, m; r\log(1+SNR)) \geq \int_{B \cap S_\delta} \prod_{i=1}^{m_t} SNR^{-\alpha_i(m_r-m_t+1)} \quad (85)$$

$$\cdot (1-SNR^{-\alpha_i})^{n-m_r-m_t} \prod_{i<j}(SNR^{-\alpha_i} - SNR^{-\alpha_j})^2 d\alpha \quad (86)$$

$$\geq (1-SNR^{-\delta})^{m_t(m-m_r-m_t)} \int_{B \cap S_\delta} \prod_{i=1}^{m_t} SNR^{-\alpha_i(m_r-m_t+1)} \quad (87)$$

$$\cdot \prod_{i<j}(SNR^{-\alpha_i} - SNR^{-\alpha_j})^2 d\alpha \quad (88)$$

$$\doteq SNR^{-f(\alpha_\delta^*)}, \quad (89)$$

Where $$\alpha_\delta^* = \arg\inf_{\alpha \in B \cap S_\delta} f(\alpha). \quad (90)$$

Using the continuity of f, $\alpha_\delta^*$ approaches $\alpha^+$ as $\delta$ goes to zero and we can conclude that $$P_{out}(m_t, m_r, m; r\log(1+SNR)) \doteq SNR^{-f(\alpha^*)}. \quad (91)$$

This result was obtained for the outage probability in Rayleigh channel. From here one can continue as was presented, showing that the error probability is dominated by the outage probability at high SNR for $l \geq m_t + m_r - 1$ (these proofs rely on (91) without making any assumptions on the channel statistics, therefore are true also for the Jacobi channel).

APPENDIX B- additional analysis of the Jacobi MIMO channel

Figure 1:
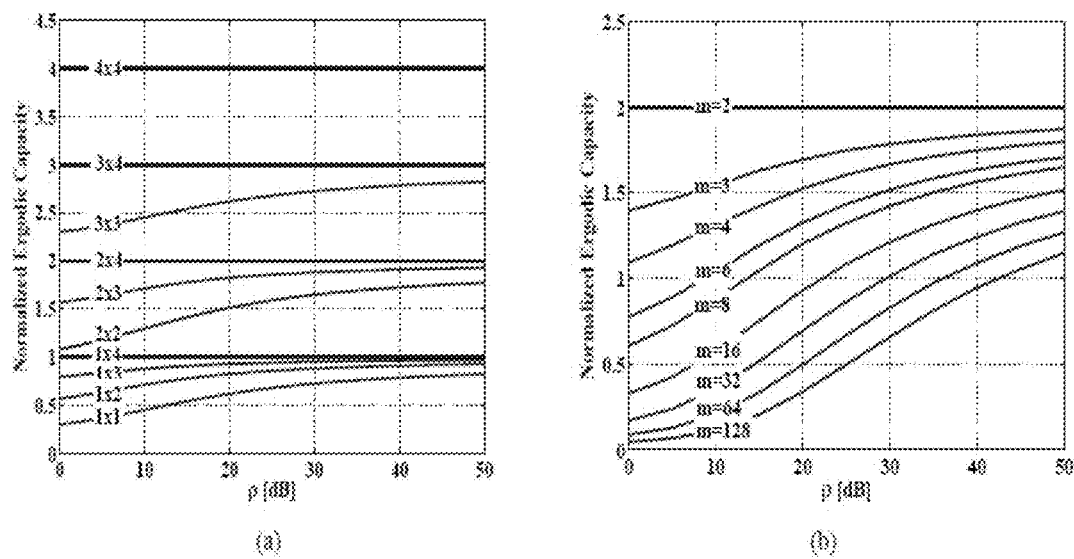
FIG. 1 illustrates normalized ergodic capacities.

The following figures are included in appendix B:

Fig. 1: The ergodic capacity, normalized by $C(1,1,1;\rho) = \log(1+\rho)$, as a function of $\rho$. In (a) the number of supported modes is fixed $m = 4$, various numbers of transmit×receive modes; in (b) the number of addressed modes is fixed $m_t = m_r = 2$, various values of supported modes $m$.

Figure 2:
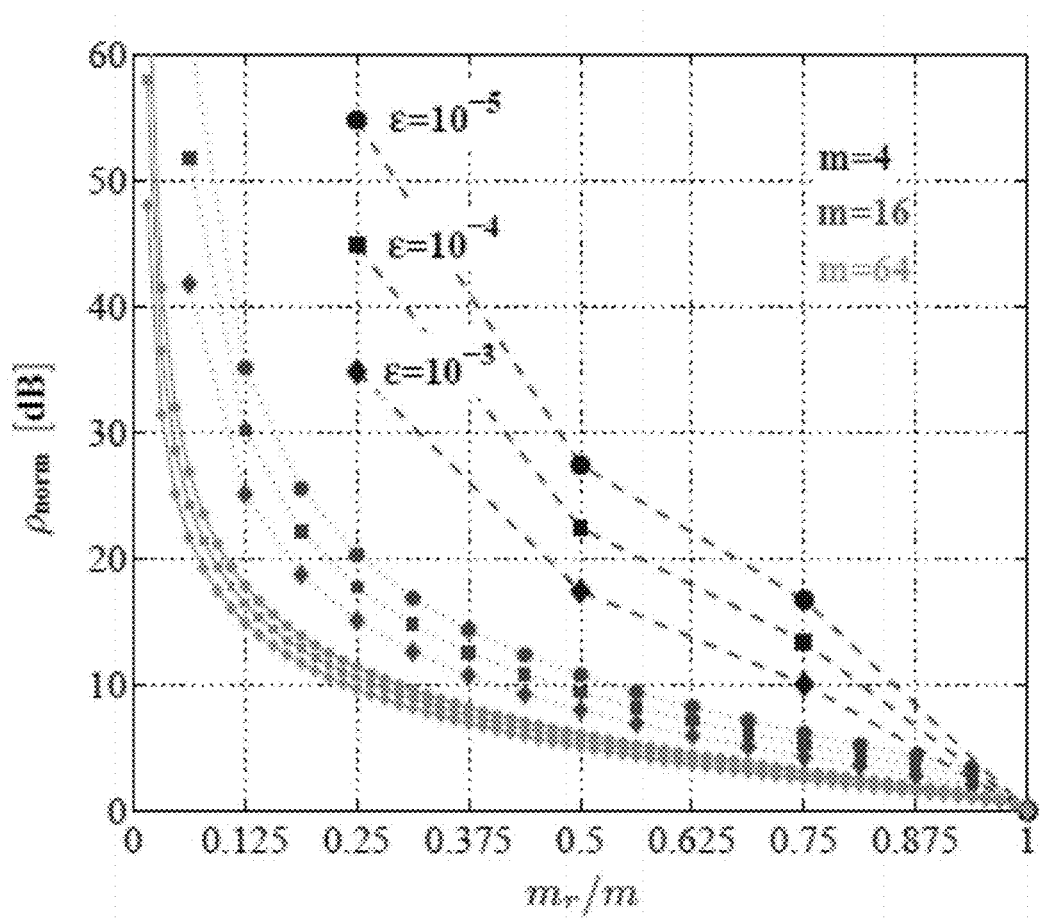
FIG. 2 illustrates channel characters for different outage probabilities.

Fig. 2: $\rho_{norm}$ as a function of $m_r/m$ for $m = 4, 16, 64$ (blue dashed, red dotted, green solid). Curves are drawn for outage probabilities $\epsilon = 10^{-5}, 10^{-4}, 10^{-3}$ (circle, square, diamond).

Figure 3:
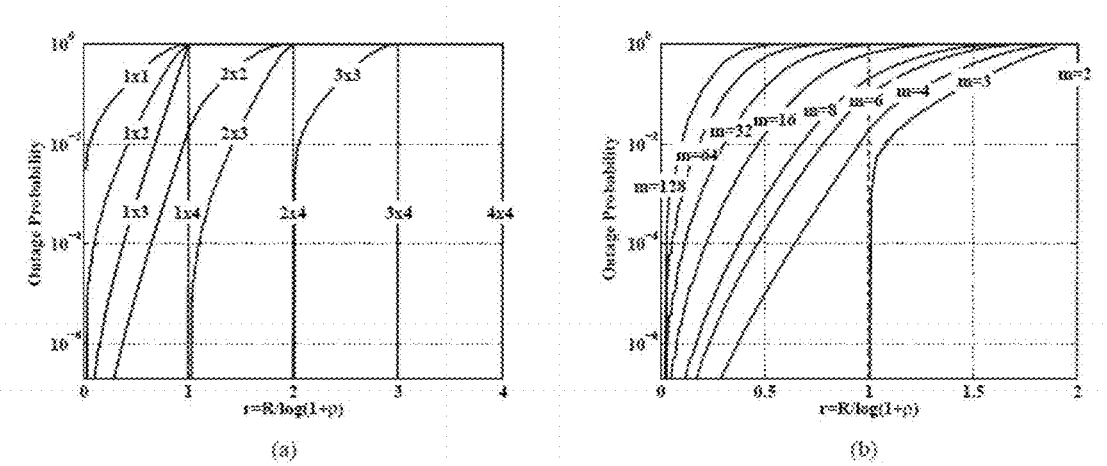
FIG. 3 illustrates outage probabilities versus signal to signal to noise ratios.

Fig. 3: Outage probability vs. normalized rate for $\rho = 20$dB. In (a) the number of supported modes is fixed $m = 4$, various numbers of transmit×receive modes; in (b) the number of addressed modes is fixed $m_t = m_r = 2$, various values of supported modes $m$.

Figure 4:
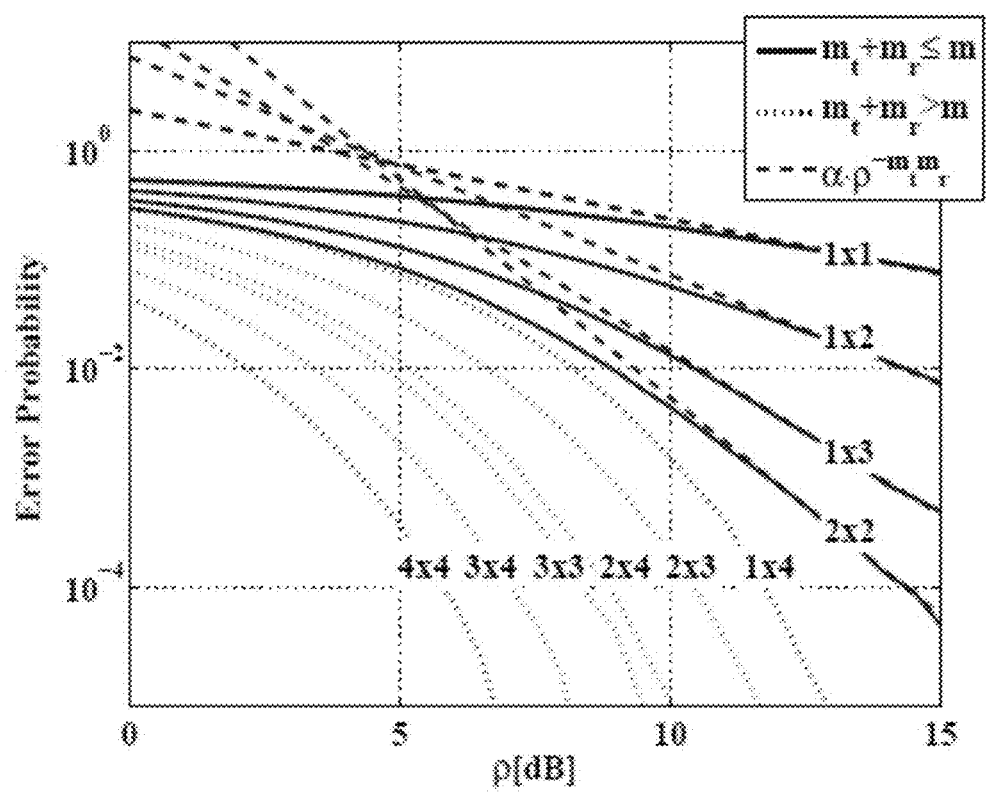
FIG. 4 illustrates average error probabilities versus signal to noise ratios.

Fig. 4: The average error probability of the repetition scheme vs. $\rho$, for fixed number of supported modes $m = 4$ and various numbers of transmit×receive modes. The error probability curves are depict in solid lines for systems satisfying $m_t + m_r \leq m$ and in dotted lines for systems satisfying $m_t + m_r > m$. The dashed lines are given to emphasize the decaying order of the non-exponentially decaying curves.

Figure 5:
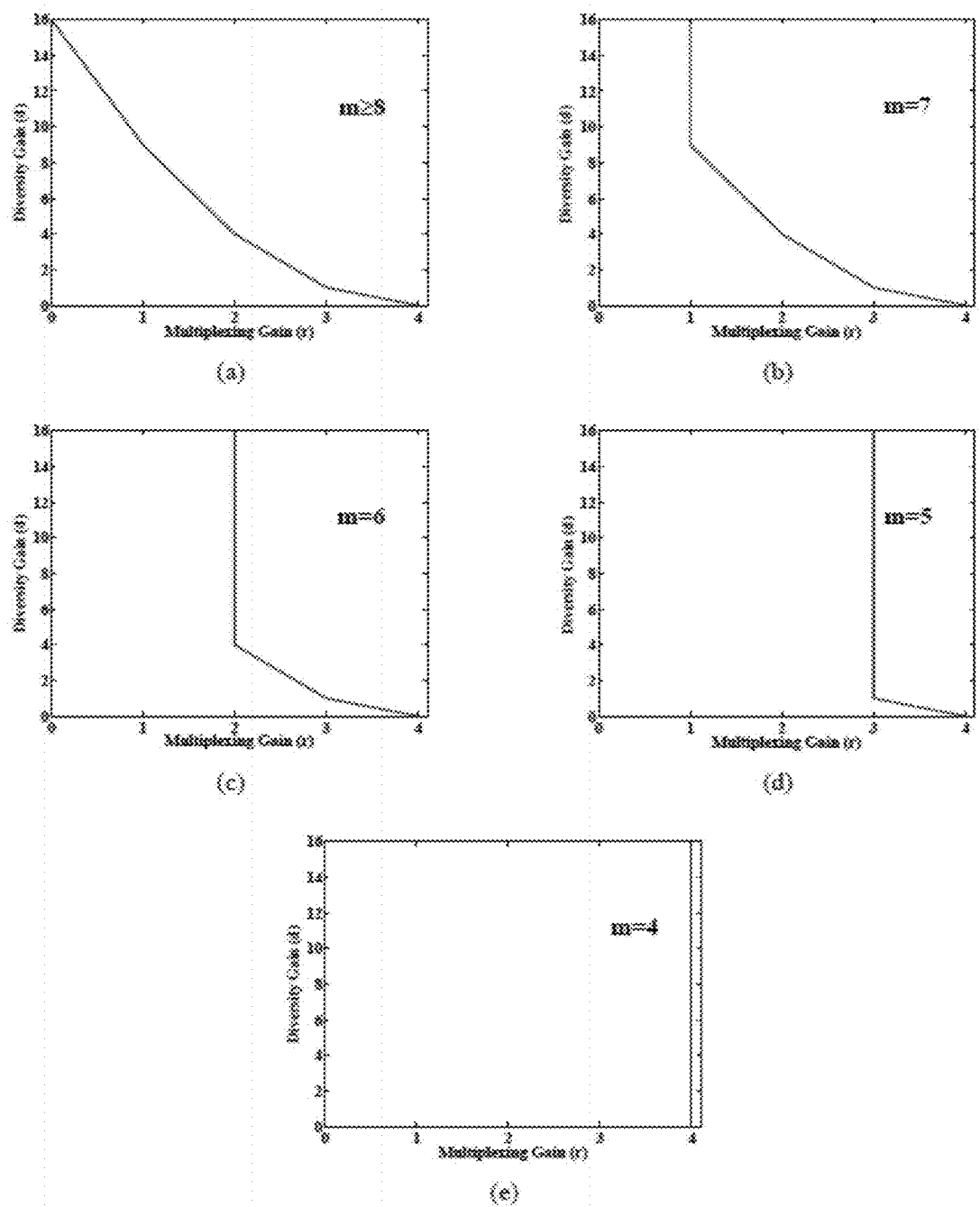
FIG. 5 illustrates various DMT curves.

Fig. 5: Optimal DMT curves for $m_t = m_r = 4$, $l \geq 7$ and various numbers of supported modes $m$.

Figure 6:
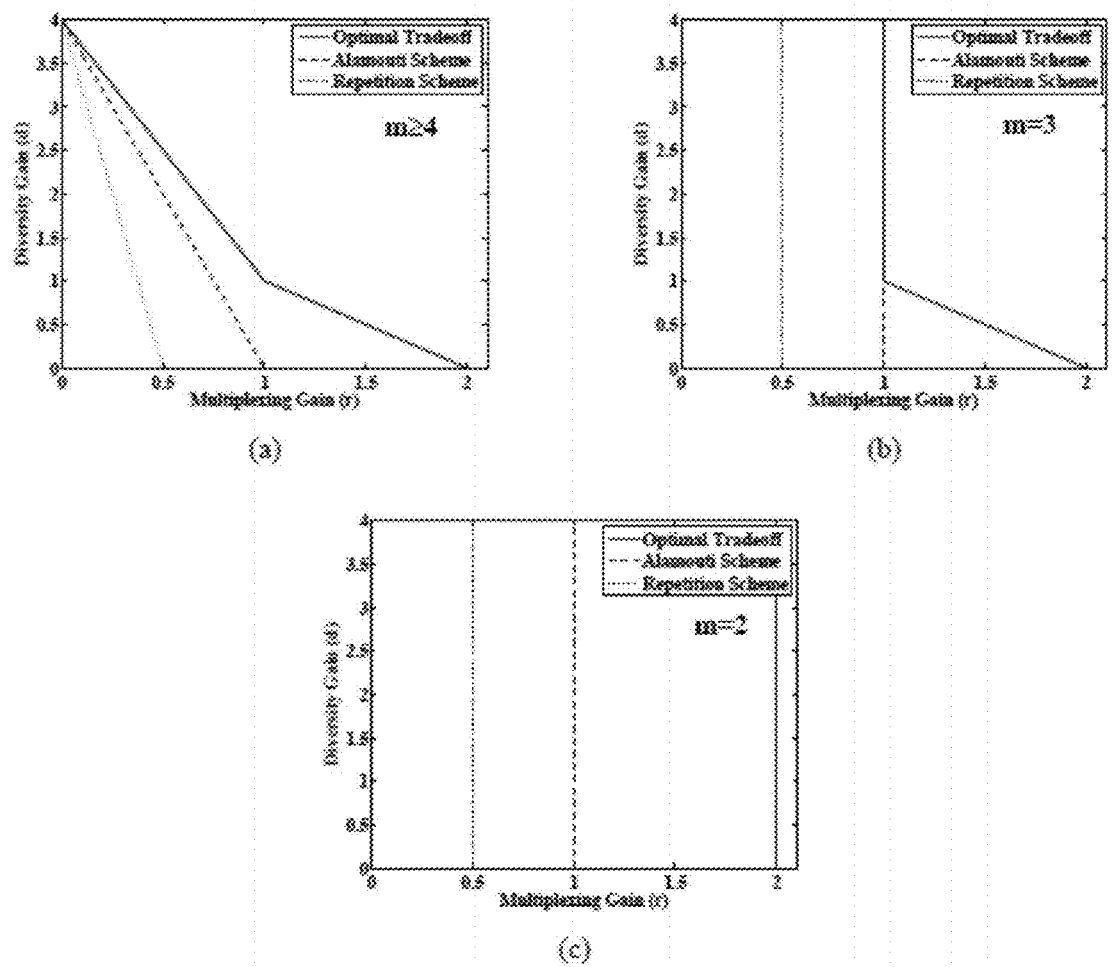
FIG. 6 illustrates diversity versus multiplexing gains for various reception schemes.

Fig. 6: Comparison between Alamouti and the repetition scheme: $l \geq 3$, $m_t = m_r = 2$ and various numbers of supported modes $m$.

Figure 7:
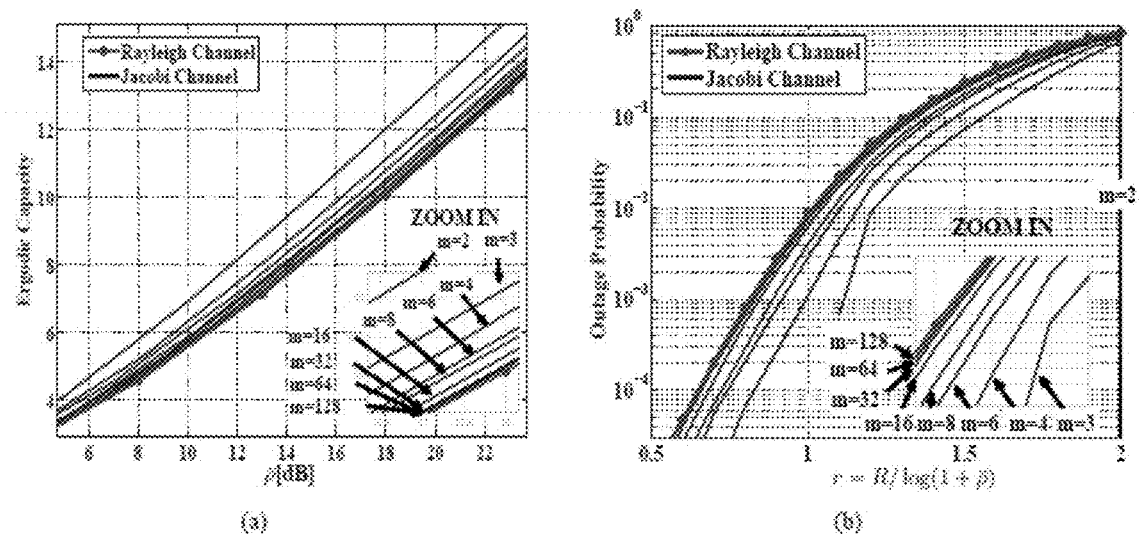
FIG. 7 illustrates ergodic capacities versus signal to noise ratios for various channel models.

Fig. 7: Comparing the $2 \times 2$ Rayleigh and Jacobi models for various numbers of supported modes $m$. $\bar{\rho}$ is the average SNR at each receive antenna. The ergodic capacity is given in (a) and the outage probability for $\bar{\rho} = 20$dB in (b).

APPENDIX B

I. INTRODUCTION

In Multi-Input Multi-Output (MIMO) channels a vector $\underline{x}$ of $m_t$ signals is transmitted, a vector $\underline{y}$ of $m_r$ signals is received, and an $m_r \times m_t$ random matrix $\mathbf{H}$ represents the coupling of the input into the output so that the received vector is $\underline{y} = \mathbf{H}\underline{x} + \underline{z}$ where $\underline{z}$ is a noise vector. In this paper we consider a channel matrix $\mathbf{H}$ which is a sub-matrix of a Haar-distributed unitary matrix, i.e., drawn uniformly from the ensemble of all $m \times m$ unitary matrices, $m \geq m_t, m_r$.

The three classical and most well-studied random matrix ensembles are the *Gaussian*, *Wishart* and *Jacobi* (also known as MANOVA) ensembles [1]–[4]. A common model for the channel matrix $\mathbf{H}$ in fading wireless communication is a matrix with independent Gaussian elements (also known as the Rayleigh model). In that case, $\mathbf{H}^\dagger \mathbf{H}$ is a *Wishart matrix*. For the model assumed in this paper, $\mathbf{H}^\dagger \mathbf{H}$ follows the *Jacobi ensemble*. It turns out that this model is both practically useful and qualitatively different than other fading models such as the Rayleigh [5]–[7], Rician [8]–[10] and Nakagami [10]–[13].

Jacobi ensembles, forming an important part of classical random matrix ensembles, are of considerable interest in connection with multivariate statistics and random matrix theory [1]–[3]. These ensembles have been successfully applied in several problems. One notable example is related to quantum conductance/transmission in mesoscopic systems [4], [14]–[18], where scattering is modeled by a random unitary matrix (owing to flux conservation) and the blocks of unitary matrix are then the transmission/reflection matrices which govern the conductance/transmission properties. This paper provides another application in communication theory.

The motivation to introduce the Jacobi channel comes from recent developments in optical fiber communication. The expected capacity crunch in long haul optical fibers [19], [20] led to proposals for "space-division multiplexing" (SDM) [21], [22], that is to have several links at the same fiber, by either multiple single-mode fiber strands within a fiber cable, multiple cores within a multi-core fiber, or multiple modes within a multi-mode waveguide. An SDM system with $m$ parallel transmission paths per wavelength can potentially multiply the throughput of a certain link by a factor of $m$. Since $m$ can potentially be chosen very large, SDM technology is highly scalable. Now, a significant crosstalk between the optical paths raises the need for MIMO signal processing techniques. Unfortunately, for large size MIMO (large $m$) this is unfeasible currently in the optical rates. Assuming that faster computation will be available in the future and having in mind that replacing optical fibers to support SDM is a long and expensive procedure, a long term design is sought after. To that end and more, it was proposed to design an optical system that can support relatively large number of paths for future use, but at start to address only some of the paths. In this scenario the channel can be modeled as a sub-matrix of a larger unitary matrix, i.e., the Jacobi model is applicable.

This under-addressed channel is discussed in [23] where simulations of the capacities and outage probabilities were presented. In this paper we further analyze the channel in the ergodic and non-ergodic settings, where we provide analytical expression for the capacity, outage probability and the diversity-multiplexing tradeoff. It should be noted that in optical systems the outage probability is an important measure, required to be very low. Evidently, since the entire channel matrix is unitary, when all paths are addressed a zero outage probability can be attained for any transmission rate. An interesting result that comes out of this work is that there are situations, where a partial number of paths are addressed, yet a number of streams are guaranteed to experience zero outage. Thus, choosing the number of addressed paths and the corresponding rate is a very critical design element that highly reflects on the system outage and performance. A preliminary description of our work, in the context of the SDM optical channel is provided in [24].

A possibly practical outcome of this work is a simple communication scheme, with channel state feedback, that achieves the highest rate possible with no outage. The scheme works even when the feedback is "outdated", and it allows simple decoding with no complicated MIMO signal processing, making it plausible for optical communication. We note that while our theoretical findings indicate that the no-outage promise can be attained with no feedback, the quest for such simple schemes is open.

As noted above, the motivation for this work comes from optical fiber communication. Yet, the application of the Jacobi model and the insights that follow from it may be relevant in other cases, such as in-line communication and even wireless communication. While a constant can be applied to account for the average power loss in the medium, the randomness structure of the loss can be modeled using the Jacobi model. As $m$ increases with respect to $m_t, m_r$, the randomness of the absolute received power increases. Evidently, in typical wireless communication, a large fraction of the energy is not captured, and so the channel can be modeled as a small sub-matrix of a large unitary matrix. Indeed, it will be shown that as $m$ becomes larger in comparison to $m_t, m_r$, the Jacobi model (up to a normalizing constant) approaches the Rayleigh model.

The paper is organized as follows. We start by defining the system model and presenting the channel statistics in Section II. An interesting transition threshold is revealed: when the number of addressed paths is large enough, so that $k = m_t + m_r - m > 0$, the statistics of the problem changes. Using this observation we give analytic expressions for the ergodic capacity in Section III. In Section IV we analyze the outage probabilities in the non-ergodic channel and show that for $k > 0$ a strictly zero outage probability is obtainable for $k$ degrees of freedom. Following this finding, we present in Section V a new communication scheme which exploits a channel state feedback to achieve zero outage probability. Section VI discuss the diversity-multiplexing tradeoff of the channel where we show an absorbing difference in the maximum diversity gain between the Rayleigh fading and Jacobi channels. Section VIII discusses the results.

II. SYSTEM MODEL AND CHANNEL STATISTICS

We consider a space-division multiplexing (SDM) system that supports $m$ spatial propagation paths. In tribute to optical communication, in particular multi-mode optical fibers, the initial motivation for this work, we shall refer to these links as modes. Assuming a unitary coupling among all transmission modes the overall transfer matrix $H$ can be described as an $m \times m$ unitary matrix, where each entry $h_{ij}$ represents the complex path gain from transmitted mode $i$ to received mode $j$. We further assume a uniformly distributed unitary coupling, that is, $H$ is drawn uniformly from the ensemble of all $m \times m$ unitary matrices (Haar distributed). Considering a communication system where $m_t \leq m$ and $m_r \leq m$ modes are being addressed by the transmitter and receiver, respectively, the effective transfer matrix is a truncated version of $H$. Under these conditions the channel can be described as $$\underline{y} = \sqrt{\rho}\, H_{11} \underline{x} + \underline{z}, \tag{1}$$

where the vector $\underline{x}$ containing $m_t$ complex components, represents the transmitted signal, the vector $\underline{y}$ containing $m_r$ complex components, represents the received signal, and $\underline{z}$ accounts for the presence of additive Gaussian noise. The $m_r$ components of $\underline{z}$ are statistically independent, circularly symmetric complex zero-mean Gaussian variables of unit energy $\mathbb{E}(|z_j|^2) = 1$. The components of $\underline{x}$ are constrained such that the average energy of each component is equal to 1, i.e., $\mathbb{E}(|x_j|^2) = 1$ for all $j$ [1]. The term $\rho \geq 0$ is proportional to the power per excited mode so that it equals to the signal-to-noise ratio in the single mode case ($m = 1$). The matrix $H_{11}$ is a block of size $m_r \times m_t$ within the $m \times m$ random unitary matrix $H$ $$H = \begin{bmatrix} H_{11} & H_{12} \\ H_{21} & H_{22} \end{bmatrix}. \tag{2}$$

As a first stage in our analysis we establish the relation between the transfer matrix $H_{11}$ and the Jacobi ensemble of random matrices [1]–[3]. Limiting our discussion to complex matrices we state the following definitions:

Definition 1 (Gaussian matrices). *$\mathcal{G}(m,n)$ is $m \times n$ matrix of i.i.d complex entries distributed as $\mathcal{CN}(0,1)$.*

Definition 2 (Wishart ensemble). *$\mathcal{W}(m,n)$, where $m \geq n$, is $n \times n$ Hermitian matrix which can be constructed as $A^\dagger A$, where $A$ is $\mathcal{G}(m,n)$.*

Definition 3 (Jacobi ensemble). *$\mathcal{J}(m_1, m_2, n)$, where $m_1, m_2 \geq n$, is $n \times n$ Hermitian matrix which can be constructed as $A(A+B)^{-1}$, where $A$ and $B$ are $\mathcal{W}(m_1, n)$ and $\mathcal{W}(m_2, n)$, respectively.*

---
[1] The constant per-mode power constraint, as opposed to the constant total power constraint often used in wireless communication, is motivated by the optical fiber nonlinearity limitation. Nevertheless, the total power constraint will be considered as well when needed.

The first two definitions relate to wireless communication [7]. We claim here that the third classical ensemble, the Jacobi ensemble, is relevant to this channel model by relating its eigenvalues to the singular values of $H_{11}$. To that end we quote the well-known [1], [4] joint probability density function (PDF) of the ordered eigenvalues $0 \leq \lambda_1 \leq \ldots \leq \lambda_n \leq 1$ of the Jacobi ensemble $\mathcal{J}(m_1, m_2, n)$ $$f(\lambda_1, \ldots, \lambda_n) = K_{m_1, m_2, n}^{-1} \prod_{i=1}^{n} \lambda_i^{m_1-n}(1-\lambda_i)^{m_2-n} \prod_{i<j}(\lambda_i - \lambda_j)^2 , \qquad (3)$$

where $K_{m_1,m_2,n}$ is a normalizing constant. We say that $n$ variables follow the law of the Jacobi ensemble $\mathcal{J}(m_1, m_2, n)$ if their joint distribution follows (3).

We shall now present the explicit distribution of the channel's singular values by distinguishing between the following two cases:

A. Case I - $m_t + m_r \leq m$

In [25, Theorem 1.5] it was shown that for $m_t$, $m_r$ satisfying the conditions $m_t \leq m_r$ and $m_t + m_r \leq m$, the eigenvalues of $H_{11}^\dagger H_{11}$ have the same distribution as the eigenvalues of the Jacobi ensemble $\mathcal{J}(m_r, m - m_r, m_t)$. For $m_t$, $m_r$ satisfying $m_t > m_r$ and $m_t + m_r \leq m$, since $H^\dagger$ share the same distribution with $H$, the eigenvalues of $H_{11} H_{11}^\dagger$ follow the law of the Jacobi ensemble $\mathcal{J}(m_t, m - m_t, m_r)$. Combining these two results, we can say that the squared non-zero singular values of $H_{11}$ have the same distribution as the eigenvalues of the Jacobi ensemble $\mathcal{J}(m_{max}, m - m_{max}, m_{min})$, where here and throughout this paper we denote $m_{max} = \max\{m_t, m_r\}$ and $m_{min} = \min\{m_t, m_r\}$.

B. Case II - $m_t + m_r > m$

When the sum of transmit and receive modes, $m_t + m_r$, is larger than the total available modes, $m$, the statistics of the singular values change. Clearly, when $H_{11}$ is the complete unitary matrix ($m_t = m_r = m$), all singular values are one. Thus, having in mind that the columns of $H$ are orthonormal, one can think of $m_t + m_r > m$ as a transition threshold in which the size of $H_{11}$ is large enough with respect to the size of the complete unitary matrix to change the singularity statistics. The following Lemma provides the joint distribution of the singular values of $H_{11}$, showing that for any realization of $H_{11}$ there are $m_t + m_r - m$ singular values which are 1. This Lemma is a Corollary of a result of Paige and Saunders [26], however its proof is given here for completeness.

Lemma 1. *Let* $H$ *be an* $m \times m$ *unitary matrix, divided into blocks as in (2), where* $H_{11}$ *is an* $m_r \times m_t$ *block with* $m_t + m_r > m$. *Then* $m_t + m_r - m$ *eigenvalues of* $H_{11}^\dagger H_{11}$ *are 1,* $m_t - m_{min}$ *are 0, and* $m - m_{max}$ *equal to the non-zero eigenvalues of* $H_{22} H_{22}^\dagger$; *if* $H$ *is Haar distributed these* $m - m_{max}$ *eigenvalues follow the law of the Jacobi ensemble* $\mathcal{J}(m - m_{min}, m_{min}, m - m_{max})$.

*Proof:* Since H is unitary we can write $$H_{11}^\dagger H_{11} + H_{21}^\dagger H_{21} = I_{m_t} \tag{4}$$

and $$H_{21} H_{21}^\dagger + H_{22} H_{22}^\dagger = I_{m-m_r} . \tag{5}$$

Let $\{\lambda_i^{(11)}\}_{i=1}^{m_t}$ and $\{\lambda_i^{(21)}\}_{i=1}^{m_t}$ be the eigenvalues of $H_{11}^\dagger H_{11}$ and $H_{21}^\dagger H_{21}$, respectively. From (4) we can write $$\lambda_i^{(11)} = 1 - \lambda_i^{(21)} \quad \forall\, i = 1, \ldots, m_t . \tag{6}$$

Since $H_{21}$ is a block of size $(m-m_r) \times m_t$ where $m-m_r < m_t$, $H_{21}^\dagger H_{21}$ has (at least) $m_t + m_r - m$ zero eigenvalues. Following (6), $H_{11}^\dagger H_{11}$ has $m_t + m_r - m$ eigenvalues which are 1. Now, let $\{\tilde\lambda_i^{(21)}\}_{i=1}^{m-m_r}$ and $\{\tilde\lambda_i^{(22)}\}_{i=1}^{m-m_r}$ be the eigenvalues of $H_{21} H_{21}^\dagger$ and $H_{22} H_{22}^\dagger$, respectively. From (5) we can write $$\tilde\lambda_i^{(21)} = 1 - \tilde\lambda_i^{(22)} \quad \forall\, i = 1, \ldots, m - m_r . \tag{7}$$

Since for any matrix $A$, $A^\dagger A$ and $A A^\dagger$ share the same non-zero eigenvalues we can combine (6) and (7) to conclude that the additional $m - m_r$ eigenvalues of $H_{11}^\dagger H_{11}$ are equal to the $m - m_r$ eigenvalues of $H_{22} H_{22}^\dagger$. Note that $m_t - m_{\min}$ of them are 0. Since the above arguments hold for any unitary matrix, and since $H_{22}$ is a block of size $(m - m_r) \times (m - m_t)$, when H is Haar distributed the results of subsection II-A can be applied, which completes the proof.

■

Lemma 1 reveals an interesting algebraic phenomenon: $k = \max\{m_t + m_r - m, 0\}$ singular values of $H_{11}$ are 1 for any realization of H. This provides some powerful results in the context of Jacobi fading channels. For example, the channel's power $\|H_{11}\|_F^2$, where $\|A\|_F$ denotes the Frobenius norm of $A$, is guaranteed to be at least $k$. Furthermore, $H_{11}$ always comprises an unfaded $k$-dimensional subspace. In what follows we show that this implies a lower bound on the ergodic capacity, an achievable zero outage probability and an "unbounded" diversity gain for certain rates.

III. THE ERGODIC CASE

In the ergodic scenario the channel is assumed to be rapidly changing so that the transmitted signal samples the entire channel statistics. We further assume that the channel realization at each symbol time is known only at the receiver end. It is well known [6] that the channel capacity in that case is achieved by taking $\underline{x}$ to be a vector of circularly symmetric complex zero-mean Gaussian components; and is given by $$C(m_t, m_r, m; \rho) = \max_{\substack{Q:\, Q \succeq 0 \\ Q_{ii} \le 1\, \forall\, i=1,\ldots,m_t}} E[\log\det(I_{m_r} + \rho H_{11} Q H_{11}^\dagger)] , \tag{8}$$

where the maximization is over all covariance matrices of $\underline{x}$, $Q$, that satisfy the power constraints. Now, the capacity in (8) also satisfies $$C(m_t, m_r, m; \rho) \leq \max_{\substack{Q: Q \succeq 0 \\ trace(Q) \leq m_t}} \mathbb{E}[\log \det(I_{m_r} + \rho H_{11} Q H_{11}^\dagger)], \qquad (9)$$

where it is well known [6, Theorem 1] that if the distribution of $H_{11}$ is invariant under unitary permutations, $Q = I_{m_t}$ is the optimal choice for (9). Since $H$ is Haar-distributed, that is invariant under unitary permutations, also $H_{11}$ is invariant under unitary permutations. Thus $Q = I_{m_t}$ is the optimal choice for (8) and by using the following equation $$\det(I_{m_r} + \rho H_{11} H_{11}^\dagger) = \det(I_{m_t} + \rho H_{11}^\dagger H_{11}),$$

we can conclude that the ergodic capacity is given by $$C(m_t, m_r, m; \rho) = \mathbb{E}[\log \det(I_{m_t} + \rho H_{11}^\dagger H_{11})]. \qquad (10)$$

A. *Case I - $m_t + m_r \leq m$*

The following theorem gives an analytical expression to the ergodic capacity for cases where $m_t + m_r \leq m$. Using the joint distribution of the eigenvalues of the Jacobi ensemble we associate the ergodic capacity with the Jacobi polynomials [27, 8.96].

Theorem 1. *The ergodic capacity of the channel defined in (1) with $m_t$, $m_r$ satisfying $m_t + m_r \leq m$, reads*

$$C(m_t, m_r, m; \rho) = \int_0^1 \lambda^\alpha (1-\lambda)^\beta \log(1+\lambda\rho) \sum_{k=0}^{m_{min}-1} b_{k,\alpha,\beta}^{-1} [P_k^{(\alpha,\beta)}(1-2\lambda)]^2 d\lambda \qquad (11)$$

*where $P_k^{(\alpha,\beta)}(x)$ are the Jacobi polynomials*

$$P_k^{(\alpha,\beta)}(x) = \frac{(-1)^k}{2^k k!} (1-x)^{-\alpha}(1+x)^{-\beta} \frac{d^k}{dx^k}\left[(1-x)^{k+\alpha}(1+x)^{k+\beta}\right], \qquad (12)$$

*the coefficients $b_{k,\alpha,\beta}$ are given by*

$$b_{k,\alpha,\beta} = \frac{1}{2k + \alpha + \beta + 1} \binom{2k + \alpha + \beta}{k} \binom{2k + \alpha + \beta}{k + \alpha}^{-1},$$

*and $\alpha = |m_r - m_t|$, $\beta = m - m_t - m_r$.*

*Proof:* See Appendix A, where the Gaudin-Mehta method [28] is applied to analyze the ergodic capacity. ∎

B. Case II - $m_t + m_r > m$

Applying Lemma 1 to the channel capacity given in (10) readily results in the following theorem.

Theorem 2. *The ergodic capacity of the channel defined in* (1) *with $m_t$, $m_r$ satisfying $m_t + m_r > m$, reads*

$$C(m_t, m_r, m; \rho) = (m_t + m_r - m)C(1,1,1;\rho) + C(m - m_r, m - m_t, m; \rho), \quad (13)$$

*where $C(1,1,1;\rho)$ is the SISO channel capacity $\log(1 + \rho)$.*

*Proof:* According to (10) the ergodic capacity satisfies $$C(m_t, m_r, m; \rho) = \mathbb{E}[\log\det(\mathbf{I}_{m_t} + \rho \mathbf{H}_{11}^\dagger \mathbf{H}_{11})] \quad (14)$$

$$= \mathbb{E}\left[\sum_{i=1}^{m_t} \log(1 + \rho \lambda_i)\right], \quad (15)$$

where $\{\lambda_i\}_{i=1}^{m_t}$ are the eigenvalues of $\mathbf{H}_{11}^\dagger \mathbf{H}_{11}$. According to Lemma 1, $m_t + m_r - m$ eigenvalues are 1 and the rest are equal to the $m - m_r$ eigenvalues of $\mathbf{H}_{22} \mathbf{H}_{22}^\dagger$. Applying that into (15) results $$C(m_t, m_r, m; \rho) = (m_t + m_r - m)\log(1 + \rho) + \mathbb{E}[\log\det(\mathbf{I}_{m-m_r} + \rho \mathbf{H}_{22}\mathbf{H}_{22}^\dagger))]. \quad (16)$$

∎

Note that the second term on the right-hand-side of (13), $C(m - m_r, m - m_t, m; \rho)$, is given by Theorem 1 and reduces to 0 when $m_t$ or $m_r$ is equal to $m$. Thus, (13) suggests that for systems with $k = m_t + m_r - m > 0$, the ergodic capacity is the sum capacities of $k$ unfaded SISO capacities and a Jacobi MIMO channel with $m - m_r$ transmit modes and $m - m_t$ receive modes.

IV. THE NON-ERGODIC CASE

In the non-ergodic scenario the channel matrix is drawn randomly but rather assumed to be constant within the entire transmission period of each code-frame. The figure of merit in the non-ergodic case is the *outage probability* defined as the probability that the mutual information induced by the channel realization is lower than the rate $R$ at which the link is chosen to operate. Note that we assume that the channel instantiation is unknown at the transmitter, thus it can not adapt the transmission rate. However, the channel is assumed to be known at the receiver end. By taking an input vector of circularly symmetric complex zero-mean Gaussian variables with covariance matrix $Q$ the mutual information is maximized and the outage probability can be expressed as $$P_{out}(m_t, m_r, m; R) = \inf_{Q: Q \succeq 0} Pr\left[\log\det(\mathbf{I}_{m_r} + \rho \mathbf{H}_{11} Q \mathbf{H}_{11}^\dagger) < R\right], \quad (17)$$

where the minimization is over all covariance matrices $Q$ satisfying the power constraints. Since the statistics of $\mathbf{H}_{11}$ are invariant under unitary permutations, the optimal choice of $Q$, when applying *constant per-mode power constraint*, is simply the identity matrix. We note that when imposing *total power constraint*, the optimal choice of $Q$ may depend on $R$ and $\rho$ and in general is unknown, even for the Rayleigh channel. Nevertheless, when $\rho \gg 1$ the identity matrix is approximately the optimal $Q$ (see section VI). Thus, in the following we make the simplified assumption that the transmitted covariance matrix is the commonly used choice $Q = \mathbf{I}_{m_t}$.

Now, let the transmission rate be $R = r\log(1 + \rho)$ (bps/Hz) and let $\underline{\lambda} = \{\lambda_i\}_{i=1}^{m_{min}}$ be the ordered non-zeros eigenvalues of $\mathbf{H}_{11}^\dagger \mathbf{H}_{11}$; we can write $$P_{out}(m_t, m_r, m; r\log(1+\rho)) = Pr\left[\log\det(\mathbf{I}_{m_t} + \rho\mathbf{H}_{11}^\dagger\mathbf{H}_{11}) < R\right] \quad (18)$$

$$= Pr\left[\prod_{i=1}^{m_{min}}(1+\rho\lambda_i) < (1+\rho)^r\right], \quad (19)$$

and evaluate this expression by applying the statistics of $\underline{\lambda}$.

*A. Case I - $m_t + m_r \leq m$*

Using (3) we can apply the joint distribution of $\underline{\lambda}$ into (19) to get $$P_{out}(m_t, m_r, m; r\log(1+\rho)) = K_{m_t,m_r,m}^{-1}\int_{\mathcal{B}}\prod_{i=1}^{m_{min}}\lambda_i^{|m_r-m_t|}(1-\lambda_i)^{m-m_r-m_t}\prod_{i<j}(\lambda_i-\lambda_j)^2 d\underline{\lambda}, \quad (20)$$

where $K_{m_t,m_r,m}$ is a normalizing factor and $\mathcal{B}$ describes the outage event $$\mathcal{B} = \left\{\underline{\lambda}:\ \prod_{i=1}^{m_{min}}(1+\rho\lambda_i) < (1+\rho)^r\right\}.$$

This gives an analytical expression to the outage probability.

Example 1. *Suppose $m_t = 1$ and $m_r, m$ satisfy $m \geq 1 + m_r$. In that case the outage probability is given by*

$$P_{out}(1,m_r,m;R) = K_{1,m_r,m}^{-1}\int_0^{(2^R-1)/\rho}\lambda^{m_r-1}(1-\lambda)^{m-m_r-1}d\lambda. \quad (21)$$

*Thus, we can write*

$$P_{out}(1,m_r,m;R) = \frac{B((2^R-1)/\rho;m_r,m-m_r)}{B(1;m_r,m-m_r)}, \quad (22)$$

*where $B(x;a,b)$ is the incomplete beta function. Hence, to support an outage probability smaller than $\epsilon$, $R$ and $\rho$ have to satisfy*

$$\frac{\rho}{2^R-1} \geq \rho_{norm} = 1/B^{-1}(\epsilon B(1;m_r,m-m_r);m_r,m-m_r),$$

where $B^{-1}(x;a,b)$ is the inverse function of $B(x;a,b)$. $\rho_{norm}$ is the normalized *signal-to-noise ratio at the transmitter, is proportional to the received* normalized *signal-to-noise ratio, and essentially measures the minimal additional power required to support a target rate R with outage probability smaller than $\epsilon$ (additional power over the minimal required in SISO unfading channel ($m = m_r$)). As $\rho_{norm}$ is smaller one can afford higher data rate or smaller $\rho$ (smaller transmission power)*.

B. Case II - $m_t + m_r > m$

Applying Lemma 1 to (19) gives the following.

Theorem 3. *The outage probability of the channel defined in* (1)*, with $m_t$, $m_r$ satisfying $m_t + m_r > m$, satisfies*

$$P_{out}(m_t, m_r, m; r\log(1+\rho)) = P_{out}(m - m_r, m - m_t, m; \tilde{r}\log(1+\rho)), \tag{23}$$

*where $\tilde{r}$ is the larger between $r - (m_t + m_r - m)$ and 0.*

*Proof:* According to (19), the outage probability is given by $$P_{out}(m_t, m_r, m; r\log(1+\rho)) = Pr\left[\prod_{i=1}^{m_t}(1+\rho\lambda_i) < (1+\rho)^r\right], \tag{24}$$

where $\{\lambda_i\}_{i=1}^{m_t}$ are the eigenvalues of $H_{11}^\dagger H_{11}$. By applying Lemma 1 we get $$P_{out}(m_t, m_r, m; r\log(1+\rho)) = Pr\left[\prod_{i=1}^{m-m_r}(1+\rho\tilde{\lambda}_i) < (1+\rho)^{r-(m_t+m_r-m)}\right], \tag{25}$$

where $\{\tilde{\lambda}_i\}_{i=1}^{m-m_r}$ are the eigenvalues of $H_{22}H_{22}^\dagger$. When $\tilde{r} = r - (m_t + m_r - m) < 0$ we get $P_{out}(m_t, m_r, m; r\log(1+\rho)) = 0$. ∎

Note that the right-hand-side drops to 0, when $m_r$ or $m_t$ equals $m$. Most importantly, when $r < m_t + m_r - m$, $\tilde{r} = 0$, implying that for such rates zero outage probability is achievable. In addition, when $r \geq m_t + m_r - m > 0$, Eq. (23) implies that the outage probability is identical to that of a channel with $m - m_r$ modes addressed by the transmitter and $m - m_t$ modes addressed by the receiver, which is designed to support a transmission rate equivalent to $\tilde{r}$ single-mode channels. Thus the right-hand-side of (23) applies to Eq. (20).

V. ACHIEVING THE NO-OUTAGE PROMISE

In the previous section we saw that for systems satisfying $k = m_t + m_r - m > 0$, a zero outage probability is achievable for any transmission rate below $R = k\log(1+\rho)$. In this section we present a new communication scheme that achieves this promise with a transmission rate arbitrarily close to $R = k\log(1+\rho)$. Using simple manipulations, the scheme exploits a (delayed) channel state information (CSI) feedback to transform the channel into $k$ independent SISO channels, supporting $k$ streams (degrees of freedom) with zero outage probability.

Let
$$\mathbf{H}^{(i)} = \begin{bmatrix} \mathbf{H}_{11}^{(i)} & \mathbf{H}_{12}^{(i)} \\ \mathbf{H}_{21}^{(i)} & \mathbf{H}_{22}^{(i)} \end{bmatrix}$$

be the unitary matrix realization at channel use $i$ and let $$\underline{y}^{(i)} = \sqrt{\rho}\mathbf{H}_{11}^{(i)}\underline{x}^{(i)} + \underline{z}^{(i)}$$

be the received signal. We assume a perfect knowledge of $\mathbf{H}_{11}^{(i)}$ at the receiver and a noiseless CSI feedback with a delay of a single channel use. Since $\mathbf{H}^{(i)}$ is unitary, a matrix $\mathbf{H}_{21}^{(i)}$ can be computed to complete $\mathbf{H}_{11}^{(i)}$ into orthonormal columns. Therefore, we shall assume that the receiver noiselessly communicates this computed $\mathbf{H}_{21}^{(i)}$ to the transmitter. Nevertheless, note that for $m_t + m_r - m > 1$ and certain matrix instantiations, the computed $\mathbf{H}_{21}^{(i)}$ is not unique and can be chosen wisely (see Remark 4).

Now, let the transmitter excites the following signal from the addressed modes at each channel use $i = 1, \ldots, n$ $$\underline{x}^{(i)} = \begin{bmatrix} x_1^{(i)} \\ \vdots \\ x_{m_t+m_r-m}^{(i)} \\ \mathbf{H}_{21}^{(i-1)}\underline{x}^{(i-1)} \end{bmatrix}.$$

That is, the transmitter conveys $m_t + m_r - m$ new information bearing symbols and $\mathbf{H}_{21}^{(i-1)}\underline{x}^{(i-1)}$, a linear combination of the signal that was transmitted in the previous channel use ($\underline{x}^{(0)}$ is a vector of zeros). Note that $\mathbf{H}$ is unitary, thus the power constraint is left satisfied.

We shall now assume that after the last signal $\underline{y}^{(n)}$ is received, the receiver gets as a side information the following noisy measures $$\underline{y}_{\text{si}} = \sqrt{\rho}\mathbf{H}_{21}^{(n)}\underline{x}^{(n)} + \underline{z}_{\text{si}}, \qquad (26)$$

where the components of $\underline{z}_{\text{si}}$ are i.i.d. $\mathcal{CN}(0,1)$. Thus the receiver can linearly combine $\underline{y}^{(n)}$ and $\underline{y}_{\text{si}}$ in the following manner $$\underline{\tilde{y}}^{(n)} = \begin{bmatrix} \mathbf{H}_{11}^{(n)\dagger} & \mathbf{H}_{21}^{(n)\dagger} \end{bmatrix} \begin{bmatrix} \underline{y}^{(n)} \\ \underline{y}_{\text{si}} \end{bmatrix} \qquad (27)$$

to yield $$\tilde{\underline{y}}^{(n)} = \sqrt{\rho}\underline{x}^{(n)} + \tilde{\underline{z}} \qquad (28)$$

where the entries of $\tilde{\underline{z}}$ are i.i.d. $\mathcal{CN}(0,1)$. We remind that the first $m_t + m_r - m$ entries of $\underline{x}^{(n)}$ are new information bearing symbols and the last entries are equal to $\mathbf{H}_{21}^{(n-1)}\underline{x}^{(n-1)}$. Thus, the last $m - m_r$ entries of $\tilde{\underline{y}}^{(n)}$, denoted $\underline{\breve{y}}$, satisfy $$\underline{\breve{y}} = \sqrt{\rho}\mathbf{H}_{21}^{(n-1)}\underline{x}^{(n-1)} + \underline{\breve{z}} \; .$$

where $\underline{\breve{z}}$ are the last $m - m_r$ entries of $\tilde{\underline{z}}$. Again, the receiver can linearly combine $\underline{y}^{(n-1)}$ and $\underline{\breve{y}}$ as $$\tilde{\underline{y}}^{(n-1)} = \begin{bmatrix} \mathbf{H}_{11}^{(n-1)\dagger} & \mathbf{H}_{21}^{(n-1)\dagger} \end{bmatrix} \begin{bmatrix} \underline{y}^{(n-1)} \\ \underline{\breve{y}} \end{bmatrix} \qquad (29)$$

to yield measures of $\underline{x}^{(n-1)}$ as in Eq. (28). Repeating this procedure for $i = n-1 \to 1$ results in $m_t + m_r - m$ independent streams of measures $$\begin{bmatrix} \tilde{y}_1^{(1)} \\ \vdots \\ \tilde{y}_{m_t+m_r-m}^{(1)} \end{bmatrix}, \ldots, \begin{bmatrix} \tilde{y}_1^{(n)} \\ \vdots \\ \tilde{y}_{m_t+m_r-m}^{(n)} \end{bmatrix} \; .$$

The scheme above is feasible if the side information after channel use $n$ is being conveyed by the transmitter through a neglectable number of channel uses (with respect to $n$, see Remark 3). In that case the receiver can construct $m_t + m_r - m$ independent SISO channels, each with signal-to-noise ratio $\rho$. Thus the scheme supports a rate arbitrarily close (as $n$ is larger) to $(m_t + m_r - m)\log(1 + \rho)$ with zero outage probability. Note that the scheme essentially completes the singular values of the channel to 1. This is feasible since $m - m_r < m_t$, thus at each channel use the transmitter can transmit $\mathbf{H}_{21}^{(i-1)}\underline{x}^{(i-1)}$, a signal of $m - m_r$ entries, and new symbols.

The scheme presented above can be easily expanded to the case where the feedback delay is $l$ channel uses. In that case the transmitter conveys at each channel use $m_t + m_r - m$ new information bearing symbols and $\mathbf{H}_{21}^{(i-l)}\underline{x}^{(i-l)}$, a linear combination of the signal that was transmitted $l$ channel uses before. After channel use $n$, the transmitter would have to convey $l$ noisy measures of the last $l$ signals, so that the receiver could construct $m_t + m_r - m$ independent SISO channels. This can be done in a fixed number of channel uses (see Remark 3), thus as $n$ is larger, the transmission rate of the scheme approaches $(m_t + m_r - m)\log(1 + \rho)$.

Remark 1 (Outdated feedback). *Our scheme exploits a noiseless CSI feedback system to communicate a (possibly) outdated information - the channel realization in previous channel uses. Thus, the feedback is not required to be fast, that is, no limitations on the delay time $l$. However,*

*if $l$ is smaller than the coherence time of the channel, the feedback may carry information about the current channel realization. Thus, the transmitter can exploit the up-to-date feedback to use more efficient schemes. Nevertheless, for systems with a long delay time (e.g., relatively long distance optical fibers), the channel can be regarded as non-ergodic with an outdated feedback. In these cases our scheme efficiently achieves zero outage probability.*

Remark 2 (Simple decoding). *The scheme linearly process the received signals to construct $m_t + m_r - m$ independent streams of measures, each with signal-to-noise $\rho$. This allows the decoding stage to be simple, where a SISO channel decoder can be used, removing the need for further MIMO signal processing.*

Remark 3 (Side information measures). *For a feedback with a delay of $l$ channel uses, the transmitter has to convey $\mathbf{H}_{21}^{(i)}\mathbf{x}^{(i)}$, for each $i = n - (l-1), \ldots, n$, such that the receiver can extracted a vector of noisy measures with signal-to-noise ratio that is not smaller than $\rho$. This is feasible with a finite number of channel uses. For example, the repetition scheme can be used to convey these measures (see Section VI Example 2). Suppose each $\mathbf{H}_{21}^{(i)}\mathbf{x}^{(i)}$ is conveyed to the receiver within $N_{si}$ channel uses (e.g., for the repetition scheme $N_{si} = m_t(m - m_r)$). By taking large enough $n$ (with respect to $l \cdot N_{si}$) one can approach the rate $(m_t + m_r - m)\log(1 + \rho)$.*

Remark 4 (Uniqueness of $\mathbf{H}_{21}$). *The scheme can be further improved to support even an higher data rate with zero outage probability. For example, the last $m - m_r$ entries of the transmitted signal at the first channel use can be used to excite information bearing symbols instead of the zeros symbols. Furthermore, as was mentioned above, when $m_t + m_r - m > 1$, $\mathbf{H}_{21}^{(i)}$ is not unique; there are many $(m - m_r) \times m_t$ matrices that complete the columns of $\mathbf{H}_{11}^{(i)}$ into orthonormal vectors. Thus, the receiver can choose $\mathbf{H}_{21}^{(i)}$ to be the one with the largest number of zeros rows. Now, at time $i+1$ the transmitter excites $m_t + m_r - m$ new symbols and $\mathbf{H}_{21}^{(i)}\mathbf{x}^{(i)}$, a retransmission of $\mathbf{x}^{(i)}$, the transmitted signal at time $i$. With an appropriate choice of $\mathbf{H}_{21}^{(i)}$, $\mathbf{H}_{21}^{(i)}\mathbf{x}^{(i)}$ contains entries that are zero. Instead, these entries can contain additional new information bearing symbols. An open question is how to further enhance the data rate. One would like to exploit the feedback to approach the empirical capacity for any realization of $\mathbf{H}_{11}$. Note that this rate is achievable with an up-to-date feedback. Further approaching this rate with an outdated feedback system (and with zero outage probability) is left for future research.*

VI. DIVERSITY MULTIPLEXING TRADEOFF

Using multiple modes/antennas is an important means to improve performance in optical/wireless systems. The performance can be improved by increasing the transmission rate or by reducing the error probability. A coding scheme can achieve both performance gains, however there is a fundamental tradeoff between how much each can get. This tradeoff is known as the diversity-multiplexing tradeoff (DMT). The optimal tradeoff for the Rayleigh fading channel was found in [29][2]. In this section we seek to find the optimal tradeoff for the Jacobi channel.

To better understand the concepts of diversity and multiplexing gains in the Jacobi channel we start with the following example.

Example 2 (Repetition scheme). *Suppose the transmitter excites the following ($m_t$ entries) signals in each $m_t$ consecutive channel uses:*

$$\begin{bmatrix} x \\ 0 \\ \vdots \\ 0 \end{bmatrix}, \begin{bmatrix} 0 \\ x \\ \vdots \\ 0 \end{bmatrix}, \ldots, \begin{bmatrix} 0 \\ 0 \\ \vdots \\ x \end{bmatrix}.$$

*Let us make the simplifying assumptions that $x$ is an uncoded QPSK symbol and that $m_t \leq m_r$ (similar results can be obtained also for $m_t > m_r$ and for higher constellation sizes). We further assume that the channel realization is known at the receiver and is constant within the $m_t$ channel uses. It can be shown that in that case the average error probability satisfies*

$$P_e(\rho) \doteq \mathbb{E}[\exp(-\frac{\rho}{2}\sum_{i=1}^{m_t} \lambda_i)], \tag{30}$$

*where the expectation is over $\{\lambda_i\}_{i=1}^{m_t}$, the eigenvalues of $H_{11}^\dagger H_{11}$. Here and throughout the rest of the paper we use $\doteq$ to denote* exponential equality, *i.e., $f(\rho) \doteq \rho^d$ denotes*

$$\lim_{\rho \to \infty} \frac{\log f(\rho)}{\log \rho} = d. \tag{31}$$

*Now, for $m_t + m_r \leq m$, we can apply the joint distribution of the* unordered *eigenvalues of a Jacobi matrix $\mathcal{J}(m_r, m - m_r, m_t)$, to write*

$$P_e(\rho) \doteq \frac{K_{m_t,m_r,m}^{-1}}{m_t!} \int_0^1 \cdots \int_0^1 \prod_{i=1}^{m_t} \lambda_i^{m_r - m_t}(1 - \lambda_i)^{m - m_r - m_t} e^{-\frac{\rho}{2}\lambda_i} \prod_{i<j}(\lambda_j - \lambda_i)^2 \prod_{i=1}^{m_t} d\lambda_i. \tag{32}$$

*Note that the term*

$$\prod_{1 \leq i < j \leq m_t}(\lambda_j - \lambda_i)$$

*is the determinant of the Vandermonde matrix*

$$\begin{bmatrix} 1 & \cdots & 1 \\ \lambda_1 & \cdots & \lambda_{m_t} \\ \vdots & & \vdots \\ \lambda_1^{m_t - 1} & \cdots & \lambda_{m_t}^{m_t - 1} \end{bmatrix}$$

[2] See further studies on the DMT of infinite constellations and correlated MIMO channels in [30]–[33].

*Thus we can write*

$$\prod_{1 \leq i < j \leq m_t} (\lambda_j - \lambda_i)^2 = \sum_{\sigma_1, \sigma_2 \in S_{m_t}} (-1)^{sgn(\sigma_1)+sgn(\sigma_2)} \prod_{i=1}^{m_t} \lambda_i^{\sigma_1(i)+\sigma_2(i)-2}, \quad (33)$$

*where $S_{m_t}$ is the set of all permutations of $\{1, \ldots, m_t\}$ and $sgn(\sigma)$ denotes the signature of the permutation $\sigma$. Applying (33) into (32) results*

$$P_e(\rho) \doteq \frac{K_{m_t,m_r,m}^{-1}}{m_t!} \sum_{\sigma_1,\sigma_2 \in S_{m_t}} (-1)^{sgn(\sigma_1)+sgn(\sigma_2)} \prod_{i=1}^{m_t} \int_0^1 \lambda_i^{m_r-m_t+\sigma_1(i)+\sigma_2(i)-2} \times$$
$$\times (1-\lambda_i)^{m-(m_r+m_t)} e^{-\frac{\rho}{2}\lambda_i} d\lambda_i. \quad (34)$$

*It can be further shown that the right-hand-side of above is dominated (for large $\rho$) by the following term*

$$\frac{K_{m_t,m_r,m}^{-1}}{m_t!} \sum_{\sigma_1,\sigma_2 \in S_{m_t}} (-1)^{sgn(\sigma_1)+sgn(\sigma_2)} \prod_{i=1}^{m_t} (m_r - m_t + \sigma_1(i) + \sigma_2(i) - 2)! \left(\frac{\rho}{2}\right)^{-(m_r-m_t+\sigma_1(i)+\sigma_2(i)-1)}.$$
(35)

*Thus, for $m_t + m_r \leq m$, the average error probability satisfies*

$$P_e(\rho) \doteq \rho^{-\sum_{i=1}^{m_t}(m_r-m_t+2i-1)} \quad (36)$$
$$\doteq \rho^{-m_r m_t}. \quad (37)$$

*For $m_t + m_r > m$, by applying Lemma 1 into (30) we get*

$$P_e(\rho) \doteq e^{-\frac{\rho(m_t+m_r-m)}{2}} \mathbb{E}[\exp(-\frac{\rho}{2} \sum_{i=1}^{m-m_r} \tilde{\lambda}_i)],$$

*where $\{\tilde{\lambda}_i\}_{i=1}^{m-m_r}$ are the eigenvalues of $H_{22}H_{22}^\dagger$. Thus, we can conclude that the error probability of the repetition scheme satisfies*

$$P_e(\rho) \doteq \begin{cases} \rho^{-m_r m_t} &, m_t + m_r \leq m \\ e^{-\frac{\rho(m_t+m_r-m)}{2}} \rho^{-(m-m_t)(m-m_r)} &, m_t + m_r > m \end{cases} \quad (38)$$

Eq. (38) implies that when using $m_t$ transmit and $m_r$ receive modes, where $m_t + m_r \leq m$, the exponent of the dominant term in the average error probability is $-m_r m_t$. Comparing to a system with a single transmit and a single receive mode, the decaying order of the average error probability is improved by a factor of $m_r m_t$. This gain is termed *diversity gain*. When enough modes are being addressed by the transmitter and the receiver to satisfy $m_t + m_r > m$, we get an average error probability that exponentially decays with $\rho$; that is, an unbounded diversity gain. Thus, as more modes are being addressed, the diversity gain of the repetition scheme is greater. Since the total transmitted power is spread over all $m$ available modes, addressing only some modes at the receiver results in a power loss. As the number of these modes is larger, the probability for a substantial power loss is smaller; hence, smaller error probability. As the signal is transmitted from more modes, the average power in each receive mode is larger since the propagation paths are orthogonal. This is in analogy to the Rayleigh channel where as the signal passes through more (independent) faded paths, the decaying order of the error probability increases. However, it turns out that in the Jacobi channel there is a transition threshold in which enough modes are being addressed to ensure a certain received power. This results in an exponentially decaying error probability for certain rates.

Now, using multiple modes can also improve the data rate of the system. In the example above the rate is fixed, $R(\rho) = 1/m_t$ (bps/Hz) for any $\rho$. Increasing the data rate with $\rho$ to support a rate of $R(\rho) = r \log \rho$ (bps/Hz) for some $0 < r < 1/m_t$, can be achieved by increasing the constellation size of the transmitted signal. In that case the data rate is improved by a factor of $r$ comparing to a system with a single transmit and a single receive mode. This gain is termed *multiplexing gain* [3]. By increasing the constellation size, however, the minimum distance between the constellation points decreases, resulting an error probability with a smaller decaying order; that is, a smaller diversity gain. Thus, there is a tradeoff between diversity and multiplexing gains.

We now turn to analyze the DMT in the Jacobi model. To that end, we formalize the concepts of diversity gain and multiplexing gain by quoting some definitions from [29] [4].

Definition 4. *Let a scheme be a family of codes $\{C(\rho)\}$ of block length $l$, one at each $\rho$ level. Let $R(\rho)$ (bps/Hz) be the rate of the code $C(\rho)$. A scheme $\{C(\rho)\}$ is said to achieve spatial multiplexing gain $r$ and diversity gain $d$ if the data rate satisfies*

$$\lim_{\rho \to \infty} \frac{R(\rho)}{\log \rho} = r$$

*and the average error probability satisfies*

$$\lim_{\rho \to \infty} \frac{P_e(\rho)}{\log \rho} = -d .$$

*For each $r$, define $d^*(r)$ to be the supremum of the diversity advantage achieved over all schemes.*

A. *Case I - $m_t + m_r \leq m$*

The following Theorem provides the optimal DMT of a Jacobi channel with $m_t$, $m_r$ and $m$ satisfying $m_t + m_r \leq m$. In [29] it was shown that the average error probability in the high SNR regime (large $\rho$) is dominated by the outage probability. Furthermore, the outage probability for

---

[3] The multiplexing gain in the given example is 0.

[4] Note that in [29] the definitions in 4 were made with respect to the average signal-to-noise ratio at each receive mode, denoted $\bar{\rho}$. However, since $\bar{\rho} = \rho \mathbb{E}[tr(\mathbf{H}_{11} Q \mathbf{H}_{11}^\dagger)]/m_r$, where $Q$ is the transmitted covariance matrix, we can write $\lim_{\bar{\rho} \to \infty} \log \bar{\rho} = \lim_{\rho \to \infty} \log \rho$. Hence the definitions in 4 coincide with those in [29].

a transmission rate $R = r\log(1 + \rho)$, where $r$ is integer, is dominated by the probability that $r$ singular values of the channel are 1 and the other approach zero. We show that the distribution of the singular values of the Jacobi and Rayleigh channels are approximately identical near 0; essentially proving that the optimal tradeoff is identical in both models.

Theorem 4. *Suppose $l \geq m_t + m_r - 1$. The optimal DMT curve $d^*(r)$ for the channel defined in (1), with $m_t$, $m_r$ satisfying $m_t + m_r \leq m$, is given by the piecewise linear function that connects the points $(k, d^*(k))$ for $k = 0, 1, \cdots, m_{min}$, where*

$$d^*(k) = (m_t - k)(m_r - k). \tag{39}$$

*Proof:* See Appendix B.

■

Theorem 4 suggests that for $m_t + m_r \leq m$, the optimal DMT curve does not depend on $m$. Note that $m$ relates to the extent in which the elements of $\mathbf{H}_{11}$ are mutually independent – the dependency is smaller as $m$ is larger. Hence, at high SNR (large $\rho$) the dependency between the path gains has no effect on the decaying order of the average error probability. Furthermore, the optimal DMT is identical to the optimal tradeoff in the analogous Rayleigh channel (where the path gains are independent).

B. Case II - $m_t + m_r > m$

According to Theorem 3 a zero outage probability is achievable for rates below $(m_t + m_r - m)\log(1 + \rho)$. Hence, for any $(m_t + m_r - m) > \delta > 0$ there is a scheme $\{C(\rho)\}$ with code rates $(m_t + m_r - m - \delta)\log(1 + \rho)$ that achieves a zero outage probability; therefore, assuming $l$ is very large, achieves an exponentially decaying error probability. In that case the discussion about diversity is no longer of relevance. Nonetheless, one can think of the gain as infinite. This reveals an interesting difference between the Jacobi and Rayleigh channels - the maximum diversity gain is "unbounded" as opposed to $m_r m_t$ in the later case.

Theorem 5. *The optimal diversity multiplexing tradeoff curve $d^*(r)$ for the channel defined in (1), with $m_t$, $m_r$ satisfying $m_t + m_r > m$, is given by*

$$d^*(r) = \begin{cases} d^*_{risdual}(r - (m_t + m_r - m)) &, r \geq m_t + m_r - m \\ \infty &, r < m_t + m_r - m. \end{cases} \tag{40}$$

$d^*_{risdual}(r)$ *is the optimal curve for a Jacobi channel with $m - m_r$ transmit and $m - m_t$ receive modes.*

*Proof:* At high SNR, in terms of minimal outage probability, we can take the covariance matrix of the transmitted signal to be $Q = I_{m_t}$, see Appendix B. Thus Theorem 3 can be applied: for $r < m_t + m_r - m$ the minimal outage probability is zero hence the error probability turns exponentially decaying with $\rho$ (assuming $l$ is very large); for $r \geq m_t + m_r - m$ the outage probability equals the outage probability for $\tilde{r} = r - (m_t + m_r - m)$ in a system with $m - m_r$ transmit and $m - m_t$ receive modes. Noting that at high SNR the error probability is dominated by the outage probability (see Appendix B) completes the proof.

∎

Note that $d^*_{residual}(r)$ in Eq. (40) is given by Theorem 4 for any block length $l$ satisfying $l \geq m_t + m_r - 1$.

In the following example we try to illuminate the concept of infinite diversity gain.

Example 3 ($m_t = m_r = 2$). *We consider the $2 \times 2$ Alamouti scheme [34]. Assuming a code block of length $l \geq 3$ and rate $R = r \log \rho$ (bps/Hz), the transmitter excites in each two consecutive channel uses two information bearing symbols in the following manner:*

$$\begin{bmatrix} x_1 \\ x_2 \end{bmatrix}, \begin{bmatrix} -x_2^\dagger \\ x_1^\dagger \end{bmatrix}.$$

*ML decoding linearly combines the received measures and yields the following equivalent scalar channels:*

$$y_i = \sqrt{\|\mathbf{H}_{11}\|_F^2 \rho} x_i + z_i, \quad \forall \ i = 1, 2 \qquad (41)$$

*where each $z_i$ is i.i.d. $\mathcal{CN}(0, 1)$ independent of $x_i$ and $\mathbf{H}_{11}$. The probability for an outage event is given by*

$$P_{out}(2, 2, m; R) = Pr\left(\log(1 + \|\mathbf{H}_{11}\|_F^2 \rho) < r \log \rho\right) \qquad (42)$$

$$\doteq Pr\left(\|\mathbf{H}_{11}\|_F^2 < \rho^{-(1-r)^+}\right). \qquad (43)$$

*Now, in the Rayleigh channel $\|\mathbf{H}_{11}\|_F^2$ is chi-square distributed with $2m_t m_r$ degrees of freedom. In that case, as was shown in [29], the $2 \times 2$ Alamouti scheme can achieve maximum diversity gain of 4. However, in the Jacobi channel:*

- *for $m = 2$ we have $\|\mathbf{H}_{11}\|_F^2 = 2$ ($\mathbf{H}_{11} = \mathbf{H}$ unitary).*
- *for $m = 3$ we have $\|\mathbf{H}_{11}\|_F^2 \geq 1$ (by Lemma 1).*
- *for $m \geq 4$ there is always a non-zero probability for an outage event.*

*Therefore, for $m = 2$ and $m = 3$, for any $r \leq 1$, we get equivalent unfading scalar channels with strictly zero outage probability and one can think of the maximum diversity gain as infinite. For $m \geq 4$ it can be shown that the maximum diversity gain is 4 and the DMT curve linearly connects the points $(1, 0)$ and $(0, 4)$.*

*In Example 2 we saw that for multiplexing gain $r = 0$ the repetition scheme achieves a diversity gain of $m_r m_t$ for systems satisfying $m_t + m_r \leq m$ and an unbounded gain for systems satisfying $m_t + m_r > m$. Thus, for $m \geq 4$ the maximum diversity gain of this scheme is 4 and it can be shown that the DMT curve linearly connects the points $(1/2, 0)$ and $(0, 4)$. For $m = 2$ and $m = 3$ we get an unbounded diversity gain for any multiplexing gain below $r = 1/2$.*

VII. RELATION TO THE RAYLEIGH MODEL

The Jacobi fading model is defined by the transfer matrix $H_{11}$, a truncated $m_r \times m_t$ version of a Haar distributed $m \times m$ unitary matrix. We shall now examine the case where $m$ is very large with respect to $m_t$ and $m_r$.

Assuming $m_t \leq m_r$ and $m_t + m_r \leq m$, the statistics of the squared singular values of the Jacobi channel model follow the law of the Jacobi ensemble $\mathcal{J}(m_r, m - m_r, m_t)$. This ensemble can be constructed as $$G_1^\dagger G_1 (G_1^\dagger G_1 + G_2^\dagger G_2)^{-1}, \qquad (44)$$

where $G_1$ and $G_2$ are $m_r \times m_t$ and $(m - m_r) \times m_t$ independent Gaussian matrices. Thus, the squared singular values of $H_{11}$ share the same distribution with the eigenvalues of (44). Intuitively, in terms of the singularity statistics, the Jacobi channel can be viewed as an $m_r \times m_t$ sub-channel of an $m \times m_t$ *normalized* Gaussian channel. Furthermore, for $m \gg m_r$ we have $$G_1^\dagger G_1 (G_1^\dagger G_1 + G_2^\dagger G_2)^{-1} = G_1^\dagger G_1 \left( \begin{bmatrix} G_1 \\ G_2 \end{bmatrix}^\dagger \begin{bmatrix} G_1 \\ G_2 \end{bmatrix} \right)^{-1} \qquad (45)$$

$$\approx G_1^\dagger G_1 (m \mathbb{E}[gg^\dagger])^{-1} \qquad (46)$$

$$= \tfrac{1}{m} G_1^\dagger G_1, \qquad (47)$$

where in (45) we applied the law of large numbers ($\underline{g}$ is a vector of $m_t$ independent components, each distributed $\mathcal{CN}(0,1)$). In the same manner, for $m_t > m_r$, $m_t + m_r \leq m$ and $m \gg m_t$ the squared singular values of the Jacobi channel share the same distribution with the following ensemble of random matrices $$G_1 G_1^\dagger (G_1 G_1^\dagger + G_2 G_2^\dagger)^{-1} \approx \tfrac{1}{m} G_1 G_1^\dagger. \qquad (48)$$

This allows us to conclude that up to a normalizing factor the Jacobi model approaches (with $m$) the Rayleigh model.

The discussion above provides an "intuitive" proof, using the law of large numbers, to the fact that the Wishart ensemble approaches the Jacobi ensemble as $m \to \infty$. However, this result can be proved rigorously and is well known in random matrix theory. The proof is based on the following. Given a weight function $w(x)$ and an interval $[a,b]$, orthogonal polynomials satisfy the relationship $\int_a^b p_j(x) p_i(x) w(x) dx = \delta_{ji}$. The Laguerre polynomials are orthogonal with respect to the weight function $x^k e^{-x}$ and interval $[0, \infty)$, the Jacobi polynomials are orthogonal with respect to the weight function $(1-x)^{k_1}(1+x)^{k_2}$ and interval $(-1,1)$ [27], [35]. Now, the joint eigenvalue densities of the Wishart and Jacobi ensembles are proportional to $\prod_i w(\lambda_i) \prod_{i<j} |\lambda_i - \lambda_j|^2$, where $w(x)$ are the weight functions related to the Laguerre and (shifted) Jacobi polynomials, respectively. By taking the limit $k_1 \to \infty$ after scaling $x$ by $1/k_1$, it can be shown that the (shifted) Jacobi polynomials approach the Laguerre polynomials, which further proves above conclusion.

Now, the issue of the normalizing constant in Eq. (47) and (48), $1/m$, should be further explained. With fixed $m_t, m_r$, increasing $m$ has two effects. One effect is power loss into the unaddressed modes. This effect is actually pretty strong, so that for a fixed $\rho$ the channel matrix, the received SNR, and hence the capacity vanish with $m$. The other effect, is that with increasing $m$ the channel matrix becomes more "random", e.g., the matrix elements becomes statistically independent, and so the model is closer to the Rayleigh model. To compare the Jacobi model to the Rayleigh mode, we need to compensate for the power loss with increasing $m$, and concentrate only on the "randomness" effect. For this, we evaluate the channel characteristics (capacity, outage probability) in terms of $\bar{\rho}$, the average SNR at each receive mode, given by $$\bar{\rho} = \frac{\rho}{m_r} \mathbb{E} \|\mathbf{H}_{11}\|_F^2 = \frac{\rho}{m_r} \mathbb{E} \sum_{i=1}^{m_{\min}} \lambda_i . \qquad (49)$$

In the Rayleigh channel $\mathbf{H}_{11}$ is Gaussian, thus $\bar{\rho} = \rho m_t$. For the Jacobi channel $\bar{\rho}$ can be evaluated by applying the marginal PDF $f_{\lambda_i}(\lambda_i)$ of the channel's singular values. This PDF is computed in Appendix A. Nonetheless, for $m \gg m_t, m_r$ we can apply Equations (47) and (48) to have $\bar{\rho} \approx \rho m_t/m$.

VIII. DISCUSSION

The Jacobi MIMO channel is defined by the transfer matrix $\mathbf{H}_{11}$, a truncated $m_r \times m_t$ portion of an $m \times m$ Haar distributed unitary matrix. By establishing the relation between the channel's singular values and the Jacobi ensemble of random matrices we derived the ergodic capacity, outage probability and optimal diversity-multiplexing tradeoff. An interesting phenomenon is observed when the parameters of the model satisfy $m_t + m_r > m$: for any realization of $\mathbf{H}_{11}$, $m_t + m_r - m$ singular values are 1. This results in an ergodic capacity which is at least $m_t + m_r - m$ times the SISO capacity. In the non-ergodic scenario this enables a strictly zero outage probability and an exponentially decaying error probability ("infinite diversity") for any transmission rate below $(m_t + m_r - m) \log(1 + \rho)$.

In this work we considered the case where the full H-matrix is drawn according to Haar measure on the group of all $m \times m$ unitary matrices. This H belongs to what is known in random matrix theory as Circular Unitary Ensemble (CUE). The eigenvalues of $\mathbf{H}_{11}^\dagger \mathbf{H}_{11}$ then correspond to Jacobi Unitary Ensemble (JUE). It is known that, depending on certain symmetries of the system to be modeled, one can have other kind of ensembles of unitary matrices also, for example Circular Orthogonal Ensemble (COE). In this case the ensemble comprises of unitary matrices which are symmetric, and then the eigenvalues of $\mathbf{H}_{11}^\dagger \mathbf{H}_{11}$ correspond to Jacobi Orthogonal Ensemble (JOE). Since the marginal density in this case is known, it can be used, as was done in this work, to calculate the ergodic capacity, outage probability and DMT of the induced fading model. Furthermore, just as the Rayleigh model is obtained in the limit $m \gg m_t, m_r$ when H is taken from CUE, one-sided Gaussian model will follow if H is taken from COE. Thus, it will be interesting to find communication media with "reciprocity" or symmetry feature that can be naturally modeled by the Jacobi orthogonal ensemble.

The main motivation to define the Jacobi model comes from optical communication. Nonetheless, the results presented in this paper may provide conceptual insights on fading channels in other communication scenarios. The size of the unitary matrix, $m$, can be viewed as the number of orthogonal propagation paths in the medium, whereas $m_t$ and $m_r$ are the number of addressed paths at the transmitter and receiver, respectively. The Jacobi fading model can be regarded as providing statistical model for the structure of the power loss in a system, where for fixed $m_t$ and $m_r$, the size of the unitary matrix $m$ defines the *"fading measure"* of the channel. For example, when $m$ is equal to $m_r$, the transfer matrix $\mathbf{H}_{11}$ is simply composed of orthonormal columns: its elements (i.e., the path gains) are highly dependent and there is no randomness in the received power. As $m$ becomes greater, the orthogonality of the columns and rows of $\mathbf{H}_{11}$ fades, the dependency between the path gains becomes weaker and the power loss in the unaddressed receive outputs increases. Indeed, when $m$ is very large with respect to $m_t$ and $m_r$, with proper normalization that compensates for the average power loss, the Jacobi fading model approaches to the Rayleigh model. The Jacobi model, thus, introduces new concepts in fading channels, providing a degree of freedom to scale the model from a unitary channel up to the Rayleigh channel.

IX. Acknowledgement

We wish to thank Amir Dembo and Yair Yona for interesting discussions on Lemma 1.

Appendix A
Proof of Theorem 1

The Gaudin-Mehta method [28] is used here for proving Theorem 1.

According to (10), the ergodic capacity satisfies $$C(m_t, m_r, m; \rho) = \mathbb{E}[\log \det(\mathbf{I}_{m_t} + \rho \mathbf{H}_{11}^\dagger \mathbf{H}_{11})] \tag{50}$$

$$= \mathbb{E}[\sum_{i=1}^{m_t} \log(1 + \rho \lambda_i)] \tag{51}$$

where we denote by $\{\lambda_i\}_{i=1}^{m_t}$ the eigenvalues of $\mathbf{H}_{11}^\dagger \mathbf{H}_{11}$. To simplify notations let us assume $m_t \leq m_r$ (one can simply replace $m_t$ with $m_r$ to obtain the proof for $m_t > m_r$). Thus, we can write $$C(m_t, m_r, m; \rho) = m_t \mathbb{E}[\log(1 + \rho \lambda_1)]. \tag{52}$$

Now, the joint distribution of the ordered eigenvalues $f_\lambda(\lambda_1, \ldots, \lambda_{m_t})$ is given by (3). The joint distribution of the *unordered* eigenvalues equals $$\frac{1}{m_t!} f_\lambda(\lambda_1, \ldots, \lambda_{m_t}) ,$$

thus we can compute the density of $\lambda_1$ by integrating out $\{\lambda_i\}_{i=2}^{m_t}$, that is $$f_{\lambda_1}(\lambda_1) = \int_0^1 \cdots \int_0^1 \frac{1}{m_t!} f_\lambda(\lambda_1, \ldots, \lambda_{m_t}) \prod_{i=2}^{m_t} d\lambda_i . \tag{53}$$

By taking $$\lambda_i = \frac{1}{2}(1 - \tilde{\lambda}_i) \tag{54}$$

we can write $$f_{\tilde{\lambda}_1}(\tilde{\lambda}_1) = \int_{-1}^1 \cdots \int_{-1}^1 f_{\tilde{\lambda}}(\tilde{\lambda}_1, \ldots, \tilde{\lambda}_{m_t}) \prod_{i=2}^{m_t} d\tilde{\lambda}_i , \tag{55}$$

where $$f_{\tilde{\lambda}}(\tilde{\lambda}_1, \ldots, \tilde{\lambda}_{m_t}) = \tilde{K}_{m_t,m_r,m}^{-1} \prod_{i=1}^{m_t} (1 - \tilde{\lambda}_i)^\alpha (1 + \tilde{\lambda}_i)^\beta \prod_{i<j} (\tilde{\lambda}_i - \tilde{\lambda}_j)^2 , \tag{56}$$

and $\alpha = m_r - m_t$, $\beta = m - m_r - m_t$. Now, the term $$\prod_{1 \leq i < j \leq m_t} (\tilde{\lambda}_i - \tilde{\lambda}_j)$$

is the determinant of the Vandermonde matrix $$\begin{bmatrix} 1 & \cdots & 1 \\ \tilde{\lambda}_1 & \cdots & \tilde{\lambda}_{m_t} \\ \vdots & & \vdots \\ \tilde{\lambda}_1^{m_t-1} & \cdots & \tilde{\lambda}_{m_t}^{m_t-1} \end{bmatrix} . \tag{57}$$

With row operations we can transform (57) into the following matrix $$\begin{bmatrix} P_0^{(\alpha,\beta)}(\tilde{\lambda}_1) & \cdots & P_0^{(\alpha,\beta)}(\tilde{\lambda}_{m_t}) \\ \vdots & & \vdots \\ P_{m_t-1}^{(\alpha,\beta)}(\tilde{\lambda}_1) & \cdots & P_{m_t-1}^{(\alpha,\beta)}(\tilde{\lambda}_{m_t}) \end{bmatrix} . \tag{58}$$

where $P_n^{(\alpha,\beta)}(x)$ are the Jacobi polynomials [27, 8.96]. These polynomials form a complete orthogonal system in the interval $[-1, 1]$ with respect to the weighting function $w(x) = (1-x)^\alpha (1+x)^\beta$, that is $$\int_{-1}^1 w(x) P_n^{(\alpha,\beta)}(x) P_k^{(\alpha,\beta)}(x) dx = a_{k,\alpha,\beta} \delta_{kn} , \tag{59}$$

where the coefficients $a_{k,\alpha,\beta}$ are given by $$a_{k,\alpha,\beta} = \frac{2^{\alpha+\beta+1}}{2k+\alpha+\beta+1}\binom{2k+\alpha+\beta}{k}\binom{2k+\alpha+\beta}{k+\alpha}^{-1}. \tag{60}$$

Thus we can write $$\prod_{1\leq i<j\leq m_t}(\tilde{\lambda}_i - \tilde{\lambda}_j) = C_{m_t,m_r,m}\sum_{\sigma\in S_{m_t}}(-1)^{sgn(\sigma)}\prod_{i=1}^{m_t}P_{\sigma(i)-1}^{(\alpha,\beta)}(\tilde{\lambda}_i), \tag{61}$$

where $S_{m_t}$ is the set of all permutations of $\{1,\ldots,m_t\}$, $sgn(\sigma)$ denotes the signature of the permutation $\sigma$ and $C_{m_t,m_r,m}$ is a constant picked up from the row operations on the Vandermonde matrix (57). By applying (61) into (56) we get $$f_{\tilde{\lambda}}(\tilde{\lambda}_1,\ldots,\tilde{\lambda}_{m_t}) = \tilde{C}_{m_t,m_r,m}^{-1}\sum_{\sigma_1,\sigma_2\in S_{m_t}}(-1)^{sgn(\sigma_1)+sgn(\sigma_2)}\prod_{i=1}^{m_t}(1-\tilde{\lambda}_i)^\alpha(1+\tilde{\lambda}_i)^\beta P_{\sigma_1(i)-1}^{(\alpha,\beta)}(\tilde{\lambda}_i)P_{\sigma_2(i)-1}^{(\alpha,\beta)}(\tilde{\lambda}_i). \tag{62}$$

Further integrating over $\{\tilde{\lambda}_i\}_{i=2}^{m_t}$ results $$f_{\tilde{\lambda}_1}(\tilde{\lambda}_1) = \tilde{C}_{m_t,m_r,m}^{-1}\sum_{\sigma_1,\sigma_2\in S_{m_t}}(-1)^{sgn(\sigma_1)+sgn(\sigma_2)}(1-\tilde{\lambda}_1)^\alpha(1+\tilde{\lambda}_1)^\beta \times$$

$$\times P_{\sigma_1(1)-1}^{(\alpha,\beta)}(\tilde{\lambda}_1)P_{\sigma_2(1)-1}^{(\alpha,\beta)}(\tilde{\lambda}_1)\prod_{i=2}^{m_t}a_{(\sigma_1(i)-1),\alpha,\beta}\delta_{\sigma_1(i)\sigma_2(i)} \tag{63}$$

$$= \tilde{C}_{m_t,m_r,m}^{-1}(m_t-1)!\sum_{k=0}^{m_t-1}(1-\tilde{\lambda}_1)^\alpha(1+\tilde{\lambda}_1)^\beta[P_k^{(\alpha,\beta)}(\tilde{\lambda}_1)]^2\prod_{i\neq k}a_{i,\alpha,\beta} \tag{64}$$

$$= \frac{1}{m_t}\sum_{k=0}^{m_t-1}a_{k,\alpha,\beta}^{-1}|P_k^{(\alpha,\beta)}(\tilde{\lambda}_1)|^2(1-\tilde{\lambda}_1)^\alpha(1+\tilde{\lambda}_1)^\beta, \tag{65}$$

where the first equality follows from (59) and thus implies that $\sigma_1(i) = \sigma_2(i)$ for all $i$. This results in the second equality while the third follows from (59) and the fact that $f_{\tilde{\lambda}_1}(\tilde{\lambda}_1)$ must integrate to unity. Turning back to $\lambda_1$ we get:

$$f_{\lambda_1}(\lambda_1) = \frac{1}{m_t}\sum_{k=0}^{m_t-1}b_{k,\alpha,\beta}^{-1}\left(P_k^{(\alpha,\beta)}(1-2\lambda_1)\right)^2\lambda_1^\alpha(1-\lambda_1)^\beta, \tag{66}$$

where $$b_{k,\alpha,\beta} = \frac{1}{2k+\alpha+\beta+1}\binom{2k+\alpha+\beta}{k}\binom{2k+\alpha+\beta}{k+\alpha}^{-1}. \tag{67}$$

APPENDIX B
PROOF OF THEOREM 4

The outage probability for a transmission rate $R$ is $$P_{out}(m_t, m_r, m; R) = \inf_{Q: Q \succeq 0} Pr\left[\log \det(I_{m_r} + \rho H_{11} Q H_{11}^\dagger) < R\right], \qquad (68)$$

where the minimization is over all covariance matrices $Q$ of the transmitted signal that satisfy the power constraints. As was already mentioned, since the statistics of $H_{11}$ is invariant under unitary permutations, the optimal choice of $Q$, when applying constant per-mode power constraint, is simply the identity matrix. When imposing power constraint on the total power over all modes, we can take $Q = I_{m_t}$ if $\rho \gg 1$ since $$P_{out}(m_t, m_r, m; R) \doteq Pr\left[\log \det(I_{m_r} + \rho H_{11} H_{11}^\dagger) < R\right], \qquad (69)$$

where we use $\doteq$ to denote *exponential equality*, i.e., $f(\rho) \doteq \rho^d$ denotes $$\lim_{\rho \to \infty} \frac{\log f(\rho)}{\log \rho} = d. \qquad (70)$$

Eq. (69) can be proved by picking $Q = I_{m_t}$ to derive an upper bound on the outage probability and $Q = m_t I_{m_t}$ to derive a lower bound. It can be easily shown that these bounds are exponentially tight (see [29]), hence, in the scale of interest, we can take $Q = I_{m_t}$.

Now, let the transmission rate be $R = r\log(1+\rho)$ and without loss of generality, let us assume that $m_t \leq m_r$ (the outage probability is symmetric in $m_t$ and $m_r$). Since $$\log \det(I_{m_r} + \rho H_{11} H_{11}^\dagger) = \log \det(I_{m_t} + \rho H_{11}^\dagger H_{11})$$

we can apply the joint distribution of the ordered eigenvalues of $H_{11}^\dagger H_{11}$ to write $$P_{out}(m_t, m_r, m; r\log(1+\rho)) \doteq K_{m_t,m_r,m}^{-1} \int_{\mathcal{B}} \prod_{i=1}^{m_t} \lambda_i^{m_r - m_t}(1-\lambda_i)^{m-m_r-m_t} \prod_{i<j}(\lambda_i - \lambda_j)^2 d\underline{\lambda}, \qquad (71)$$

where $K_{m_t,m_r,m}$ is a normalizing factor and $$\mathcal{B} = \left\{\underline{\lambda}: 0 \leq \lambda_1 \leq \ldots \leq \lambda_{m_t} \leq 1, \prod_{i=1}^{m_t}(1+\rho\lambda_i) < (1+\rho)^r\right\}$$

is the set that describes the outage event. Letting $$\lambda_i = \rho^{-\alpha_i} \qquad (72)$$

for $i = 1, \ldots, m_t$ allows us to write $$P_{out}(m_t, m_r, m; r\log(1+\rho)) \doteq (\log \rho)^{m_t} K_{m_t,m_r,m}^{-1} \int_{\mathcal{B}} \prod_{i=1}^{m_t} \rho^{-\alpha_i(m_r-m_t+1)} \qquad (73)$$

$$(1-\rho^{-\alpha_i})^{m-m_r-m_t} \prod_{i<j}(\rho^{-\alpha_i} - \rho^{-\alpha_j})^2 d\underline{\alpha} . \qquad (74)$$

Since $$1 + \rho^{1-\alpha_i} \doteq \rho^{(1-\alpha_i)^+} ,$$

where $(x)^+ = \max\{0, x\}$, we can describe the set of outage events by $$\mathcal{B} = \left\{ \underline{\alpha} : \alpha_1 \geq \ldots \geq \alpha_{m_t} \geq 0, \sum_{i=1}^{m_t}(1-\alpha_i)^+ < r \right\} .$$

Now, the term $(\log \rho)^{m_t} K_{m_t,m_r,m}^{-1}$ satisfies $$\lim_{\rho \to \infty} \frac{\log((\log \rho)^{m_t} K_{m_t,m_r,m}^{-1})}{\log \rho} = 0 , \qquad (75)$$

thus we can write $$P_{out}(m_t, m_r, m; r\log(1+\rho)) \doteq \int_{\mathcal{B}} \prod_{i=1}^{m_t} \rho^{-\alpha_i(m_r-m_t+1)} \times$$

$$\times (1-\rho^{-\alpha_i})^{m-m_r-m_t} \prod_{i<j}(\rho^{-\alpha_i} - \rho^{-\alpha_j})^2 d\underline{\alpha} \qquad (76)$$

$$\leq \int_{\mathcal{B}} \prod_{i=1}^{m_t} \rho^{-\alpha_i(m_r-m_t+1)} \prod_{i<j}(\rho^{-\alpha_i} - \rho^{-\alpha_j})^2 d\underline{\alpha} . \qquad (77)$$

In [29, Theorem 4] it was shown that the right hand side of above satisfies $$\int_{\mathcal{B}} \prod_{i=1}^{m_t} \rho^{-\alpha_i(m_r-m_t+1)} \prod_{i<j}(\rho^{-\alpha_i} - \rho^{-\alpha_j})^2 d\underline{\alpha} \doteq \rho^{-f(\underline{\alpha}^*)} , \qquad (78)$$

where $$f(\underline{\alpha}) = \sum_{i=1}^{m_t}(2i-1+m_r-m_t)\alpha_i \qquad (79)$$

and $$\underline{\alpha}^* = \arg\inf_{\underline{\alpha} \in \mathcal{B}} f(\underline{\alpha}) . \qquad (80)$$

By defining $S_\delta = \{\underline{\alpha} : \alpha_i > \delta \ \forall \ i = 1, \ldots, m_t\}$ for any $\delta > 0$, we can write $$P_{out}(m_t, m_r, m; r\log(1+\rho)) \geq \int_{\mathcal{B} \cap S_\delta} \prod_{i=1}^{m_t} \rho^{-\alpha_i(m_r - m_t + 1)} \times$$
$$\times (1 - \rho^{-\alpha_i})^{m - m_r - m_t} \prod_{i<j} (\rho^{-\alpha_i} - \rho^{-\alpha_j})^2 d\underline{\alpha} \quad (81)$$

$$\geq (1 - \rho^{-\delta})^{m_t(m - m_r - m_t)} \int_{\mathcal{B} \cap S_\delta} \prod_{i=1}^{m_t} \rho^{-\alpha_i(m_r - m_t + 1)} \times$$
$$\times \prod_{i<j} (\rho^{-\alpha_i} - \rho^{-\alpha_j})^2 d\underline{\alpha} \quad (82)$$

$$\doteq \rho^{-f(\underline{\alpha}_\delta^*)}, \quad (83)$$

where $$\underline{\alpha}_\delta^* = \arg \inf_{\underline{\alpha} \in \mathcal{B} \cap S_\delta} f(\underline{\alpha}) . \quad (84)$$

Using the continuity of $f$, $\underline{\alpha}_\delta^*$ approaches $\underline{\alpha}^*$ as $\delta$ goes to zero and we can conclude that $$P_{out}(m_t, m_r, m; r\log(1+\rho)) \doteq \rho^{-f(\underline{\alpha}^*)} . \quad (85)$$

This result was obtained in [29] for the Rayleigh model. From here one can continue as was presented in [29], showing that the error probability is dominated by the outage probability at high SNR (large $\rho$) for $l \geq m_t + m_r - 1$ ( [29, Lemma 5 and Theorem 2], these proofs rely on (85) without making any assumptions on the channel statistics, therefore are true also for the Jacobi model).

REFERENCES

[1] R. J. Muirhead, *Aspects of Multivariate Statistical Theory*. New York: Wiley, 1982.

[2] M. L. Mehta, *Random Matrices*. 3rd ed. New York: Academic Press, 1991.

[3] A. Edelman and N. R. Rao, "Random matrix theory," *Acta Numerica*, vol. 14, pp. 233–297, 2005.

[4] P. J. Forrester, "Quantum conductance problems and the Jacobi ensemble," *Journal of Physics A: Mathematical and General*, vol. 39, pp. 6861–6870, 2006.

[5] G. J. Foschini, "Layered space-time architecture for wireless communication in a fading environment when using multi-element antennas," *Bell Labs Technical Journal*, vol. 1, no. 2, pp. 41–59, 1996.

[6] I. E. Telatar, "Capacity of multi-antenna Gaussian channels," *European Transactions on Telecommunications*, vol. 10, pp. 585–595, 1999.

[7] A. M. Tulino and S. Verdú, "Random matrix theory and wireless communications," *Foundations and Trends in Communications and Information Theory*, vol. 1, pp. 1–182, June 2004.

[8] S. Jayaweera and H. Poor, "On the capacity of multiple-antenna systems in Rician fading," *IEEE Transactions on Wireless Communications*, vol. 4, no. 3, pp. 1102 – 1111, May 2005.

[9] M. Kang and M. Alouini, "Capacity of MIMO Rician channels," *IEEE Transactions on Wireless Communications*, vol. 5, no. 1, pp. 112 – 122, January 2006.

[10] M. K. Simon and M. S. Alouini, *Digital Communications Over Fading Channels*. New York: Wiley, 2000.

[11] M. Nakagami, "The m-distribution: A general formula of intensity distribution of rapid fading," *Statistical Methods in Radio Wave Propagation*. New York: Pergamon, 1960, pp. 3–36.

[12] G. Fraidenraich, O. Leveque, and J. M. Cioffi, "On the MIMO channel capacity for the Nakagami-$m$ channel," *IEEE Transactions on Information Theory*, vol. 54, no. 8, pp. 3752–3757, August 2008.

[13] S. Kumar and A. Pandey, "Random matrix model for Nakagami-Hoyt fading," *IEEE Transactions on Information Theory*, vol. 56, no. 5, pp. 2360–2372, May 2010.

[14] C. W. J. Beenakker, "Random matrix theory of quantum transport," *Review of Modern Physics*, vol. 69, pp. 731–808, July 1997.

[15] H. Schanze, H.-J. Stöckmann, M. Martínez-Mares, and C. H. Lewenkopf, "Universal transport properties of open microwave cavities with and without time-reversal symmetry," *Physical Review E*, vol. 71, p. 016223, January 2005.

[16] S. H. Simon and A. L. Moustakas, "Crossover from conserving to lossy transport in circular random-matrix ensembles," *Physical Review Letters*, vol. 96, p. 136805, April 2006.

[17] S. Kumar and A. Pandey, "Jacobi crossover ensembles of random matrices and statistics of transmission eigenvalues," *Journal of Physics A: Mathematical and Theoretical*, vol. 43, no. 8, p. 085001, 2010.

[18] ——, "Crossover ensembles of random matrices and skew-orthogonal polynomials," *Annals of Physics*, vol. 326, no. 8, pp. 1877–1915, 2011.

[19] R. W. Tkach, "Scaling optical communications for the next decade and beyond," *Bell Labs Technical Journal*, vol. 14, no. 4, pp. 3–10, 2010.

[20] A. R. Chraplyvy, "The coming capacity crunch," *European Conference on Optical Communication (ECOC)*, plenary talk, 2009.

[21] P. Winzer, "Energy-efficient optical transport capacity scaling through spatial multiplexing," *IEEE Photonics Technology Letters*, vol. 23, no. 13, pp. 851–853, July 2011.

[22] T. Morioka, "New generation optical infrastructure technologies: EXAT initiative towards 2020 and beyond," in *OptoElectronics and Communications Conference (OECC)*, 2009.

[23] P. J. Winzer and G. J. Foschini, "MIMO capacities and outage probabilities in spatially multiplexed optical transport systems," *Optics Express*, vol. 19, no. 17, pp. 16 680–96, 2011.

[24] R. Dar, M. Feder, and M. Shtaif, "The underaddressed optical multiple-input, multiple-output channel: Capacity and outage," *Optics Letters*, vol. 37, no. 15, pp. 3150–3152, 2012.

[25] A. Edelman and B. D. Sutton, "The beta-Jacobi matrix model, the CS decomposition, and generalized singular value problems," *Foundations of Computational Mathematics*, vol. 8, no. 1, pp. 259–285, 2008.

[26] C. C. Paige and M. A. Saunders, "Towards a generalized singular value decomposition," *SIAM Journal on Numerical Analysis*, vol. 18, no. 3, pp. 398–405, 1981.

[27] I. S. Gradshteyn and I. M. Ryzhik, *Table of Integrals, Series, and Products*. New York: Academic Press, 1980, vol. 48.

[28] M. Mehta and M. Gaudin, "On the density of eigenvalues of a random matrix," *Nuclear Physics*, vol. 18, no. 0, pp. 420–427, 1960.

[29] L. Zheng and D. N. C. Tse, "Diversity and multiplexing: A fundamental tradeoff in multiple antenna channels," *IEEE Transactions on Information Theory*, vol. 49, pp. 1073–1096, 2002.

[30] R. Narasimhan, "Finite-SNR diversity-multiplexing tradeoff for correlated Rayleigh and Rician MIMO channels," *IEEE Transactions on Information Theory*, vol. 52, no. 9, pp. 3965–3979, September 2006.

[31] Z. Rezki, D. Haccoun, F. Gagnon, and W. Ajib, "Impact of spatial correlation on the finite-SNR diversity-multiplexing tradeoff," *IEEE Transactions on Wireless Communications*, vol. 7, no. 4, pp. 1184–1189, April 2008.

[32] S. Loyka and G. Levin, "Finite-SNR diversity-multiplexing tradeoff via asymptotic analysis of large MIMO systems," *IEEE Transactions on Information Theory*, vol. 56, no. 10, pp. 4781–4792, October 2010.

[33] Y. Yona and M. Feder, "Fundamental limits of infinite constellations in MIMO fading channels," *Submitted to IEEE Transaction on Information Theory*, Available on arxiv.org.

[34] S. Alamouti, "A simple transmit diversity technique for wireless communications," *IEEE Journal on Selected Areas in Communications*, vol. 16, no. 8, pp. 1451–1458, October 1998.

[35] G. Szegő, *Orthogonal Polynomials*, 4th ed. Providence, RI: AMS Colloquium Publications, 1975.

We claim:

1. A method for transmitting information over a communication channel coupled between a transmitter and a receiver, the method comprises:

transmitting, by the transmitter using a first number (Mt) of transmission paths, multiple transmitter data streams and a transmitter feedback stream; wherein the transmitter feedback stream comprises transmitter feedback symbols calculated in response to receiver feedback stream symbols;

receiving, by the receiver during multiple points in time and using a second number (Mr) of reception paths, a plurality of received streams that represent the multiple transmitter data streams and the transmitter feedback stream;

estimating by the receiver, transfer matrixes of the communication channel that correspond to the multiple points in time;

transmitting by the receiver and over a feedback channel, a receiver feedback stream indicative of the transfer matrixes; wherein the receiver feedback stream comprises the receiver feedback stream symbols;

performing at least one additional transmission of a transmitter data symbol of the transmitter data streams to guarantee that the receiver is capable of reconstructing the transmitter data symbol with a desired certainly to provide a reconstructed transmitter data symbol; and reconstructing, by the receiver, the transmitter data streams in response to the reconstructed transmitter data symbol, the plurality of receiver data streams and the received transmitter feedback stream;

wherein each one of the first number (Mt) and the second number (Mr) is smaller than a maximal number of paths (M) supported by the communication channel.

2. The method according to claim 1, wherein the multiple transmitter data streams and the transmitter feedback stream are transmitted concurrently.

3. The method according to claim 1, wherein a number of the transmitter data streams does not exceed Mt+Mr−Mc.

4. The method according to claim 1, wherein the channel is a multimode optic fiber and the transmission paths are implemented by multi-modes of the transmitter.

5. The method according to claim 1, wherein the channel is an optical fiber that has multiple cores and the transmission paths are implemented by the multiple cores.

6. The method according to claim 1, wherein the receiver feedback stream comprises the transfer matrixes of the communication channel during the receiving.

7. The method according to claim 1 wherein the transfer matrixes belong to unitary matrixes; wherein the receiver feedback stream comprises parts of the unitary matrixes.

8. The method according to claim 7, wherein the receiver feedback stream comprises parts of the unitary matrixes that differ from the transfer matrixes of the communication channel during the receiving but facilitate a reconstruction of the transfer matrixes.

9. The method according to claim 8, wherein the parts of the unitary matrixes are smaller than the transfer matrixes.

10. The method according to claim 1, comprising transmitting, at a certain time slot, multiple transmitter data symbols of the multiple transmitter data streams and a transmitter feedback symbol of the transmitter feedback stream, wherein the transmitter feedback symbol is responsive to a transmitter data symbol of the multiple transmitter data streams and to a receiver feedback symbol received during a time slot that precedes the certain time slot.

11. The method according to claim 1, comprising transmitting, at a certain time slot, multiple transmitter data symbols of the multiple transmitter data streams and a transmitter feedback symbol of the transmitter feedback stream, wherein the transmitter feedback symbol is responsive to a product of (a) transmitter data symbol of the multiple transmitter data streams and (b) a receiver feedback symbol received during a time slot that precedes the certain time slot.

12. A system for transmitting information, the system comprises a receiver, a transmitter; wherein the receiver and the transmitter are coupled to a communication channel;

wherein the transmitter is arranged to transmit, using a first number (Mt) of transmission paths, multiple transmitter data streams and a transmitter feedback stream; wherein the transmitter feedback stream comprises transmitter feedback symbols calculated in response to receiver feedback stream symbols;

wherein the receiver is arranged to:

receive, during multiple points in time and using a second number (Mr) of reception paths, a plurality of received stream that represent the multiple transmitter data streams and the transmitter feedback stream;

estimate transfer matrixes of the communication channel that correspond to the multiple points in time;

transmit over a feedback channel, a receiver feedback stream indicative of the transfer matrixes wherein the receiver feedback stream comprises the receiver feedback stream symbols;

wherein the transmitter is further arranged to perform at least one additional transmission of a transmitter data symbol of the transmitter data streams to guarantee that the receiver is capable of reconstructing the transmitter data symbol with a desired certainly to provide a reconstructed transmitter data symbol; and wherein the receiver is further arranged to reconstruct the transmitter data streams in response to the reconstructed transmitter data symbol, the plurality of receiver data streams and the received transmitter feedback stream;

wherein each one of the first number (Mt) and the second number (Mr) is smaller than a maximal number of paths (M) supported by the communication channel.

13. The system according to claim 12, wherein the transmitter is arranged to transmit the multiple transmitter data streams and the transmitter feedback stream concurrently.

14. The system according to claim 12, wherein a number of the transmitter data streams does not exceed Mt+Mr−Mc.

15. The system according to claim 12, wherein the communication channel is a multimode optic fiber and the transmission paths are implemented by multi-modes of the transmitter.

16. The system according to claim 12, wherein the communication channel is an optical fiber that has multiple cores and the transmission paths are implemented by the multiple cores.

17. The system according to claim 12, wherein the receiver feedback stream comprises the transfer matrixes of the communication channel during the receiving.

18. The system according to claim 12, wherein the receiver feedback stream comprises parts of the unitary matrices that differ from the transfer matrixes of the communication channel during the receiving but facilitate a reconstruction of the transfer matrixes.

19. The system according to claim 18, wherein the parts of the unitary matrixes are smaller than the transfer matrixes.

20. The system according to claim 12, wherein the transmitter is arranged to transmit, at a certain time slot, multiple transmitter data symbols of the multiple transmitter data streams and a transmitter feedback symbol of the transmitter feedback stream, wherein the transmitter feedback symbol is responsive to a transmitter data symbol of the multiple transmitter data streams and to a receiver feedback symbol received during a time slot that precedes the certain time slot.

21. The system according to claim 12, wherein the transmitter is arranged to transmit, at a certain time slot, multiple transmitter data symbols of the multiple transmitter data streams and a transmitter feedback symbol of the transmitter feedback stream, wherein the transmitter feedback symbol is responsive to a product of (a) transmitter data symbol of the multiple transmitter data streams and (b) a receiver feedback symbol received during a time slot that precedes the certain time slot.

22. A receiver, comprising:
   a receiving module arranged to:
      receive, during multiple points in time and using a second number (Mr) of reception paths, a plurality of receiver data streams and a received transmitter feedback stream that represent multiple transmitter data streams and a transmitter feedback stream;
      receive at least one additional transmission of a transmitter data symbol of the transmitter data streams;
      wherein the multiple transmitter data streams are transmitted by a transmitter coupled to the receiver via a communication channel, using a first number (Mt) of transmission paths;
      wherein the transmitter feedback stream comprises transmitter feedback symbols calculated in response to receiver feedback stream symbols;
   a transfer matrix estimator that is arranged to estimate transfer matrixes of the communication channel that correspond to the multiple points in time; wherein the transfer matrixes are portions of unitary matrixes, each unitary matrix is associated with a point in time of the multiple points in time;
   a receiver feedback module arranged to transmit over a feedback channel, a receiver feedback stream indicative of parts of the unitary matrixes; wherein the receiver feedback stream comprises the receiver feedback stream symbols;
   a reconstruction module that is arranged to:
      reconstruct, in response to the reception of the at least one additional transmission of the transmitter data symbol, the transmitter data symbol to provide a reconstructed transmitter data symbol; and
      reconstruct the transmitter data streams in response to the reconstructed transmitter data symbol, the plurality of receiver data streams and the received transmitter feedback stream;
   wherein each one of the first number (Mt) and the second number (Mr) is smaller than a maximal number of paths (M) supported by the communication channel.

23. A transmitter, comprising:
   a transmission module that is arranged to transmit, using a first number (Mt) of transmission paths, multiple transmitter data streams and a transmitter feedback stream;
   a transmitter feedback symbol calculator arranged to calculate transmitter feedback stream symbols of the transmitter feedback stream in response to receiver feedback stream symbols;
   wherein the receiver feedback stream is sent to the transmitter over a feedback channel by a receiver using a second number (Mr) of reception paths;
   wherein the receiver and the transmitter are coupled to a communication channel;
   wherein the receiver feedback stream is indicative of unitary matrices, each unitary matrix comprises a transfer matrix of the communication channel at a certain point in time out of multiple points in time during which the receiver received a plurality of receiver data streams and a received transmitter feedback stream that represent the multiple transmitter data streams and the transmitter feedback stream;
   a transmission module that is further arranged to perform at least one additional transmission of a transmitter data symbol of the transmitter data streams to guarantee that the receiver is capable of reconstructing the transmitter data symbol with a desired certainly to provide a reconstructed transmitter data symbol; and
   wherein each one of the first number (Mt) and the second number (Mr) is smaller than a maximal number of paths (M) supported by the communication channel.

* * * * *